United States Patent [19]
Murata et al.

[11] Patent Number: 5,348,127
[45] Date of Patent: Sep. 20, 1994

[54] FLUID COUPLING POWER TRANSMISSION WITH LOCKUP CLUTCH

[75] Inventors: Kiyohito Murata, Susono; Yoshio Shindo, Numazu; Hajime Arai, Aichi, all of Japan

[73] Assignee: Toyota Jidosha Kabushiki Kaisha, Toyota, Japan

[21] Appl. No.: 945,947

[22] Filed: Sep. 17, 1992

[30] Foreign Application Priority Data

| Sep. 20, 1991 | [JP] | Japan | 3-268854 |
| Sep. 22, 1991 | [JP] | Japan | 3-270090 |
| Oct. 29, 1991 | [JP] | Japan | 3-309835 |
| Jan. 30, 1992 | [JP] | Japan | 4-040295 |
| Jan. 30, 1992 | [JP] | Japan | 4-040296 |
| Jun. 25, 1992 | [JP] | Japan | 4-191494 |
| Jul. 15, 1992 | [JP] | Japan | 4-210840 |
| Jul. 15, 1992 | [JP] | Japan | 4-210841 |

[51] Int. Cl.$^5$ ............................................. F16D 33/00
[52] U.S. Cl. ................................. 192/3.3; 192/3.31
[58] Field of Search ................ 192/3.29, 3.28, 3.31, 192/3.33

[56] References Cited

U.S. PATENT DOCUMENTS

| 4,844,216 | 7/1989 | Fukushima | 192/3.29 X |
| 5,062,517 | 11/1991 | Muchmore et al. | 192/3.29 X |
| 5,086,892 | 2/1992 | Schierling | 192/3.29 |
| 5,129,493 | 7/1992 | Edmunds | 192/3.29 |

FOREIGN PATENT DOCUMENTS

| 63-251661 | 10/1988 | Japan . |
| 63-251662 | 10/1988 | Japan . |
| 96964 A1 | 12/1983 | Europe . |
| 2189867 A | 11/1987 | Great Britain . |
| 2613447 | 10/1988 | France |
| 358318 A3 | 3/1990 | Europe . |
| 63-251663 | 10/1988 | Japan . |
| 63-251664 | 10/1988 | Japan . |
| 4-151056 | 5/1992 | Japan | 192/3.29 |

*Primary Examiner*—Leslie A. Braun
*Assistant Examiner*—Andrea Pitts
*Attorney, Agent, or Firm*—Oblon, Spivak, McClelland, Maier & Neustadt

[57] ABSTRACT

A fluid coupling power transmission is constructed such that a pump impellet and a turbine runner are arranged to face each other in a housing, to which torque is inputted, and such that a lockup clutch is disposed in the housing for transmitting the torque from the housing to the turbine runner. The fluid coupling power transmission comprises: a damper mass made rotatable relative to the housing and arranged at the side facing the pump impeller across the turbine runner; an elastic member adapted to be compressed by the revolution of the, damper mass relative to the housing; a lockup piston interposed between the damper mass and the turbine runner and pushed by oil pressure toward the damper mass into selective engagement with the damper mass; a first oil pressure chamber adapted to be fed with the oil pressure for pushing the lockup piston toward the damper mass; a second oil pressure chamber formed between the lockup piston and the damper mass, when the lockup piston engages with the damper mass, and adapted to be fed with oil pressure for separating the lockup piston from the damper mass; and a reaction mechanism for applying a reaction to the damper mass In a direction to separate the damper mass from the housing against the force for the lockup piston to push the damper mass.

49 Claims, 41 Drawing Sheets

FIG.2A
FIG.2B
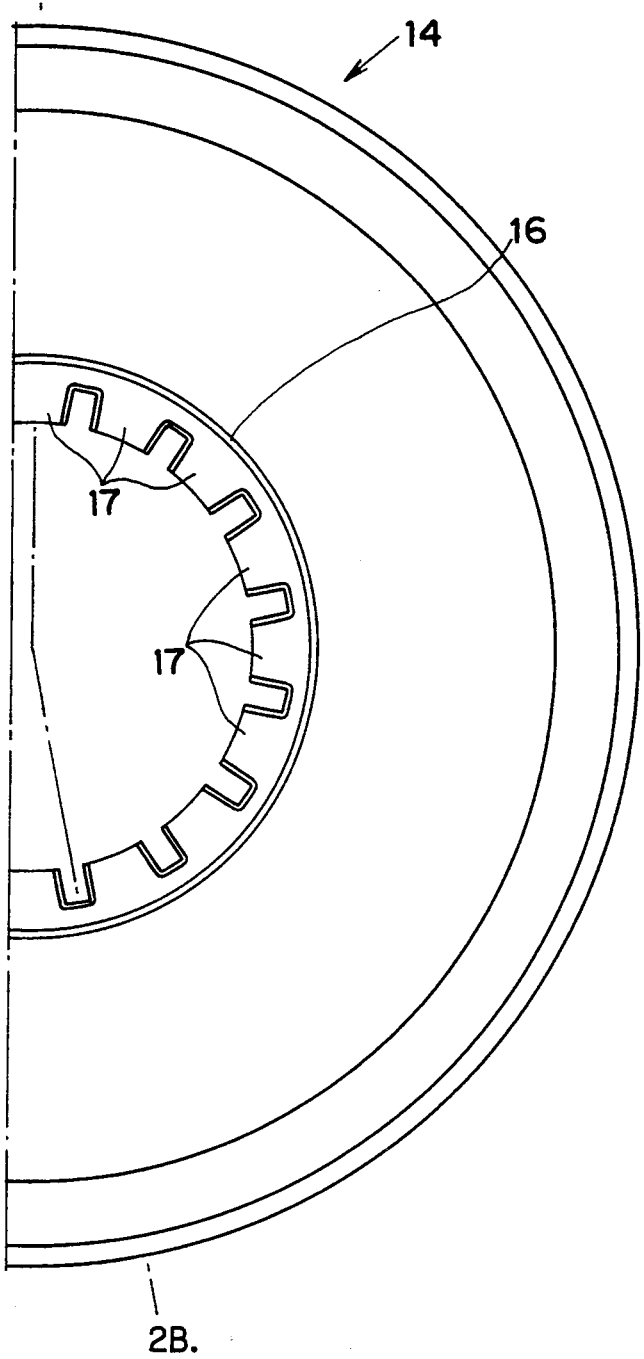
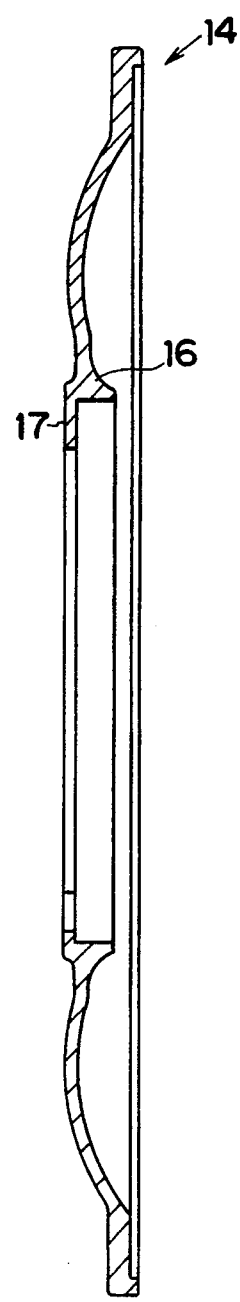

FIG. 7
FIG. 8
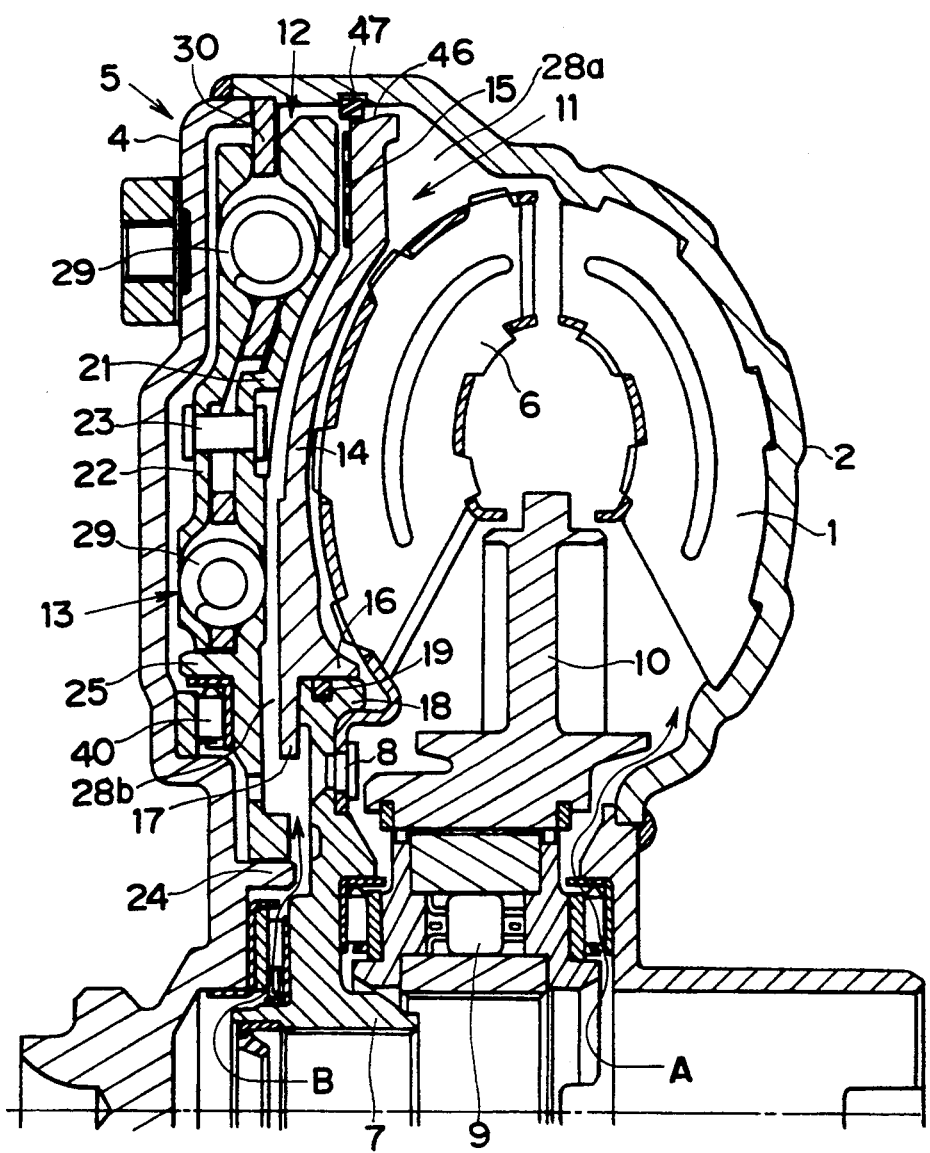
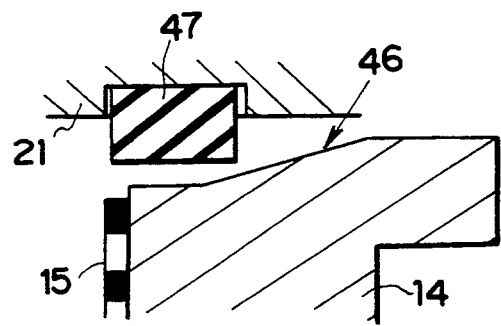

CONVERTER OIL PRESSURE

FLUID COUPLING POWER TRANSMISSION WITH LOCKUP CLUTCH

BACKGROUND OF THE INVENTION

1. Field of the Invention

The present invention relates to an automatic transmission for vehicles and, more particularly to, fluid coupling power transmission such as a torque converter, which is equipped with a lockup clutch.

2. Description of the Prior Art

As well known in the art, the torque converter transmits a torque by feeding a helical flow off fluid establishing in a pump impeller to a turbine runner thereby to rotate It. Thus, the torque is transmitted through a fluid so that the vibration and noise caused by the torque fluctuation of an engine can be absorbed to some extent. In order to improve the transmission efficiency of power in the torque converter, on the other hand, a lockup clutch has been frequently used in the prior art. This lockup clutch directly connects a member at the input side and a member at the output side of the torque converter by mechanical means. Therefore, if the lockup clutch is engaged, the vibration to be caused by the fluctuation of the engine torque may be transmitted as it is to the automatic transmission or its output shaft to deteriorate the driving comfort.

Thus, a damper mechanism is generally used together with the lockup clutch, as disclosed in Japanese Patent Laid-Open No. 251664/1988. In a torque converter according to this disclosure, an annular weight is connected to a front cover through a damper mechanism, and a centrifugal clutch acting as a lockup clutch is arranged at the inner circumference of the annular weight and connected to a turbine runner.

In the torque converter thus constructed, as disclosed, the annular weight acts as an inertial mass for attenuating the vibration of a flywheel at the put side. At a high speed run with the centrifugal clutch being engaged, moreover, the annular weight attached through the damper mechanism acts as an inertial resistance to suppress the booming noise that is caused by a torsional vibration.

Incidentally, the lockup range, i.e., a running state with the lockup clutch being engaged is preferred to be determined depending upon a plurality of parameters such as the vehicle speed or the throttle opening, as has been generally set in the prior art. In recent years, on the other hand, in a specific running state, the lockup clutch is controlled to a slip state called the "half lockup" so as to improve the mileage and the driving comfort.

Since, however, the aforementioned centrifugal clutch functioning as the lockup clutch is engaged and released in accordance with the centrifugal force acting thereon, i t has been found different to engage without fail in a predetermined lockup range and, on the contrary, may be engaged although unnecessary.

Specifically, the centrifugal force to act upon the centrifugal clutch is changed depending upon the rotational speed of the turbine runner only. In the torque converter of the prior art described above, the lockup clutch is controlled according to only one parameter so that its control of engagement and release is difficult. Still the worse, the half lockup control at a specific running state only is almost impossible. Since, moreover, the rotational speed of the turbine runner is changed not only frequently while the vehicle is running but also seriously during a gear change, the lockup clutch may be temporarily engaged due to a temporary increase in the rotational speed of the turbine runner during the running or gear changing operation, and the accompanying change in the torque of the output shaft may appear as a shock.

On the other hand, the centrifugal clutch has to operate and establish a predetermined engaging force against the elastic force or sliding resistance of a return spring so that it is made of a massive member having a considerable weight. As a result, the torque converter of the prior art thus having the centrifugal clutch as its lockup clutch has its mass increased at the turbine runner side. Thus, the synchronization energy of the clutch at the gear changing time may be increased to deteriorate the shifting shock.

Thus, the torque converter of the prior art is made advantageous by using the annular weight in the improvement in the vibration attenuating characteristics and in the prevention of the booming noise. However, other serious disadvantages are raised by adopting the centrifugal clutch as the lockup clutch so that the torque converter of the prior art seems difficult for practical applications. It is, therefore, conceivable to replace the centrifugal clutch for causing those disadvantages by the ordinary lockup clutch of the prior art, which is arranged to face the inner surface of the front cover and actuated by oil pressure.

Since, however, the aforementioned annular clutch is supported In the so-called "floating position" by the spring of the damper mechanism, it is forced onto the inner surface of the front cover if the lockup clutch is pushed to the annular weight so as to engage the lockup clutch. As a result, the torque will be transmitted between the front cover and the annular weight by the frictional force established in between, so that the damping action of the damper mechanism is accordingly weakened. In other words, there arises a problem that a hysteresis due to the frictional resistance is increased to deteriorate the vibration attenuating characteristics.

In the torque converter described above, a coil spring is interposed between the front cover connected to the output shaft of the engine and the annular weight. Thus, there arises a problem that the inertial mass does not sufficiently function to suppress the torque fluctuation which is caused as a result of explosion of each cylinder of the engine. Specifically, the energy caused by the torque fluctuation or the rotational fluctuation is absorbed in terms of the elastic deformation of the coil spring and the increase/decrease of the number of revolution of the annular weight. The torque T which will change the number of revolution of the annular weight is expressed by:

$$T = I \cdot d\omega/dt$$

(I: inertial moment; and $\omega$: angular velocity). Hence, the annular weight directly acts to suppress the fluctuation of the torque or number of revolution of the engine. However, the elastic energy E of the damper spring (or coil spring) is expressed by:

$$E = k \cdot x^2/2$$

(k: spring constant; and x: displacement). The damper spring does not function to suppress the fluctuation of the torque or number of revolution of the engine until it is elastically deformed. Thus, the damper spring does not directly act upon the torque fluctuation and the rotational fluctuation of the engine. Thus, the torque converter of the prior art has the damper spring (or coil spring) interposed between the front cover and the annular weight so that it either allows the torque (or rotational) fluctuation of the engine slightly or suppresses the same with a delay. As a result, in the torque converter of the prior art having the built-in annular weight, the annular weight does not sufficiently function as the flywheel for the engine but is little effective in reducing the number of idling revolution without the so-called "chattering", for example.

In case the lockup clutch is arranged in the torque converter housing, the torque transmission capacity of the lockup clutch is difficult to increase because a restriction on the space. In a device, as disclosed in Japanese Utility Model Laid-Open No. 11426/1987, for example, there is provided a piston to be actuated by oil pressure, which is formed at its leading end face with a number of recesses, so that the clutch disc may be pushed by the piston to have an enhanced engagement while being prevented by the recesses from having an abrupt increase in the engaging force.

Here, the capacity of the torque to be transmitted by the clutch is determined by parameters including the area and contact pressure of the frictional surface, the coefficient of friction and the radius of the frictional face from the center of revolution, and the aforementioned torque converter of the prior art has its torque transmission capacity increased by raising the contact pressure of the frictional face of the above-specified parameters.

However, since the torque converter has little spatial surplus therein, its size has to be enlarged if the aforementioned piston and its oil passages are to be elaborately provided. Moreover, the grooves in the leading end of the piston of the aforementioned torque converter act to change the engaging characteristics of the lockup clutch but not to increase the engaging force. Thus, the prior art has found it difficult to increase the torque transmission capacity of the lockup clutch without being accompanied by the increased size of the system.

SUMMARY OF THE INVENTION

A major object of the present invention is to provide a fluid coupling power transmission having a lockup clutch, which Is excellent in vibration attenuating characteristics and capable of preventing any booming noise.

Another object of the present invention is to improve the control responsiveness of a lockup clutch.

Still another object of the present invention is to provide a fluid coupling power transmission having a lockup clutch, which can effectively function as a flywheel for damping the fluctuation of the output torque of an engine.

A further object of the present invention is to drop oil pressure for engaging the lockup clutch.

A further object of the present invention is to improve the durability of the lockup clutch.

A further object of the present invention is to reduce the size of the fluid coupling power transmission having the lockup clutch.

According to the present invention, there is provided a fluid coupling power transmission which comprises: a pump impeller and a turbine runner arranged to face each other in a housing, to which torque is inputted; and a lockup clutch disposed in the housing for transmitting the torque from the housing to the turbine runner, wherein the improvement comprises: a damper mass made rotatable relative to the housing and arranged at the side facing the pump impeller across the turbine runner; an elastic member adapted to be compressed by the revolution of the damper mass relative to the housing; a lockup piston interposed between the damper mass and the turbine runner and pushed by oil pressure toward the damper mass into selective engagement with the damper mass; a first oil pressure chamber adapted to be fed with the oil pressure for pushing the lockup piston toward the damper mass; a second oil pressure chamber formed between lockup piston and the damper mass, when the lockup piston engages with the damper mass, and adapted to be fed with oil pressure for separating the lockup piston from the damper mass; and reaction means for applying a reaction to the damper mass in a direction to separate the damper mass from the housing against the force for the lockup piston to push the damper mass.

With this construction, the damper mass is held in a position apart from the housing by the reaction means, when the lockup piston is pushed onto the damper mass by the oil pressure fed to the first oil pressure chamber. As a result, the damper mechanism has its hysteresis reduced to suppress the booming noise. Moreover, the elastic member holds the damper mass having a large mass so that it can absorb more energy to attenuate the fluctuation of the input torque effectively.

The hysteresis of the damper mechanism is further reduced if an oil pressure chamber is adopted as the reaction means. In addition, the control responsiveness of the lockup clutch is improved if the damper mass is so supported as to move toward the lockup piston.

If, moreover, there is provided engagement means for connecting the damper mass to the housing or a center plate in torque transmitting manner when the lockup piston is apart from the damper mass, the damper mass acts as a flywheel for damping the torque fluctuation of the engine.

The oil pressure for engaging the lockup clutch is dropped by providing an elastic member for pushing the lockup piston onto the damper mass.

The above and further objects and novel feature of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 2A is a partial front elevation showing a lockup piston;

FIG. 2B is a section taken along line B—B of FIG. 2A;

FIG. 7 is a section showing one half of a fourth embodiment, is cut along the center line;

FIG. 8 is a section showing sealing means for sealing the outer circumference of a lockup piston;

DETAILED DESCRIPTION OF THE PREFERRED EMBODIMENTS

Figure 1:
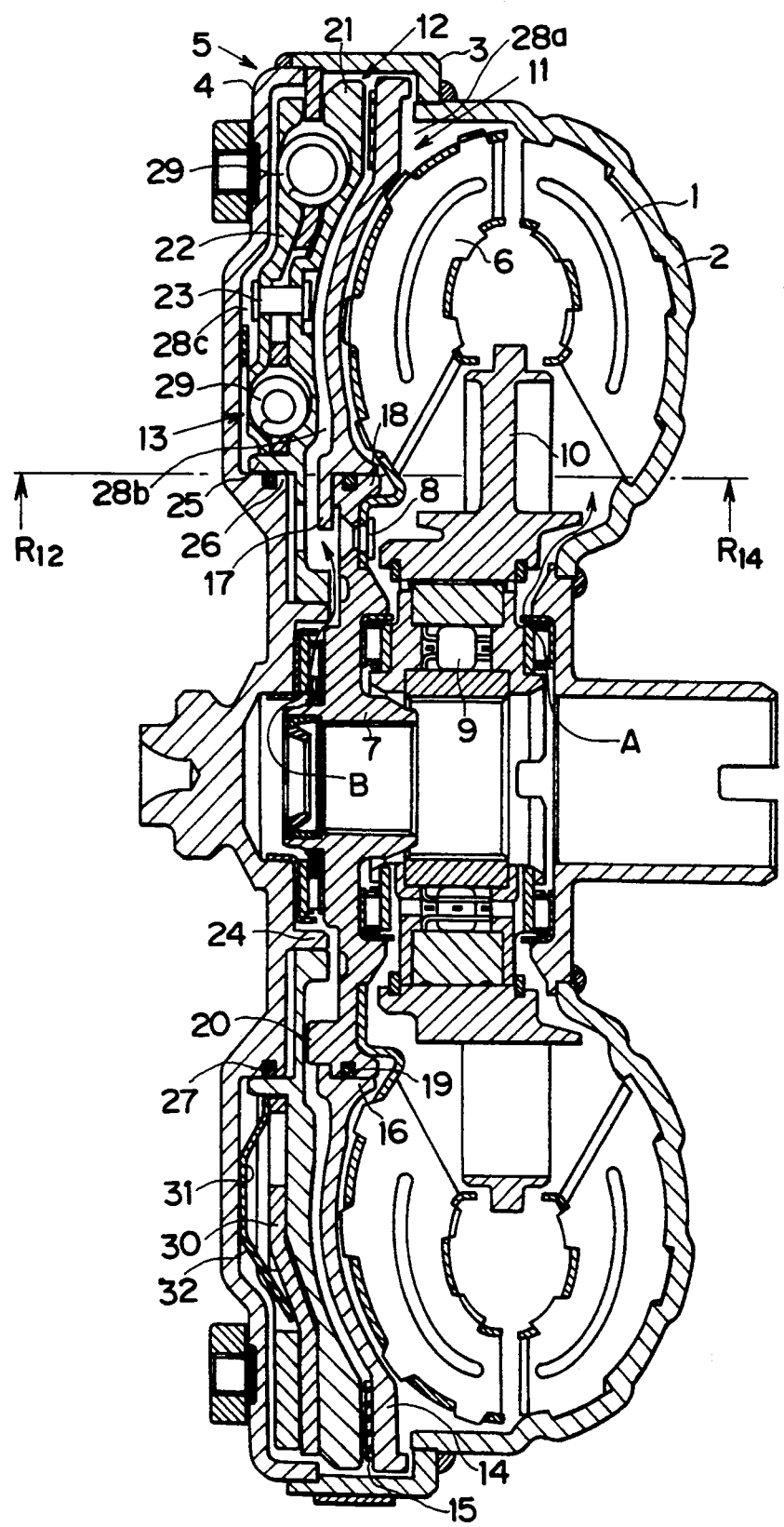
FIG. 1 is a section showing a first embodiment of the present invention.

In FIG. 1, a pump impeller 1 has its shell 2 integrally connected to a front cover 4 through an annular extension member 3, and these shell 2, extension member 3 and front cover 4 constitute a torque converter housing 5 altogether. In this housing 5, a turbine runner 6 is arranged to face the pump impeller 1 and has its inner circumference mounted on a hub 7 acting as an output member by means of rivets 8. Between the pump impeller 1 and the turbine runner 6 and in their inner circumferential portions, moreover there is arranged a stator 10 which is splined to the outer race of a one-way clutch 9. Between the inner face of the front cover 4 and the turbine runner 6, on the other hand, there are arranged a damper mass 12 or a rotating inertial mass and a damper mechanism 13.

The lockup clutch 11 is composed of a lockup piston 14 or an annular plate member, which is curved along the back (as located at the lefthand side in FIG. 1) of the turbine runner 6 and a lining member 15 which is mounted on the side of the outer circumference of the lockup piston 14. As shown in FIGS. 2A and 2B, the lockup piston 14 is formed in its inner circumference with a cylindrical portion 16, and this cylindrical portion 16 is formed at its one end (as located at the lefthand end of FIG. 2B) with a plurality of projections 17 acting as engagement teeth for transmitting torque. These projections 17 are circumferentially spaced from each other at a constant pitch and projected toward the inner circumference.

Figure 3A:
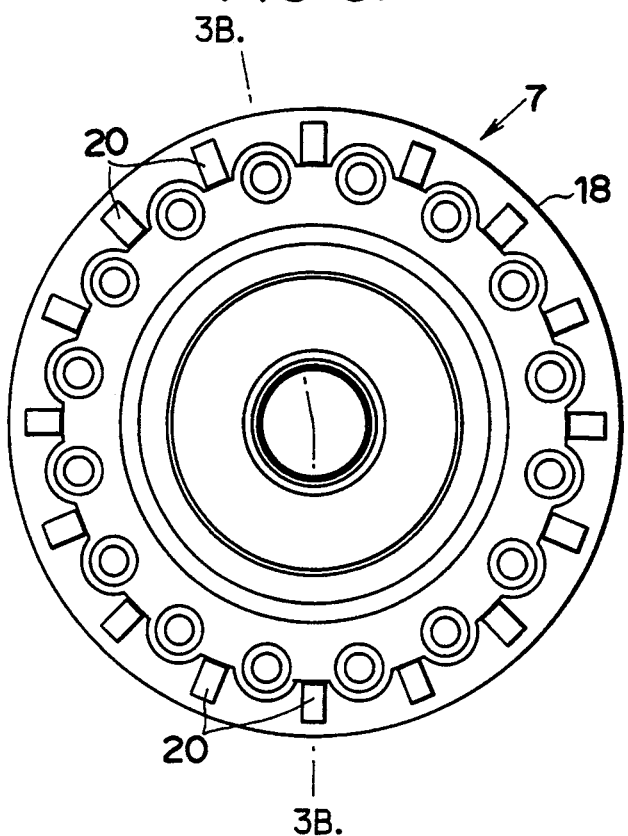
FIG. 3A is a front elevation showing a hub.
Figure 3B:
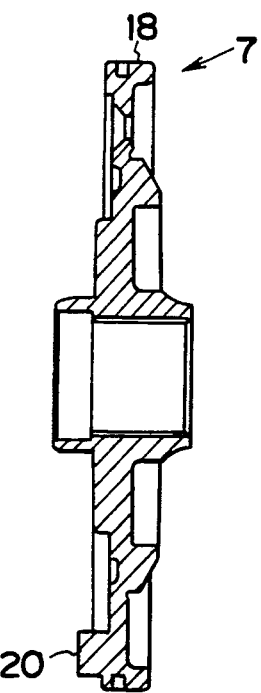
FIG. 3B is a section taken along line B—B of FIG. 3A.

The lockup piston 14 is so fitted on the aforementioned hub 7 as to slide in the axial direction. As shown in FIGS. 3A and 3B, the hub 7 has a boss 18 fitting the cylindrical portion 16 of the lockup piston 14 thereon, and the hub 7 and the lockup piston 14 are sealed up liquid-tight by a seal ring 19 which is fitted in the hub 7. Moreover, the boss 18 is formed on its one side (as located at the lefthand side of FIG. 3B) with a plurality of engagement teeth 20 which are made engageable with the aforementioned projections 17 in the circumferential direction. As a result, the torque is transmitted between the lockup piston 14 and the hub 7 through the engagement between those projections 17 and engagement teeth 20.

The damper mass 12 is composed of: a main member 21, which has an external diameter substantially equal to that of the; aforementioned lockup piston 14 and an internal diameter smaller than that of the lockup piston 14 and which has a generally annular shape; and an annular cover member 22 which has a larger internal diameter but a smaller mass than those of the main member 21. These main member 21 and cover member 22 are connected in a face-to-face relation by means of rivets 23 to constitute the damper mass 12, which is arranged between the lockup piston 14 and the front cover 4. The damper mass 12 is positioned on a single axis, that is, centered with the housing 5 by fitting the inner circumference of the main member 21 rotatably on the outer circumference of an annular projection 24 which is projected from the inner circumference of the front cover 4.

Moreover, the main member 21 is formed with an annular projection 25 which has an internal diameter equal to that of the cylindrical portion 16 in the aforementioned lockup piston 14 and which is projected toward the inner face of the front cover 4. The annular projection 25 is rotatably fitted on a boss 26 which is projected from the inner face of the front cover 4. And, these annular projection 25 and boss 26 are sealed up liquid-tight by means of a seal ring 27 which is mounted in the boss 26. Specifically, a radius R14 of the sealing portion at the inner circumference of the lockup piston 14 and a radius R12 of the sealing portion at the inner circumference of the damper mass 12 are equal, and the front cover 4 and the damper mass 12 are sealed up liquid-tight by the seal ring 27. As a result; a first oil pressure chamber 28a is formed at the back side (as located at the righthand side of FIG. 1) of the lockup piston 14; a second oil pressure chamber 28b is formed between the lockup piston 14 and the damper mass 12; and a third oil pressure chamber 28c is formed between the inner face of the front cover 4 and the damper mass 12. Of these, the first oil pressure chamber 28a and the third oil pressure chamber 28c are allowed to communicate with each other even in the state where the lockup piston 14 is in contact with the damper mass 12.

The main member 21 and the cover member 22 constituting the damper mass 12 together are formed at their respective facing portions with a plurality of circumferential recesses which are spaced at a constant pitch for receiving damper springs 29 or coil springs. Between the main member 21 and the cover member 22, moreover, there is so sandwiched a center plate 30 or an annular plate member that it can rotate relative to the damper mass 12. On the other hand, the center plate 30 is formed with apertures fitting the aforementioned damper springs 29 therein. As a result, when the damper mass 12 and the center plate 30 rotate relative to each other, the damper springs 29 are compressed by those damper mass 12 and center plate 30.

Moreover, the center plate 30 has its outer circumference meshing with the housing 5 in the circumferential direction to transmit the torque in between. This meshing structure can adopt a variety of structures, if necessary. For example, the aforementioned front cover 4 may have its outer circumferential leading end formed with axially protruding teeth, or the center plate 30 may have its outer circumferential end formed with radially externally protruding teeth, so that the torque may be transmitted between the housing 5 and the center plate 30 by having those teeth meshed.

Incidentally, reference numeral 31 appearing in FIG. 1 designates a friction plate or a generally annular member which is formed with elastically deformable arcuate sections 32 at a constant pitch. The friction plate 31 is so arranged on the inner side of the front cover 4 that, its arcuate section 32 is positioned at a circumferentially predetermined gap in the punched portion of the aforementioned cover member 22. Moreover, the arcuate section 32 is elastically deformed and clamped between the front cover 4 and the center plate 30 so that it is elastically forced onto the inner face of the front cover 4 and the center plate 30.

The torque converter thus constructed is caused to transmit the torque by feeding a fluid flow established in the pump impeller 1, i.e., the helical flow of oil to rotate the turbine runner 6 so that the housing 5 is filled up therein with the oil. On the other hand, the lockup clutch 11 is engaged or released in accordance with the pressure difference between the first oil pressure chamber 28a and the second oil pressure chamber 28b. For this operation, the lockup clutch 11 is formed with an oil passage (as indicated at arrow A in FIG. 1) for feeding the oil pressure to the first oil pressure chamber 28a and an oil passage (as indicated at arrow B in FIG. 1) for feeding the oil pressure to the second oil pressure chamber 28b.

As can be seen from the structure shown in FIG. 1, the third oil pressure chamber 28c has its communication blocked from the second oil pressure chamber 28b but retained to the first oil pressure chamber 28a, when the lockup piston 14 moved leftward of FIG. 1 so that the lining member 15 comes into torque transmitting contact with the damper mass 12, i.e., the lockup clutch 11 is engaged. In other words, the oil pressure for engaging the lockup clutch 11 is applied to the third oil pressure chamber 28c.

Next, the operation of the torque converter shown in FIG. 1 will be described in the following. FIG. 1 shows the lockup OFF state, i.e., the state, in which the lockup clutch 11 is released, and the lockup piston 14 is separated from the damper mass 12 by feeding the oil pressure in the direction of arrow B to raise the oil pressure in the second oil pressure chamber 28b. If the torque is applied in this state to the front cover 4 from the (not-shown) engine, the pump impeller 1 rotates together with the housing 5 to establish the helical flow of the oil. When this helical flow is applied to the turbine runner 6, this turbine runner 6 is rotated together with the hub 7 by the torque transmitted. This torque is transmitted to the automatic transmission through the (not-shown) input shaft fitted in the hub 7.

On the other hand, the damper mass 12 is connected to the housing 5 by the damper mechanism 13 including the center plate 30 and the damper springs 29 so that it rotates integrally with the housing 5. In this case, the main member 21 is fitted on the annular projection of the front cover 4 so that the damper mass 12 is positioned coaxially of the front cover 4. As a result, the damper mass 12 neither vibrates nor causes a noise during the rotation. Since, moreover, the damper mass 12 has a larger inertial mass, it establishes a high inertial resistance to the fluctuation of the input torque and attenuates or suppresses the vibration which is caused by the fluctuation of the input torque.

In case the lockup clutch 11 is to be engaged for the lockup ON, the oil pressure is fed in the direction of arrow A of FIG. 1 and is drained in the opposite direction of the arrow B. Thanks to the orifice effect at the narrow clearance between the aforementioned lining member 15 and the main member 21, the pressure in the second oil pressure chamber 28b drops, but the pressure in the first oil pressure chamber 28a rises. As a result, the lockup piston 14 approaches the damper mass 12 to bring the lining member 15 into the torque transmitting contact with the side of the main member 21.

In this case, the pressure in the third oil pressure chamber 28c is equalized to the pressure for pushing the lockup piston 14 onto the damper mass 12, because the third oil pressure chamber 28c sealed up liquid-tight from the second oil pressure chamber 28b laving a lower pressure and communicates with the first oil pressure chamber 28a having a higher pressure at the side of the turbine runner 6. Since, moreover, the radius R12 of the sealing portion at the inner circumferential side for defining the third oil pressure chamber 28c and the radius R14 of the sealing portion at the inner circumferential side of the lockup piston 14 are equal, the force for pushing the lockup piston 14 leftward of FIG. 1 and the force for pushing the damper mass 12 rightward of FIG. 1 are balanced to hold the damper mass 12 in a position apart from the inner face of the front cover 4.

Thus, the input torque transmitted to the front cover 4 is transmitted to the damper mass 12 through the damper springs 29 in the damper mechanism 13 and further to the lockup piston 14 from that damper mass 12. In case the input torque fluctuates, the members including the damper mass 12 and the lockup piston 14 act as the inertial mass partly because the damper mass 12 is rotatable with respect to the housing 5 and partly because the lockup piston 14 is in torque transmitting contact with the damper mass 12. As a result, the damper springs 29 are compressed in response to the fluctuation of the input torque, to absorb the vibration.

Incidentally, the projections 17 formed on the inner circumference of the lockup piston 14 are circumferentially engaged with the engagement teeth 20 which are formed on the side of the hub 7 acting as the output member, so that the torque transmitted from the damper mass 12 to the lockup piston 14 is further transmitted to the hub 7 through those projections 17 and engagement teeth 20. In short, in the construction shown in FIG. 1, the lockup piston 14 acts as an actuator for engaging and releasing the damper mass and additionally as a transmission member for transmitting the torque from the damper mass 12 to the hub 7.

In the construction shown in FIG. 1, moreover, a high sliding resistance is established by the friction plate 31 between the damper mass 12 of the damper mechanism 13 and the inner face of the front cover 4, in case the energy stored in the damper springs 29 is to be released, so that the released energy is partially absorbed by those sliding portions. Specifically, if the relative rotation between the damper mass 12 and the drive side member such as the center plate 31 grows the higher as the fluctuation of the input torque becomes the higher, the circumferential gap between the arcuate section 32 in the friction plate 31 and the punched portion of the cover member 22 disappears to cause the friction plate 31 and the damper mass 12 to rotate together so that the friction plate 31 slides relative to the front cover 4. The sliding resistance at this time acts to suppress the relative rotation of the damper mass 12 so that the "surging" phenomenon or the fluctuation of large wavelength of the output shaft torque is prevented to provide an excellent driving comfort. In case of a low input torque and a small input torque fluctuation, on the other hand, a circumferential gap is established between the arcuate section 32 of the friction plate 31 and the punched portion of the cover member 22 so that the friction plate 31 does not contact with an output side member such as the damper mass 12, to cause no adverse affect such as a large booming noise.

Since the mass necessary for the damper mechanism 13 is retained by the damper mass 12, as has been described hereinbefore, the weight of the lockup piston 14 can be lightened. If, therefore, the lockup clutch 11 is released at the time of a shift, the amount of energy to be absorbed at the shift time by a clutch of the automatic transmission can be reduced to advantageously reduce the shifting shock.

Next, another embodiment of the present invention will be described in the following. In the embodiment shown in FIG. 4, a thrust bearing 40 is used as the reaction means for holding the damper mass 12 in a position apart from the inner face of the front cover 4 so that the sealing means is given a construction different from that shown in FIG. 1, and the friction plate 31 is eliminated.

Figure 4:
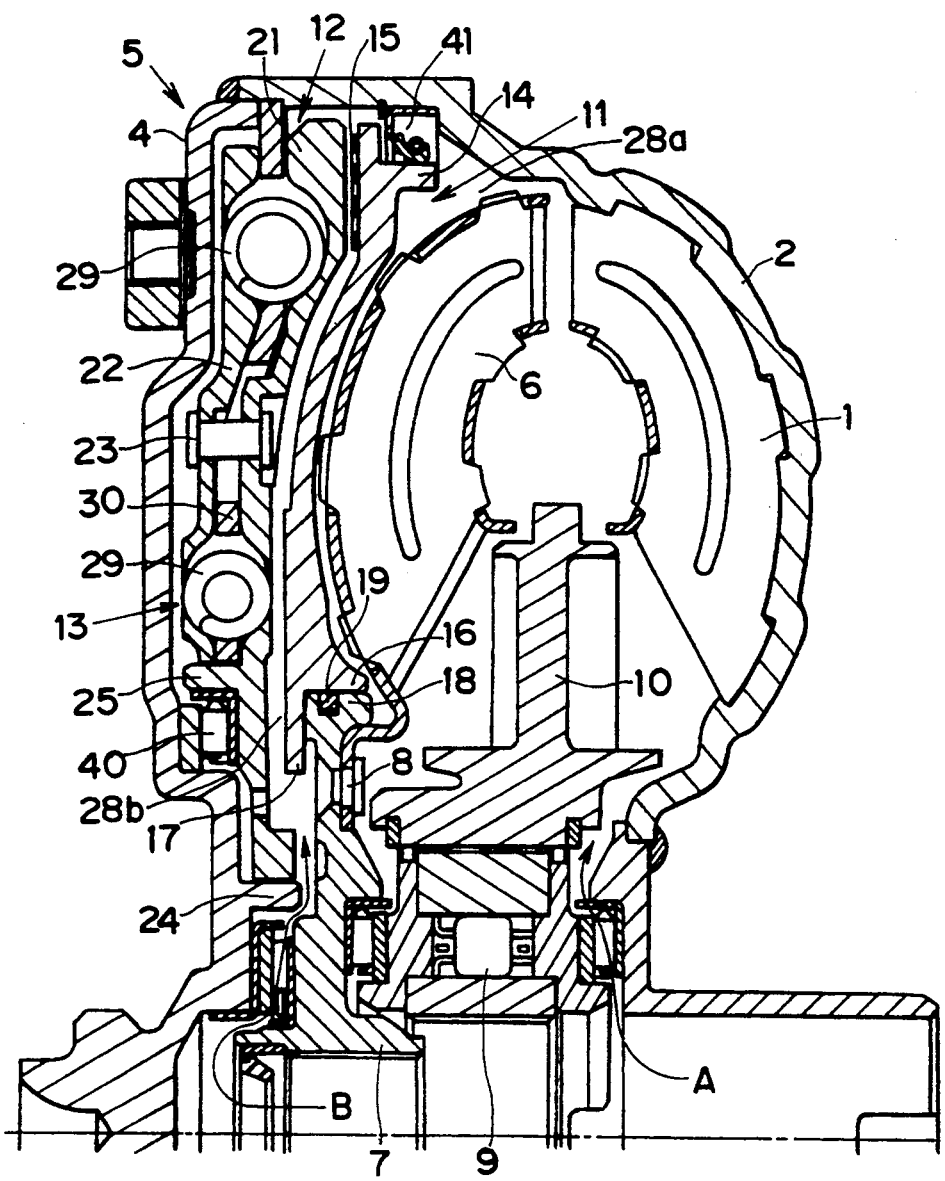
FIG. 4 is a section showing one half of a second embodiment, as cut along the center line.

In the torque converter shown in FIG. 4, specifically speaking, the housing S is formed by welding the shell 2 of the pump impeller i directly to the front cover 4 thereby to integrate the two, and the thrust bearing 40 is interposed between the front cover and the damper mass 12 arranged to face the inner face of the front cover 4. As a result, the space between the front cover 4 and the damper mass 12 is given the communication with the second oil pressure chamber 28b, but the third oil pressure chamber 28c shown in FIG. 3 is not formed.

In order to prevent any leakage of the oil pressure for engaging the lockup clutch 11, a lip seal 41 having a directivity is disposed on the outer circumference of the lockup piston 14. The structure of this lip seal 41 is shown in section in FIG. 5. Specifically, a lip 42 made of an elastic material such as rubber is held on an annular holder 43, as located at the lefthand of FIG. 5, and has its righthand end pushed onto the outer circumference of the lockup piston 14 by the action of a spring. In case the pres sure is the higher at the righthand side of FIG. 5, the lip 42 contacts with the outer circumference of the lockup piston 14 to retain the liquid-tightness. In case, on the contrary the pressure is the higher at the lefthand side of FIG. 5, the lip 42 leaves the outer circumference of the lockup piston 14 against the elastic force of the spring to establish communication between the righthand and lefthand portions.

Thus, if the oil pressure is fed in the direction of arrow A of FIG. 4, the outer circumference of the lockup piston 14 and the inner circumference of the housing 5 are sealed by the lip seal 41 so that the lockup piston 14 is pushed leftward of FIG. 4 by the oil pressure to bring the lining member 15 into torque transmitting contact with the damper mass 12. In short, the lockup clutch 11 is engaged. If, on the contrary, the oil pressure is fed in the direction of arrow B of FIG. 4 and released in the opposite direction of the arrow A, the lip seal 41 opens the clearance between the lockup piston 14 and the housing 5 so that the oil flows from the left to the right across the lockup piston 14. As a result, the lockup piston 14 is retracted rightward of FIG. 4 so that the lining member 15 leaves the damper mass 12. In short, the lockup clutch 11 is released. Incidentally, since the force for pushing the damper mass 12 onto the inner face of the front cover 4 is received by the thrust bearing 40, the damper mass 12 is held rotatably apart from the inner face of the front cover 4.

In the torque converter shown in FIG. 4, the structure other than that described above is identical to that of the torque converter shown in FIG. 1. In the torque converter shown in FIG. 4, therefore, the vibration to be caused by the fluctuation of the input torque can be effectively attenuated.

Figure 5:
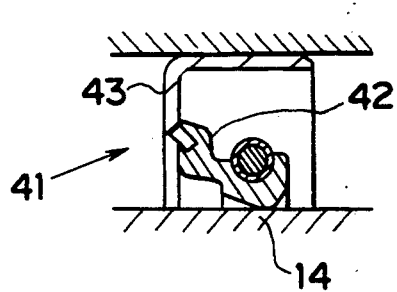
FIG. 5 is a section showing a lip seal.
Figure 6:
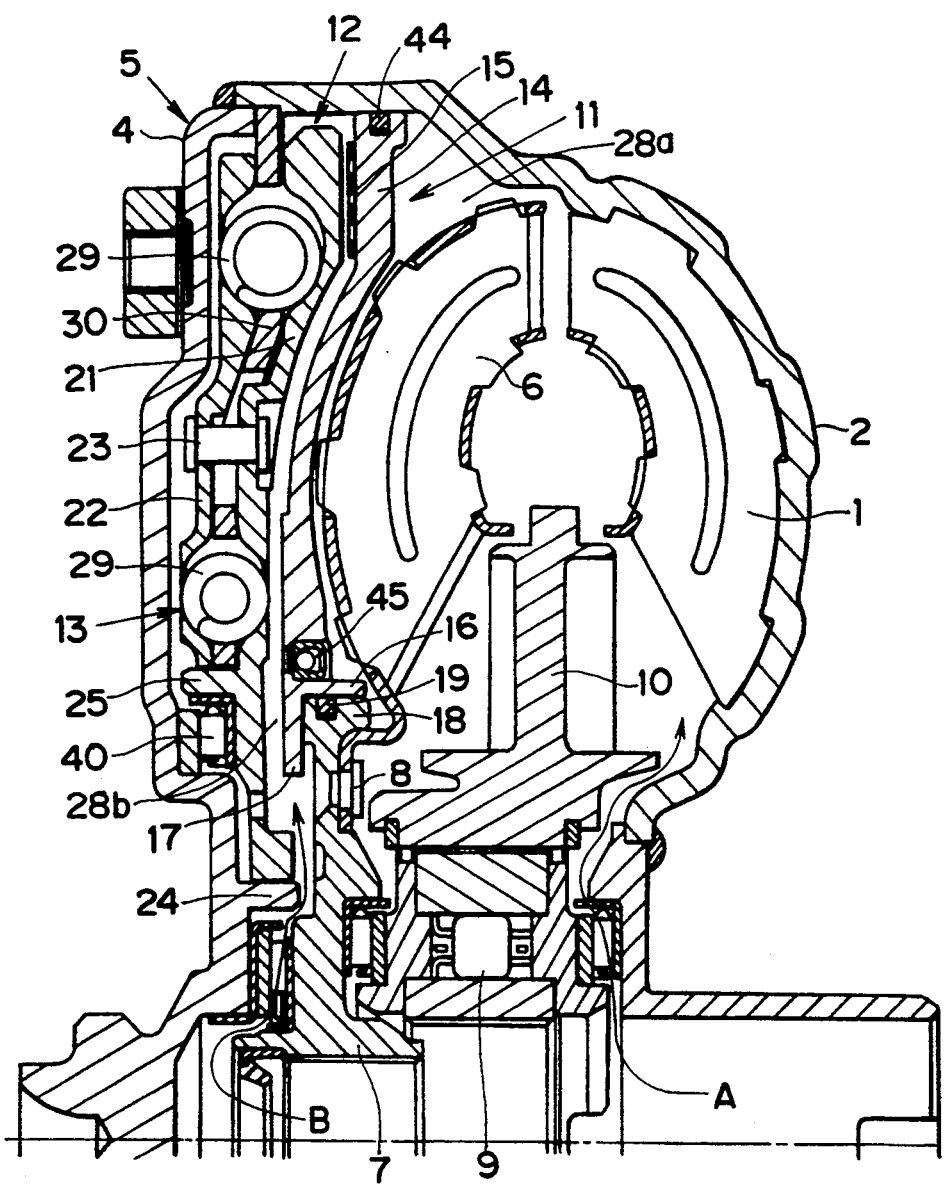
FIG. 6 is a section showing one half of a third embodiment, as cut along the center line.

In an embodiment shown in FIG. 6, the lip seal 41 shown in FIGS. 4 and 5 is replaced by a seal member 44 having no directivity and a check ball valve 45. Specifically, the seal member 44 such as a seal ring is fitted in the outer circumference of the lockup piston 14 to retain a liquid-tightness between the lockup piston 14 and the housing 5, and the check ball valve 45, which is closed when the pressure in the first oil pressure chamber 28a is high, is mounted in the portion of the lockup piston 14 at an inner circumferential side than the lining member 15. The remaining construction is similar to that shown in FIG. 4.

Thus, if the oil pressure is fed in the direction of arrow A of FIG. 6, the check ball valve 45 is closed to raise the pressure in the first oil pressure chamber 28a so that the lockup piston 14 is moved toward the damper mass 12 to bring the lining member 15 into torque transmitting contact with the damper mass 12. In this case, the lockup piston 14 pushes the damper mass 12 toward the front cover 4, but the damper mass 12 does not frictionally contact with the front cover 4 because it is rotatably held by the thrust bearing 40 interposed between itself and the front cover 4.

An embodiment shown in FIG. 7 is constructed by tapering the outer circumference of the lockup piston 14, as indicated at 46, such that the seal between the housing 5 and the lockup piston 14 is established or released in dependence upon the axial position of the lockup piston 14. Specifically, the outer circumference of the lockup piston 14 is formed into the taper surface having its diameter gradually reduced all the lefthand portion of FIG. 8, and a seal ring 47 is so fitted in the inner face of the housing 5 that it is positioned at the outer circumferential side of that taper face 46. These taper face 46 and seal ring 47 take place of the lip seal 41 shown in FIG. 4, and the remaining construction is identical to that shown in FIG. 4.

In this construction shown in FIG. 7, in case the oil pressure is fed ill the direction of arrow A, the lockup piston 14 can be moved leftward of FIG. 7 to bring the taper face 46 at its outer circumference into contact with the seal ring 47 thereby to prevent the leakage of the oil pressure fed in the direction of arrow A. As a result, the lockup piston 14 is moved toward the damper mass 12 to engage the lockup clutch 11. Then, the damper mass 12 is held in the position apart from the inner face of the front cover 4 by the thrust bearing 40.

Figure 9:
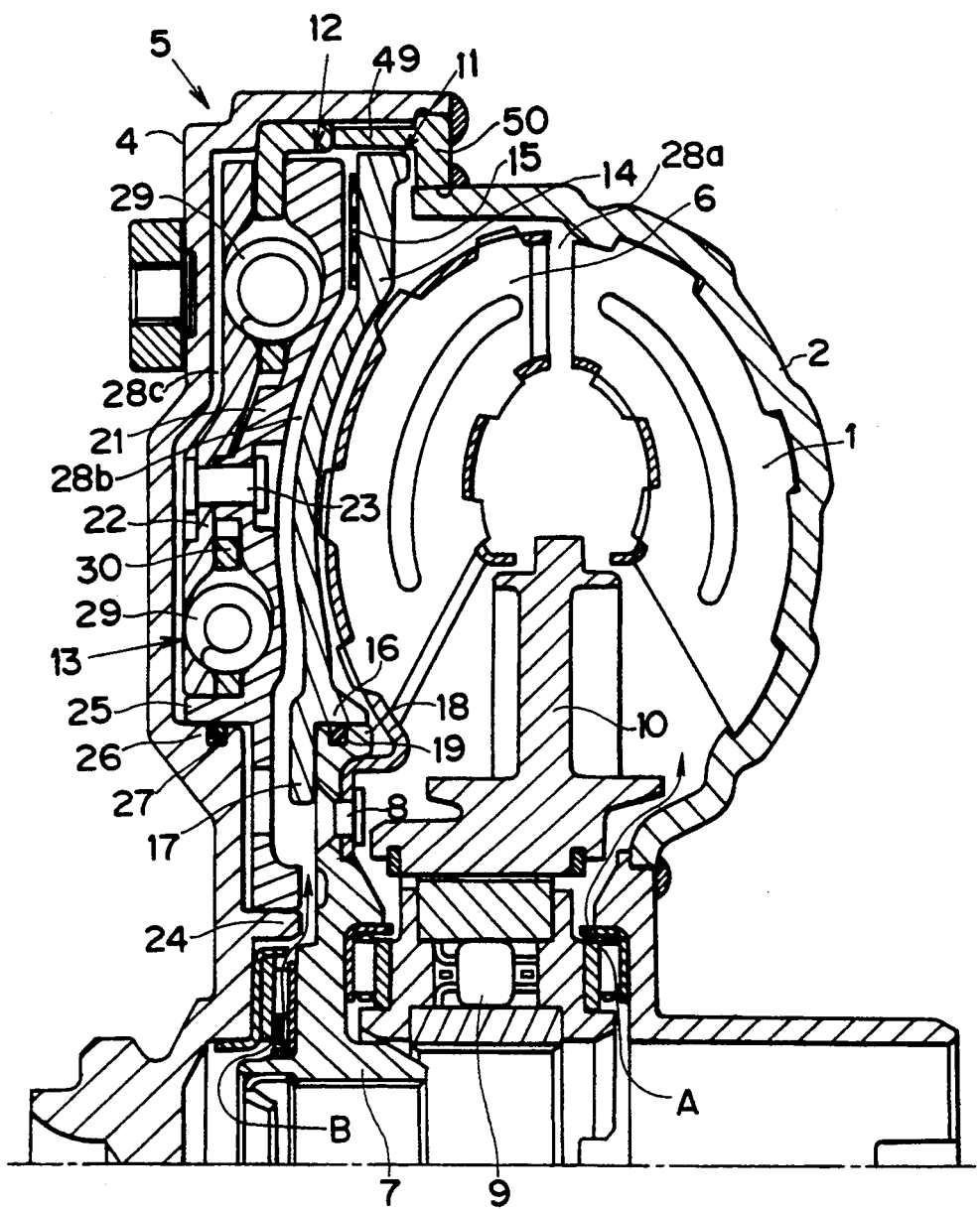
FIG. 9 is a section showing one half of a fifth embodiment, as cut along the center line.

In an embodiment shown in FIG. 9, the extension member 3 shown in FIG. 1 is replaced by a ring-shaped intermediate member 50 which has a positioning projection 49 protruded in the axial direction and which is interposed between the shell 2 of the pump impeller 1 and the front cover 4, so that the damper mechanism 13 may be positioned in the axial direction by abutting the positioning projection 49 against the center plate 30. Moreover, the embodiment shown in FIG. 9 is not provided with the friction plate 31. The remaining construction is similar to that shown in FIG. 1.

Thus, the torque converter shown in FIG. 9 is also excellent, like the torque converter shown in FIG. 1, in the characteristics of attenuating the vibration to be caused by the fluctuation of the input torque and in the effect of preventing the booming noise. Moreover, the damper mass 12 can be isolated from the front cover 4 by the oil pressure in the third oil pressure chamber 28c, and the number of parts can be decreased to reduce the size and weight of the torque converter because the lockup piston 14 makes an element for transmitting the power. Since, moreover, the damper mass 12 is supported by the front cover 4, the center lines of these two members are precisely aligned to eliminate the vibration at a high speed rotation and the generation of a noise.

Figure 10:
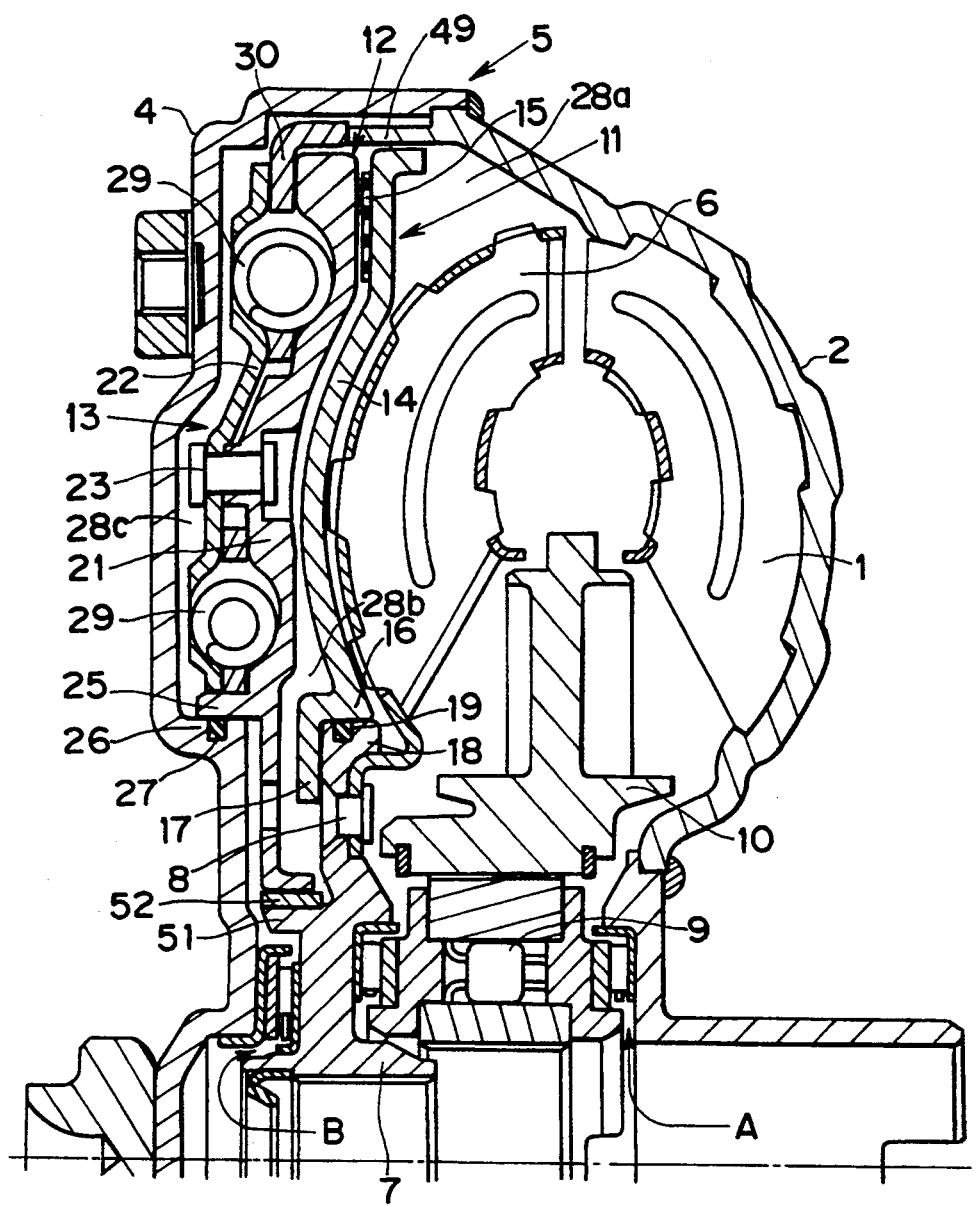
FIG. 10 is a section showing one half of a sixth embodiment, as cut along the center line.

In an embodiment shown in FIG. 10, the aforementioned positioning projection 49 is formed on the shell 2 of the pump impeller 1 to eliminate the aforementioned intermediate member 50, and the hub 7 is formed at its portion close to the center with a boss 51 protruded toward the front cover 4, and the damper mass 12 is rotatably fitted on the boss 51 through a bushing 52. The remaining structure of FIG. 10 is identical to that shown in FIG. 9. Thus , the torque converter shown in FIG. 10 can also improve the characteristics of attenuating the vibration, can prevent the generation of the booming noise and can reduce the size and weight.

Figure 11:
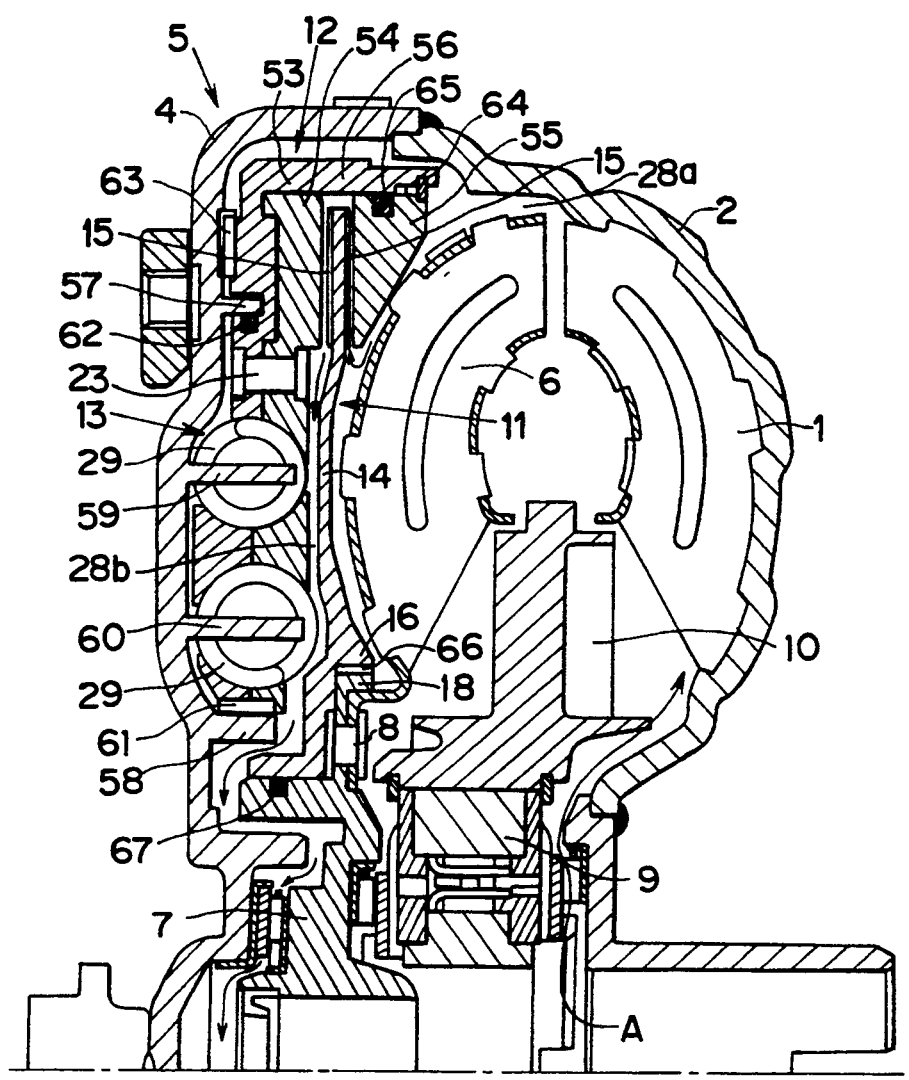
FIG. 11 is a section showing one half of a seventh embodiment, as cut along the center line.

In an embodiment shown in FIG. 11, the engaging force of the lockup c lurch 11 is enhanced by clamping the lockup piston 14 between two kinds of damper masses. Incidentally, in the following description, the portions of FIG. 11 identical to those of the construction shown in FIG. 1 will have their description omitted by designating them at the common reference numerals.

In FIG. 11, the shell 2 of the pump impeller 1 and the front cover 4 are welded and integrated to constitute the housing 5 of the torque converter. Moreover , this torque converter i s equipped with three damper masses 53, 54 and 55 as the damper mass 12. The first damper mass 53 is arranged along the inner face of the front cover 4 and is formed on its outer circumference with a cylindrical portion 56 protruded toward the turbine runner 6. On the other hand, the inner face of the front cover 4 is formed at its outer peripheral and central portions with annular projections 57 and 58 and at their intermediate portion with two rows of projections 59 and 60 which have a large length and which are discrete in the circumferential direction. The first damper mass 53 is fitted on the outer circumference of the center side annular projection 58 through a needle bearing 61 so that it is rotatably supported by the needle bearing 61. More over, the first damper mass 53 is also fitted on the outer circumferential side annular projection 57 and is sealed up from the annular projection 57 by means of a seal ring 62. Between the portion of the first damper mass 53 at the outer circumferential side of the annular projection 57 and the front cover 4, there is interposed as the reaction means a needle bearing 63, by which the first damper mass 53 is positioned in the axial direction and supported rotatably with respect to the front cover 4.

The aforementioned projections 59 and 60 arrayed in the two portions of different radial positions act as stoppers for the damper springs 29 and are arranged in between with the damper springs 29. Incidentally, the first damper mass 53 is formed with an aperture for fitting the damper springs 29 therein. Thus, in case the front cover 4 and the damper mass 53 rotate relative to each other, the damper springs 29 are compressed by having their one-side end portions pushed by the projections 59 and 60 and their other end portions compressed by one-side end portions of the apertures in the first damper mass 53.

The second damper mass 54 is arranged in close contact with the face of the first damper mass 53 opposed to the front cover 4 and is integrally connected to the first damper mass 53 by means of the rivets 23. Incidentally, this second damper mass 54 is also formed with the apertures for accommodating the aforementioned damper springs 29.

Moreover, the third damper mass 55 is an axially movable block member whereas the second damper mass 54 is an axially fixed block member. The third damper mass 55 is formed into an annular member having a trapezoidal or triangular section, as shown. Furthermore, the third damper mass 55 is splined to the inner circumference of the leading end of the cylindrical portion 56 in the first damper mass 53 and is prevented from coming out by means of a snap ring 64. The third damper mass 55 is sealed up by means of a seal ring 65.

Figure 12:
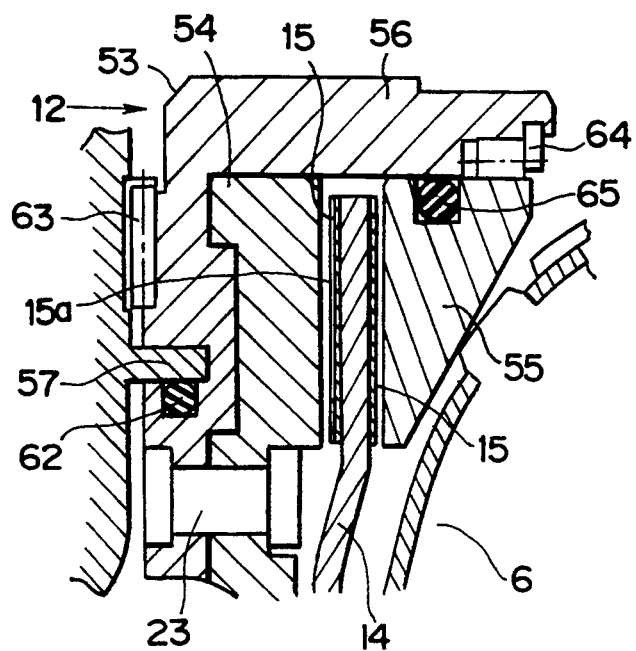
FIG. 12 is a partial section showing the outer circumference of the lockup piston of the seventh embodiment shown in FIG. 11.

Into the gap between the second and third damper masses 54 and 55 thus far described, there is inserted the outer circumferential portion of the lockup piston 14. This lockup piston 14 is an annular plate member which is so splined at 66 to the outer circumference of the hub 7 as to move in the axial direction and to transmit the torque and which is sealed up by means of a seal ring 67. The lining member 15 is adhered to both the front and back faces (i.e., the individual faces facing the second and third damper masses 54 and 55) of the outer circumference of the lockup piston 14, as shown in an enlarged section in FIG. 12. Thus, the lockup clutch 11 is constructed to use both the front and back sides of the lockup piston 14 as its frictional faces (or torque transmitting faces).

Incidentally, the outer circumferential end of the lockup piston 14 is apart from the inner circumference of the cylindrical portion 56 in the first damper mass 53, and the lining member 15 at the side of the second damper mass 54, which takes the lower pressure at the engaging time, is formed with a number of radial grooves 15a leading from the inner circumferential end to the outer circumferential end, as partially shown in FIG. 1.3. Thus, even if the lining member 15 is in close contact with the second damper mass 54, the grooves 15a allows the gap between the other lining member 15 and the third damper mass 55 to communicate with the second oil pressure chamber 28b.

If the torque converter shown in FIG. 11 is fed with the oil pressure in the direction of arrow A, the lockup piston 14 is pushed toward the second damper mass 54 so that the lining member 15 comes into torque transmitting contact with the second damper mass 54. Since the lining member 15 is formed with the recesses 15a, as has been described hereinbefore, the pressure between the third damper mass 55 and the lockup piston 14 drops. As a result, the third damper mass 55 moves to push the lockup piston 14 toward the second damper mass 54 so that it comes into torque transmitting contact with the lining member 15. In other words, the second and third damper masses 54 and 55 clamp the outer circumference of the lockup piston 14 to engage the lockup clutch 11. Thus, the input torque is transmitted from the front cover 4 through the damper spring 29 to the damper masses 53, 54 and 55 and further through the lockup piston 14 to the output member or hub 7.

Thus, in the torque converter shown in FIG. 11, too, the damper masses 53, 54 and 55 are connected to the front cover 4 through the damper spring 29 and can be held out of frictional contact with the front cover 4 by the needle bearing 63, so that the torque converter is excellent in the characteristics of attenuating the vibrations and can prevent the booming noise effectively. Since, moreover, the lockup piston 14 acts as a torque transmission element, the torque converter can have its parts number decreased and its size and weight reduced. Furthermore, the damper masses 53, 54 and 55 are supported by the front cover 4 so that their center axes can be precisely aligned to prevent the vibration and noise effectively at the time of a high speed rotation. And, the damper masses 53, 54 and 55 and the front cover 4 are sealed up by the seal ring 62 which is sandwiched between the annular projection 57 at the outer circumferential side and the first damper mass 53, so that the oil pressure for engaging the lockup clutch 11 can be prevented from leaking.

Figure 14A:
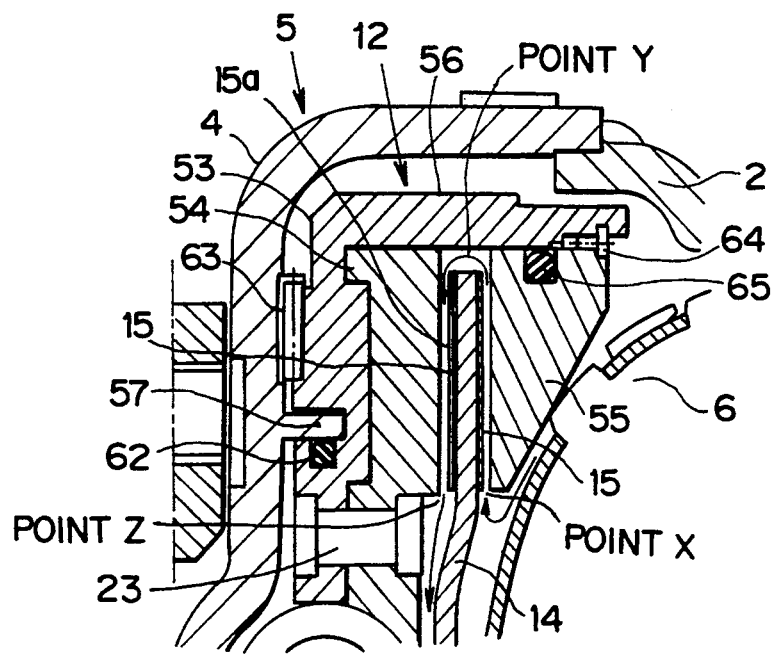
FIG. 14A is a section similar to that of FIG. 12 but shows the state in which a lockup clutch is released.
Figure 14B:
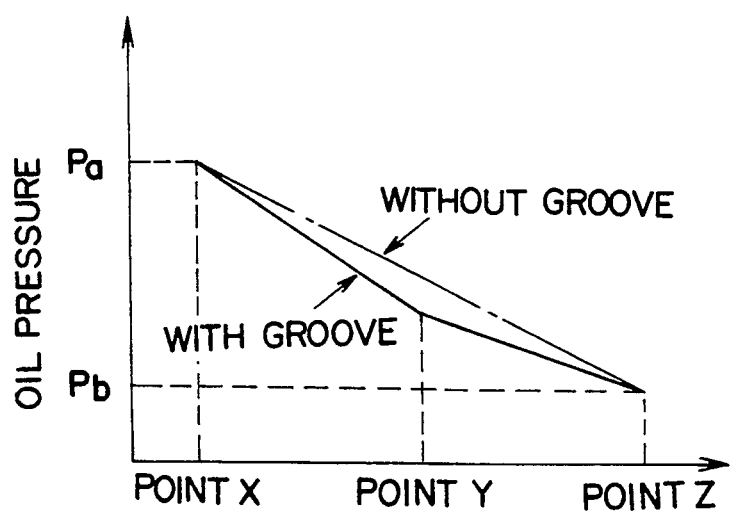
FIG. 14B is a diagram showing pressure distributions in the state shown in FIG. 14A.
Figure 15:
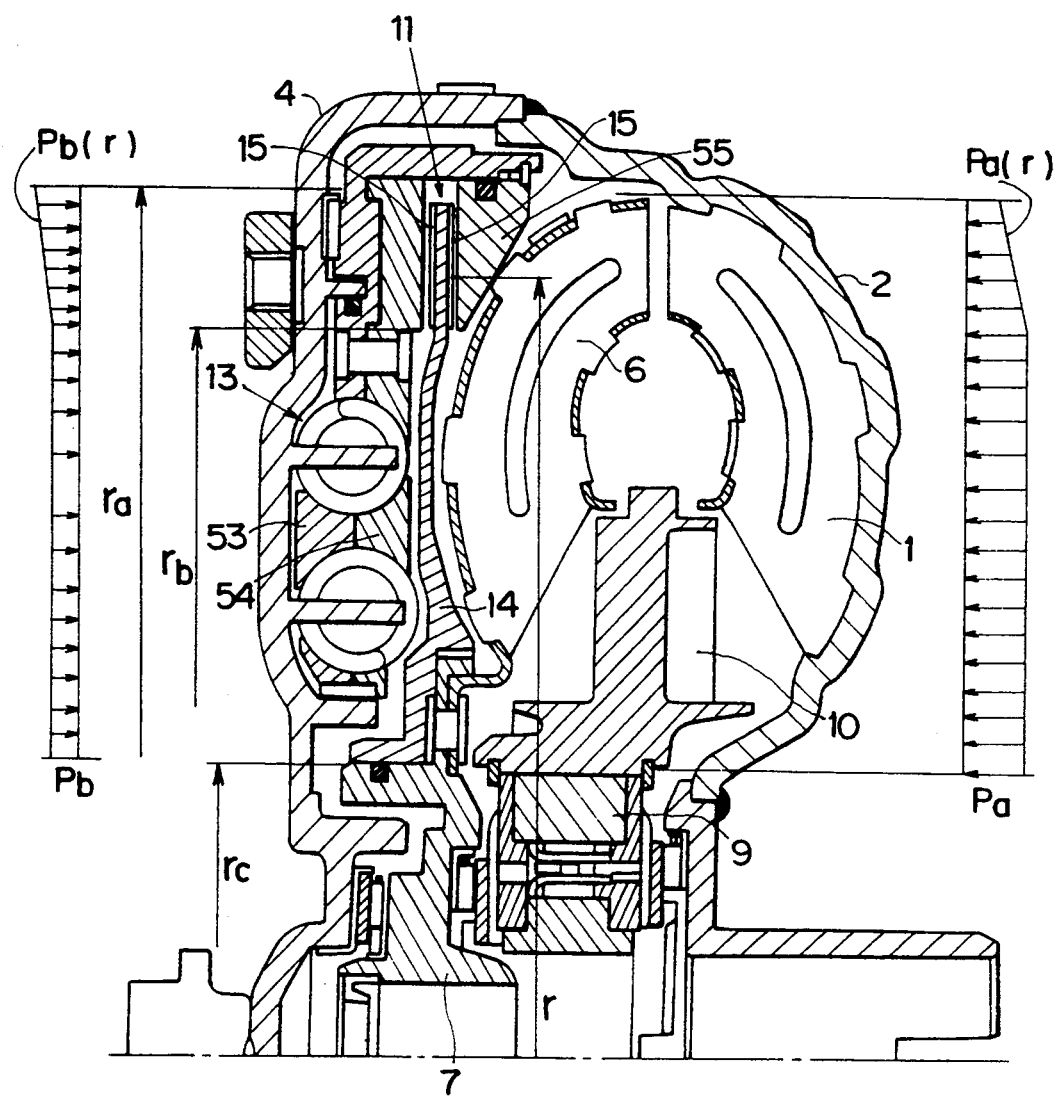
FIG. 15 is an explanatory diagram showing the sizes and pressure distributions of the individual parts of the seventh embodiment of FIG. 11.

Here will be described the behavior of the lockup piston 14 when the lockup clutch 11 shown in FIG. 11 is to be engaged. If the oil pressure is fed to the first oil pressure chamber 28a so as to engage the lockup clutch 11 and is released from the second oil pressure chamber 28b, the pressure Pa of the first oil pressure chamber 28a exceeds the pressure Pb of the second oil pressure chamber 28b so that the oil flows between the aforementioned individual frictional faces, as indicated by arrows in FIG. 14A. The pressure balance of the oil pressures acting upon the lockup piston 14 in this case is shown in FIG. 15, and the pressures at three points X, Y and Z between the individual frictional faces are plotted by solid curves in FIG. 14B. Incidentally, the size relations of the individual portions are also shown in FIG. 15. Specifically, a force Fa for pushing the lockup piston 14 from the righthand side, as shown in FIGS. 11 and 15, is expressed by:

$$Fa = \pi(r_b^2 - r_c^2) \cdot Pa + \int_{r_b}^{r_a} 2\pi r \times Pa(r) dr. \tag{1}$$

And, a pushing force Fb from the lefthand side is expressed by:

$$Fb = \pi(r_b^2 - r_c^2) \cdot Pb + \int_{r_b}^{r_a} 2\pi r \times Pb(r)dr. \tag{2}$$

Hence, the pressure difference of these, i.e., a force Fc0 acting to move the lockup piston 14 to the front side (i.e., leftward of FIG. 11) is expressed by:

$$Fc0 = \pi(r_b^2 - r_c^2)(Pa - Pb) + \int_{r_b}^{r_a} 2\pi r(Pa(r) - Pb(r))dr. \tag{3}$$

Because this value is positive, the lockup piston 14 is moved to the front side.

The third damper mass 55 will be described in the following. Since the third damper mass 55 receives the pressure Pa from the righthand side of the Figure and the pressure Pa(r) from the lefthand side, a force FB0 for moving the third damper mass 55 is expressed by:

$$FB0 = \pi(r_a^2 - r_b^2) \cdot Pa - \int_{r_b}^{r_a} 2\pi r \times Pa(r)dr. \tag{4}$$

Because Pa>Pa(r), FB0>0. Hence, the third damper mass 55 also moves to the front side (i.e., leftward of the Figure).

Figure 16A:
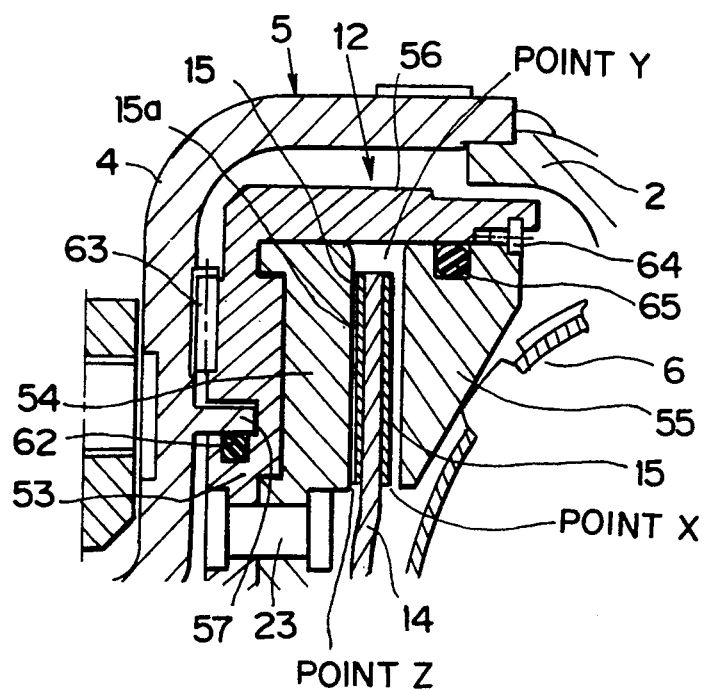
FIG. 16A is a section similar to that of FIG. 12 but shows the state in which a lockup clutch is being engaged.
Figure 16B:
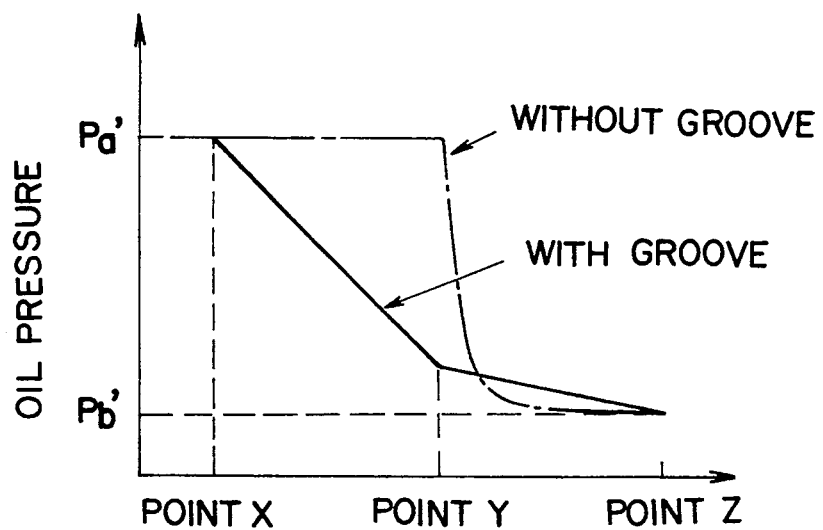
FIG. 16B is a diagram showing pressure distributions in the state shown in FIG. 16A.

FIG. 16A shows the state, in which one lining member 15 in the lockup piston 14 is in contact with the second damper mass 54. Since this lining member 15 is formed with the grooves 15a leading from the inner circumferential end to the outer circumferential end of the lining member 15, the oil is allowed to flow through those recesses 15a to the inner circumference even if the lining member 15 contacts with the second damper mass 54. In this case, therefore, the pressure distributions at the points X to Z are plotted by solid line in FIG. 16B. A force Fc1 for moving the lockup piston 14 is expressed by:

$$Fc1 = \pi(r_b^2 - r_c^2)(Pa' - Pb') + \int_{r_b}^{r_a} 2\pi r(Pa'(r) - Pb'(r))dr. \tag{5}$$

On the other hand, a force FB1 for moving the third damper mass 55 is expressed by:

$$FB1 = \pi(r_a^2 - r_b^2) \cdot Pa' - \int_{r_b}^{r_a} 2\pi r \times Pa'(r)dr. \tag{6}$$

Here, the dashed pressures Pa' and Pb' indicate the levels which are changed on the basis that the lockup piston 14 and the third damper mass 55 move to narrow the gap between the individual frictional faces, as described above, such that the pressure Pa' indicates a rise of the pressure Pa whereas the pressure Pb' indicates a drop of the pressure Pb.

Figure 17A:
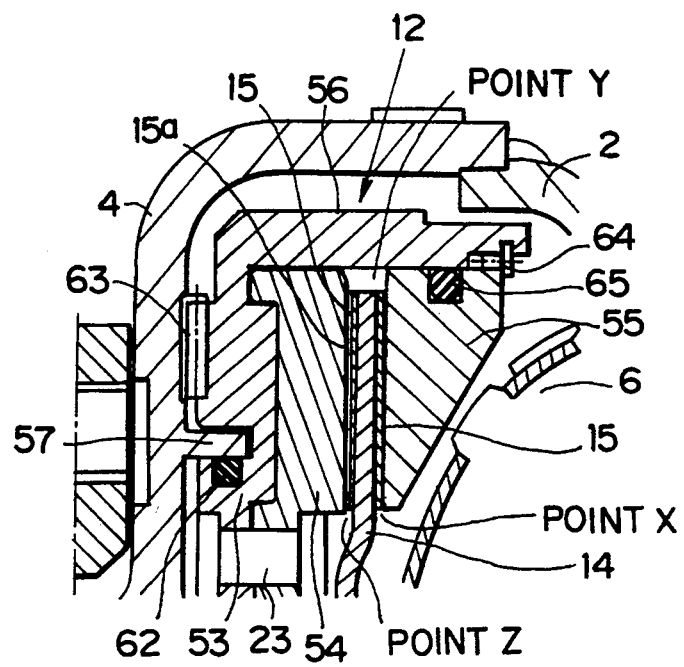
FIG. 17A is a section similar to that of FIG. 12 but shows the state in which a lockup clutch is completely engaged.
Figure 17B:
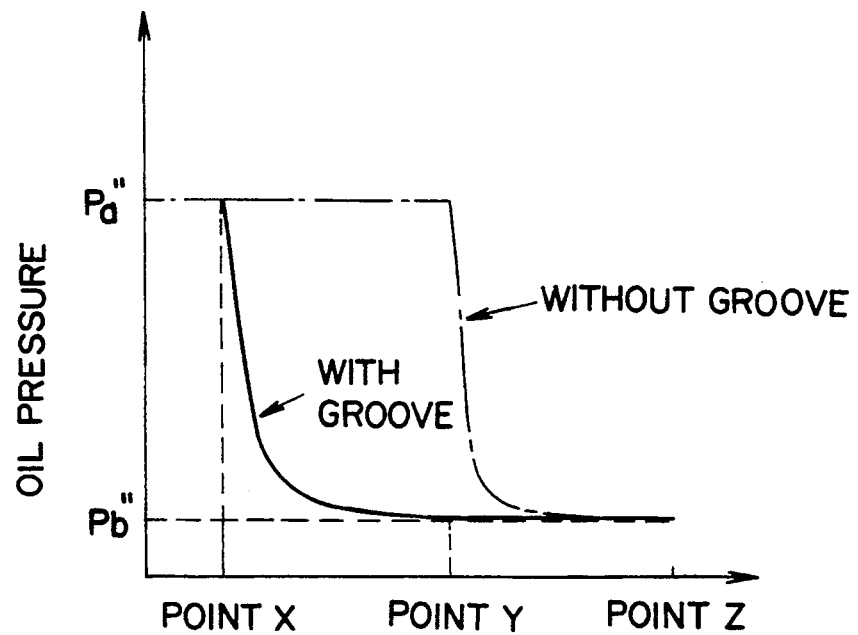
FIG. 17B is a diagram showing pressure distributions in the state shown in FIG. 16A.

Thanks to the recesses 15a formed, as described above, the third damper mass 55 continues to move, even after it comes into close contact with the second damper 54, until it clamps the outer circumference of the lockup piston 14 between itself and the second damper mass 54. This state is shown in FIG. 17A, and the pressure distributions at the points X to Z are plotted by solid line in FIG. 17B. And, a force Fc2 for pushing the lockup piston 14 leftward of the Figure is expressed by:

$$Fc2 = \pi(r_a^2 - r_c^2)(Pa'' - Pb'') + \int_{r_b}^{r_a} 2\pi r(Pa''(r) - Pb''(r))dr. \tag{7}$$

Moreover, a force FB2 for pushing the third damper mass 55 leftward of the Figure is expressed by:

$$FB2 = \pi(r_a^2 - r_b^2) \cdot Pa'' - \int_{r_b}^{r_a} 2\pi r \times Pa''(r)dr. \tag{8}$$

Here, the double-dashed pressures Pa'' and Pb'' indicate the levels which are changed on the basis that the lining member 15 is further pushed onto the second damper mass 54 to narrow the recesses 15a and that the other lining member 15 comes into close contact with the third damper mass 55, such that the pressure Pa'' indicates a further rise of the pressure Pa whereas the pressure Pb'' indicates a further drop of the pressure Pb.

Specifically, in the lockup clutch described above, the second damper mass 54 and the lining member 15 are engaged under the engagement pressure Fc2, and the third damper mass 55 and the lining member 15 are engaged under the engagement pressure FB2, so that the torque is transmitted at those two portions. As a result, the torque transmission capacity is increased with little slip so that the durability can be improved while preventing the wear.

Here will be described for comparison the case in which the aforementioned grooves 15a are not formed. If the lining member 15 previously contacts with the second damper mass 54, the flow of the oil from the rear side to the front side across the lockup piston 14 is blocked. As a result, the pressure between the other lining member 15 and the till rd damper mass 55 becomes equal to that fed to the back side of the lockup piston 14, as shown in dotted lines in FIGS. 16B and 17B. Thus, the force for moving the third damper mass 55 to the front side, i.e., toward the lockup piston 14 is not applied to the third damper mass 55 so that the third damper mass 55 and the lockup piston 14 are not engaged to reduce the torque transmission face accordingly. As a result, the torque transmission capacity as the lockup clutch is reduced. Incidentally, according to our investigation, it has been clarified that the torque transmission capacity establishes a difference of about 1.4 times between the cases i n which the grooves 15a are formed and no in the construction of FIG. 11.

Figure 18:
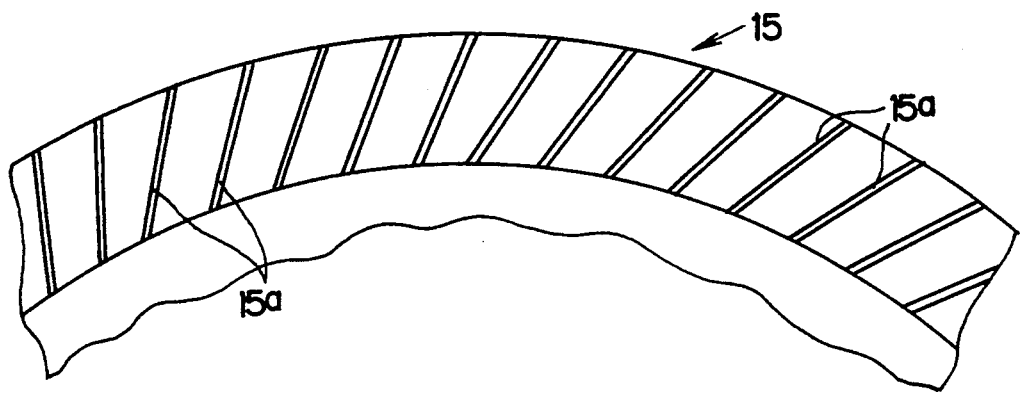
FIG. 18 is a partial front elevation of a lining member for showing another shape of grooves.

Incidentally, in the embodiments described above, the grooves 15a are formed radially of the lockup piston 14 but can be arbitrarily directed such that they are inclined at a predetermined angle with respect to the radially directions, as shown in FIG. 18.

Figure 19:
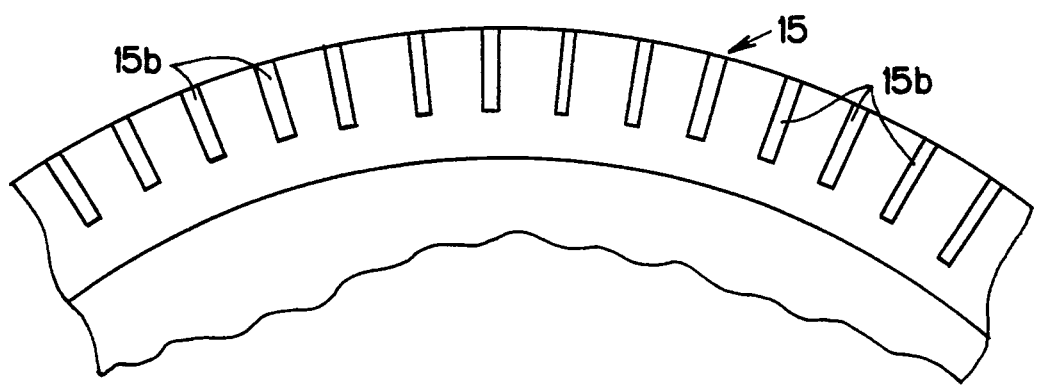
FIG. 19 is a partial front elevation showing the shape of grooves formed in another lining member.
Figure 20:
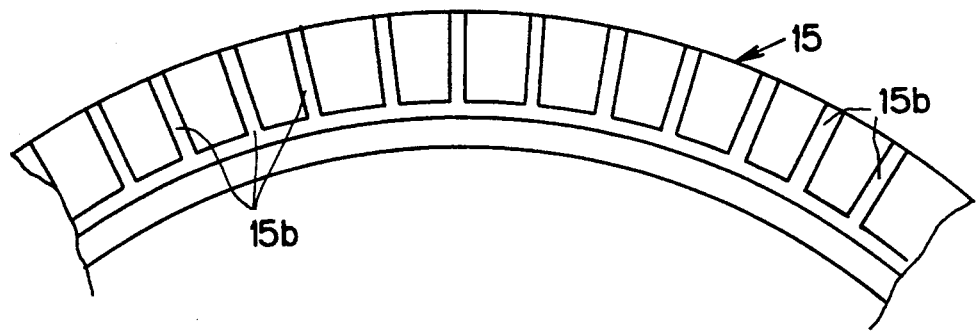
FIG. 20 is a partial front elevation showing another shape of grooves formed in another lining member.

Of the lining members 15 adhered to the lockup piston 14, moreover, the lining member 15 to take a higher pressure at the engaging time, that is, the lining member 15 to take a lower pressure at the releasing time may be formed with grooves 15b, as shown in FIG. 19 or 20. Specifically, these grooves 15b, are formed radially to extend from the outer circumferential end of the lining member 15 within a range up to the inner circumferential end and are made, if necessary, to communication through an arcuate groove.

With these grooves 15b being formed, the oil is promptly fed at the lockup OFF time through the grooves 15b to the clearance between the third damper mass 55 and the lining member 15 so that the pressure receiving area of the third damper mass 55 at the initial stage of the release, As a result, the third damper mass 55 is promptly moved to the fear side (i.e., to the right-hand side of the Figure) thereby to improve the so-called "sharpness" of the lockup clutch.

Figure 21:
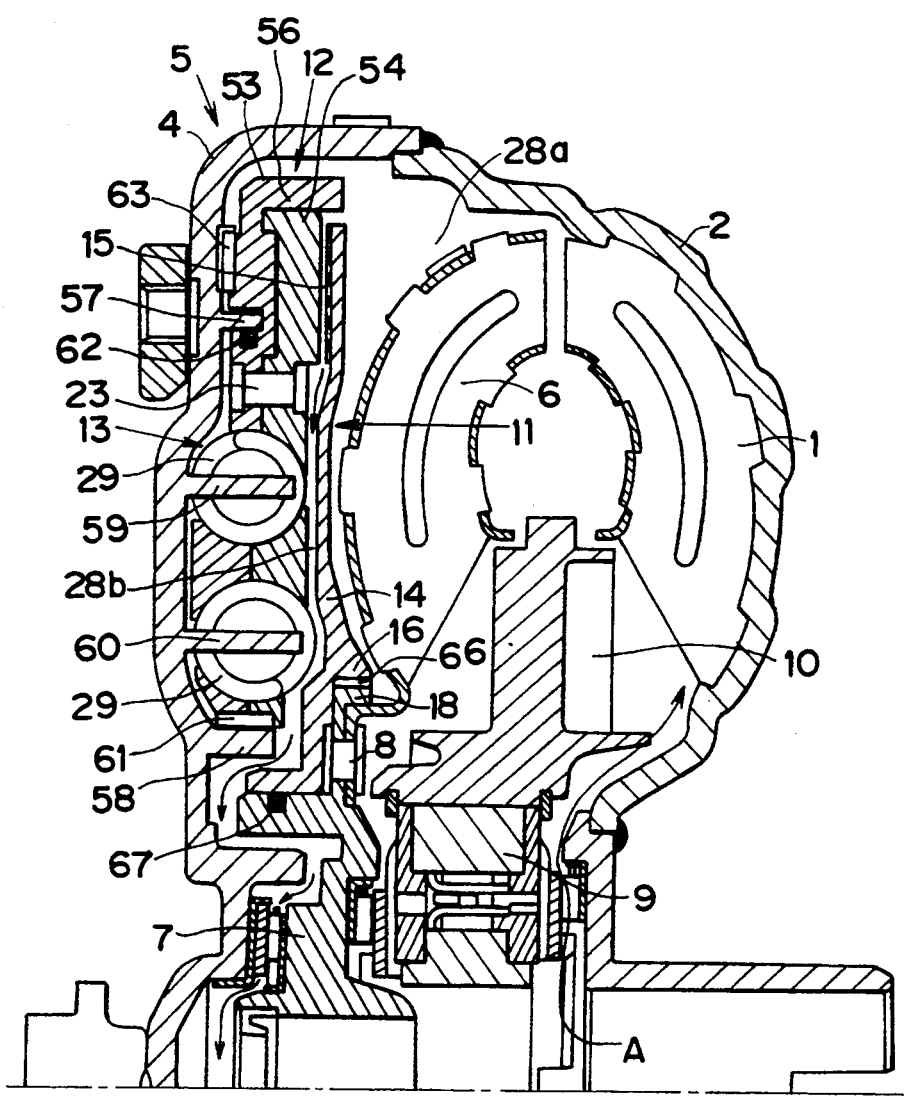
FIG. 21 is a section showing one half of an eighth embodiment as cut along the center line.

An embodiment shown in FIG. 21 eliminates the third damper mass 55 from the construction shown in FIG. 11. The torque converter shown in FIG. 21 has reduced in the engaging area of the lockup clutch 11 to one half of that of the torque converter shown in FIG. 11 but can retain the operation and effects similar to those of the torque converter shown In FIG. 11.

Figure 22:
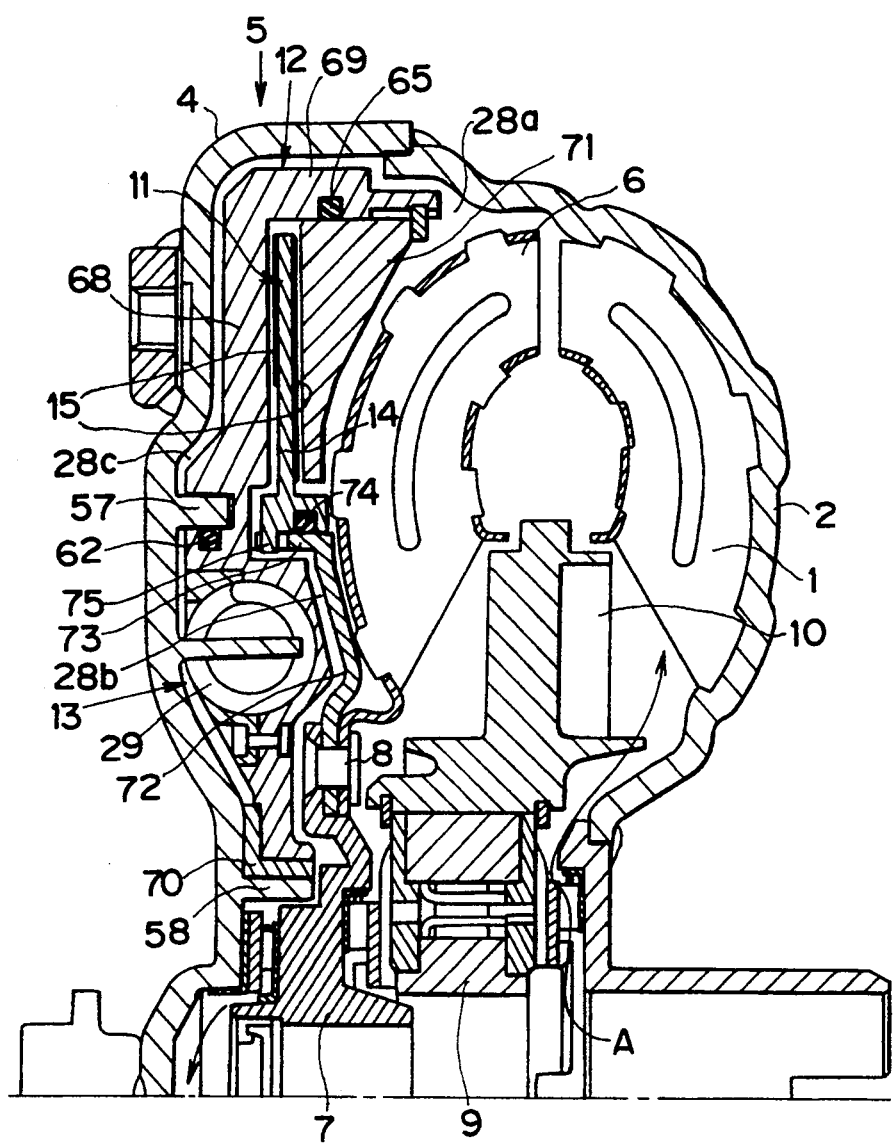
FIG. 22 is a section showing one half of a ninth embodiment, as cut along the center line.

An embodiment shown in FIG. 22 not only increases the engaging area of the lockup clutch 11 but also adopts a bushing and an oil pressure chamber as the reaction means. Specifically, a first damper mass 68 is arranged along the inner face of the front cover 4. The first damper mass 68 is formed at its outer circumferential end with an axially extending cylindrical portion 69 and is rotatably fitted through a bushing 70 on the annular projection 58 which is projected from a portion close to the center of the front cover 4, so that it is radially and axially positioned by that bushing 70. On the other hand, the front cover 4 is formed on its inner face close to the outer circumference with the other annular projection 57. The first damper mass 68 is fitted on the annular projection 57 and is sealed up by the seal ring 62. To the inner circumference of the cylindrical portion 69, moreover, there is so splined an annular second damper mass 71 which has a generally triangular or trapezoidal section as to move in the axial direction and which is sealed up by the seal ring 65.

The lockup piston 14 is interposed between those damper masses 68 and 71 and mounts the lining members 15 on its front and back faces. Incidentally, the lining member 15 at the side of the first damper mass 68 is formed with (not-shown) grooves extending from the inner circumferential end to the outer circumferential end.

The lockup piston 14 of the embodiment shown in FIG. 22 is connected to the hub 7 through an intermediate member 72. This intermediate member 72 is fixed at its inner circumferential portion on the hub 7 together with the turbine runner 6 and is formed at its outer circumference with a cylindrical portion 73 having an external diameter substantially equal to the internal diameter of the annular projection 57 close to the outer circumference of the front cover 4. The lockup piston 14 is fitted axially movably on that cylindrical portion 73 and is sealed up by a seal ring 74. As a result, the internal diameter of the third oil pressure chamber 28c between the inner face of the front cover 4 and the first damper mass 68 is equal to the internal diameter of the pressure receiving face of the lockup piston 14. Moreover, the lockup piston 14 and the intermediate member 72 are connected in a torque transmitting manner by corrugations 75 which are so formed thereon as to mesh each other in the circumferential direction. Incidentally, the remaining structure is substantially identical to that of the torque converter shown in FIG. 11, and its description will be omitted by designating the parts of FIG. 22 at the common reference numerals of the parts of FIG. 11.

As a result, the torque converter shown in FIG. 22 can have its damper mass 68 held apart from the front cover 4, when the lockup clutch 11 is engaged, and its damper mechanism 13 :increased in mass so that it is excellent in the vibration attenuating characteristics and the booming noise preventing effect.

Figure 23:
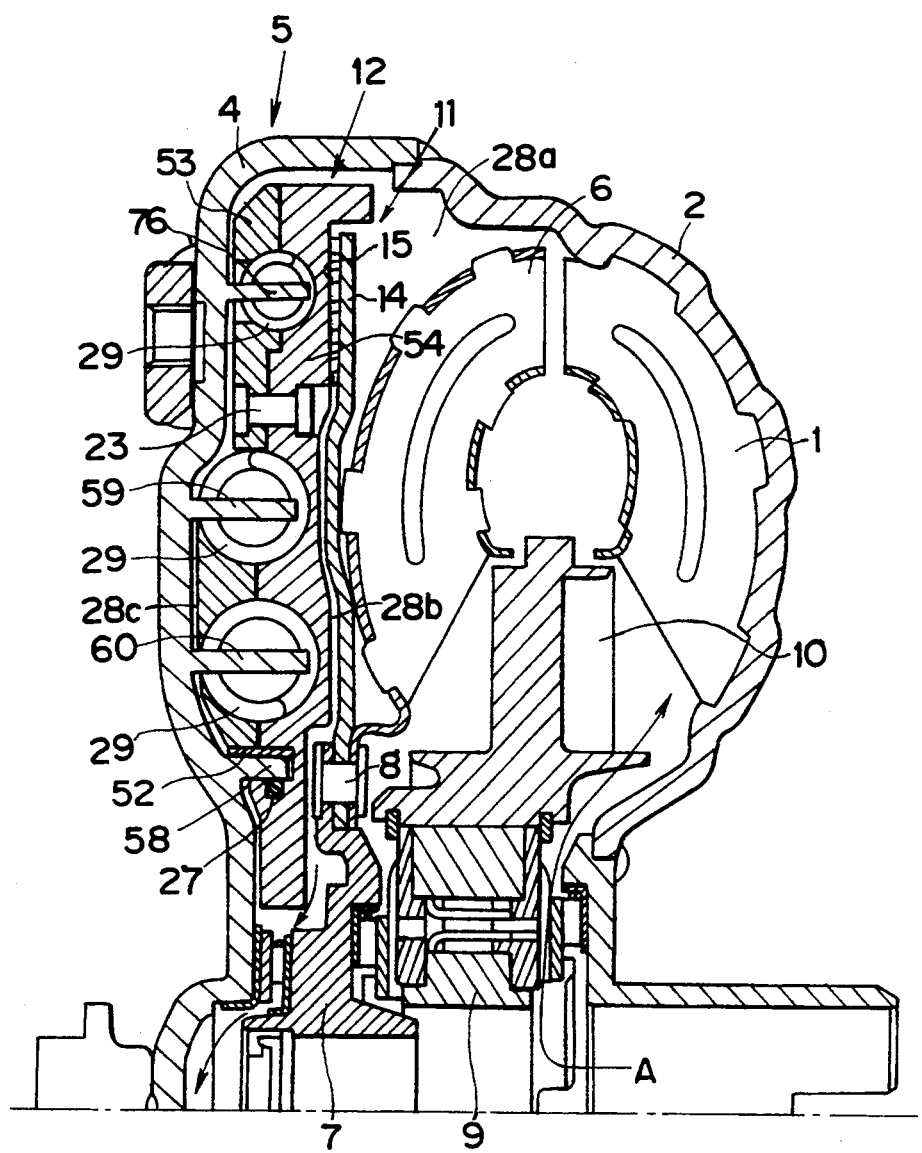
FIG. 23 is a section showing one half of a tenth embodiment, as cut along the center line.

FIG. 23 shows an improvement made over the torque converter shown in FIG. 21 such that the third oil pressure chamber 28c is adopted as the reaction means in place of the needle bearing 63. Specifically, the damper mass 12 Is tolerably Fl tied through the bushing 52 on the annular projection 58 , which is projected from a portion close to the center of the front cover 4, and is sealed up by the seal ring 27. By thus forming the sealing portion in the portion close to the center, a circumferentially discontinuous third projection 76 is formed in a portion on the inner face of the front cover 4 close to the outer circumference, so that the damper spring 29 is compressed between the third projection 76 and the damper mass 12 by bringing the third projection into contact with the two end portions of the damper spring 29 held on the damper mass 12. Incidentally, the lockup piston 14 is fixed directly on the hub 7.

Figure 24:
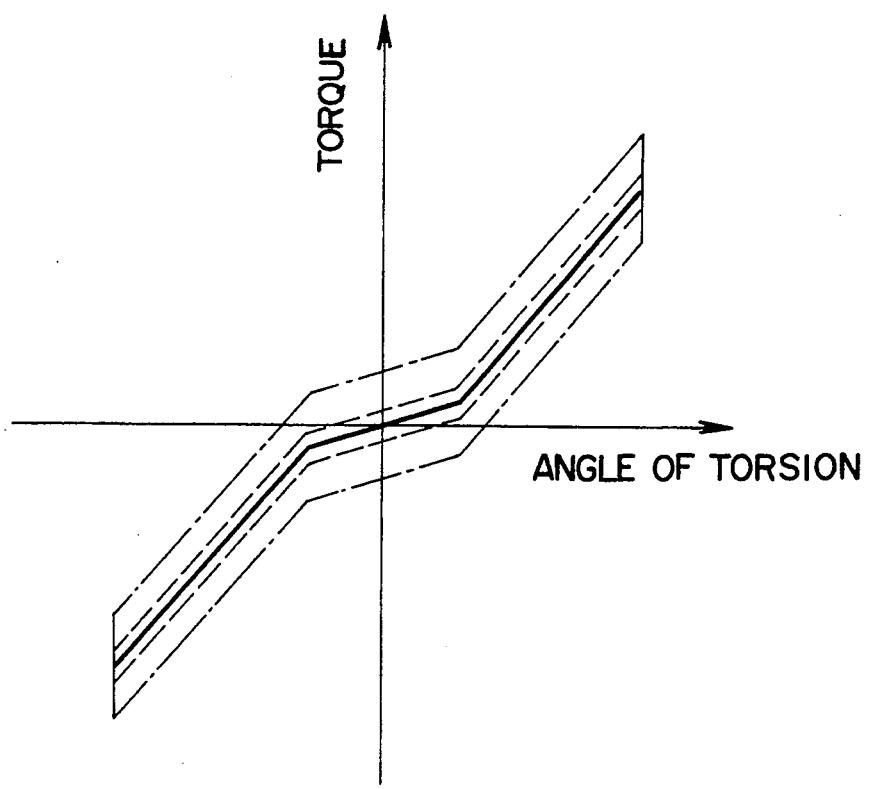
FIG. 24 is a diagram showing a relation between an angle of torsion of a damper mechanism and torque.

With time construction shown in FIG. 23, between the inner face of the front cover 4 and the damper mass 12, there is formed the third oil pressure chamber 28c, on which is acted the oil pressure for engaging the lockup clutch 11, thereby to hold the damper mass 12 apart from the front cover 4. As a result, the sliding resistance is reduced when the damper mass 12 rotates relative to the front cover 4. In other words, the damper characteristics have a small hysteresis, as has its tendency illustrated in FIG. 24. Incidentally, broken lines in FIG. 24 indicate the damper characteristics in the torque converter shown in FIG. 28, and single-dotted lines indicate the damper characteristics of the torque converter using the thrust bearing as the reaction means. Thus, the damper characteristics are improved to make an advantage in preventing the booming noise, if an oil pressure chamber or the like [laving a low frictional resistance is used as the reaction means.

The damper mechanism 13 equipped with the center plate 30 is positioned in the axial direction by the center plate 30. If the center plate 30 has its outer circumference clamped and fixed for the positioning purpose by the joined portion of the front cover 4 and the pump shell 2, the extension member 3 shown in FIG. 1 and the positioning projection 49 shown in FIG. 10 can be dispensed with to reduce the size of the torque converter. The embodiments, in which the center plate 30 is fixed by the .Joined portion of the pump shell 2 and the front cover 4, are shown in FIGS. 4, 6 and 7.

Figure 25:
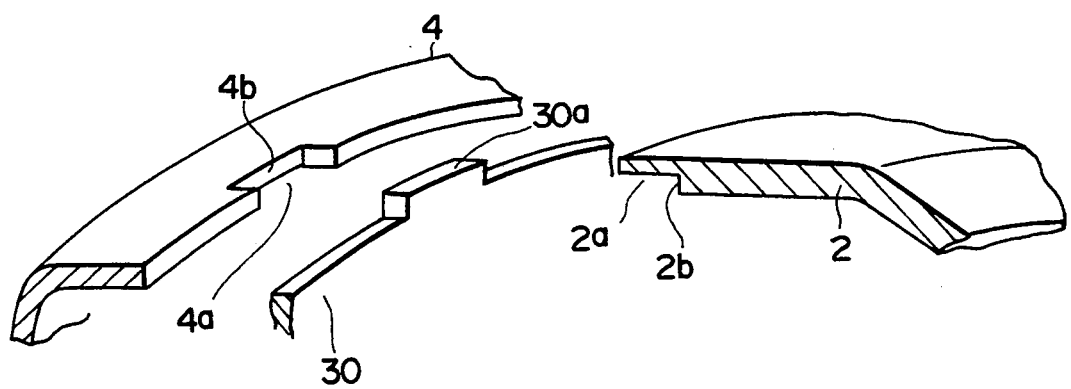
FIG. 25 is a schematic, exploded perspective view showing a portion of a structure for fixing the outer circumference of a center plate on a joined portion of a housing.

A specific structure of the joined portion of the pump shell 2 and the front cover 4 for fixing the center plate 30 is shown in FIG. 25. In FIG. 25, the leading end of the pump shell 2 has its inner circumferential portion cut throughout the circumference to substantially one half of the plate thickness thereby form a fitting portion 2a having a predetermined length in the axial direction. The front cover 4 has its external diameter set to substantially equal to the internal diameter of that fitting portion 2a thereby to fit the outer circumferential cylindrical portion of the front cover 4 closely in that fitting portion 2a. On the other hand, the leading end portion of the cylindrical portion of the front cover 4, which is bent in the axial direction, is formed at a circumferential constant pitch with notches 4a which are cut rectangularly to a depth corresponding to the plate thickness of the center p I ate 30 in the damper mechanism 13. Moreover, the center plate 30 is formed on its outer circumference with projections 30a which are spaced at a pitch equal to that of the notches 4a so that they may be fitted into the notches 4a. Thus, the front cover 4 is fitted on the inner side of the fitting portion 2a of the pump shell 2 such that its notches 4a are fitted on the projections 30a of the center plate 30.

Thus, the face 2b of the fitting portion 2a facing in the axial direction and the face 4b of the notch 4a facing in the axial direction are facing portions to abut against each other. The center plate 30 is positioned in the axial direction and integrated with the housing 5 by having its projection 30a interposed between those abutting portions.

In the torque converter having the housing 5 thus constructed, the center plate 30 is positioned between the pump shell 2 and the front cover 4, while its projection 30a formed on its outer circumference being interposed in the ,joined portion of the pump shell 2 and the front cover 4, so that neither the pump shell 2 nor the front cover 4 need be formed with any portion protruded toward the outer circumference. Thus, the torque converter can have its diameter reduced and its weight accordingly lightened.

Incidentally, the structures of the joined portion and the abutting portion between the pump shell 2 and the front cover 4 in accordance with the present invention should not be limited to those shown in FIG. 25 but may be made in the following manners.

Figure 26:
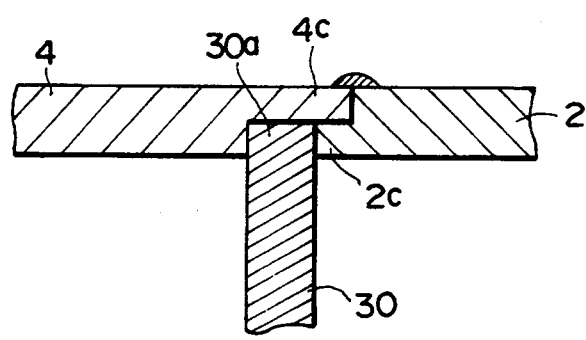
FIG. 26 is a partial section showing a portion of the structure for fixing the outer circumference of a center plate on a joined portion of a housing.

Specifically, FIG. 26 is a partial section showing another example of the joined portion between the pump shell 2 and the front cover 4. In the shown example, the pump shell 2 and the front; cover 4 have their individual end portions formed with meshing portions 2c and 4c which are adapted to mesh with each other in the thickness direction of the plate. The center plate 30 has its projection 30a inserted on the inner circumferential side of the meshing portion 4c of the front cover 4 and its side abutting against the meshing portion 2c of the pump shell 2. As a result, the center plate 30 is axially positioned by the joined portion of the pump shell 2 and the front cover 4 and is integrated with the housing 5. In this example shown in FIG. 26, the aforementioned meshing port ions 2c and 4c provide the abutting portions facing in the axial direction to hold the center plate 30.

Figure 27:
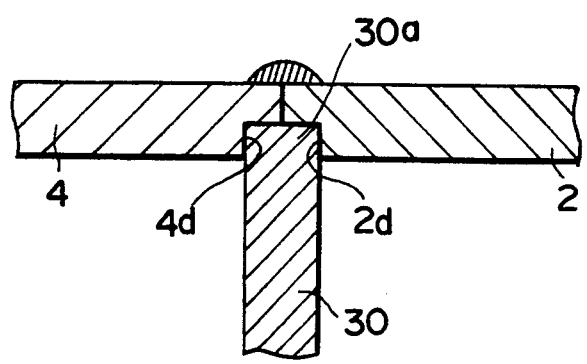
FIG. 27 is a partial section showing a portion of another structure for fixing the outer circumference of a center plate on a joined portion of a housing.

In an example shown in FIG. 27, on the other hand, the pump shell 2 and the front cover 4 have their individual end portions formed with notches 2d and 4d which are one half as deep as the plate thickness. With the pump shell 2 and the front cover 4 being abut-welded to each other, their notches 2d and 4d clamp the projection 30a of the center plate 30 in between. In this structure shown in FIG. 27, the aforementioned notches 2d and 4d provide the abutting portions so that the center plate 30 is axially positioned by having its projection 30a interposed between those notches 2d and 4d.

Figure 28:
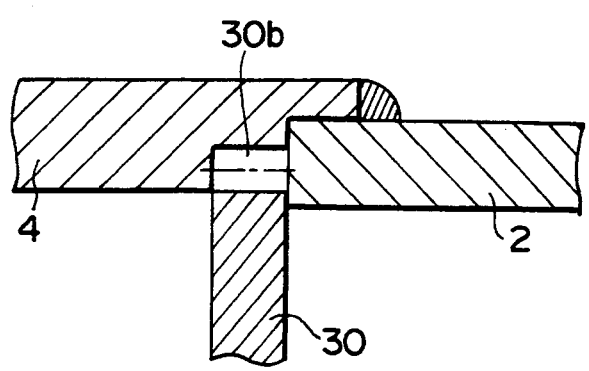
FIG. 28 is a partial section showing a portion of still another structure for fixing the outer circumference of a center plate on a joined portion of a housing.

In an example shown in FIG. 28, furthermore, the inner face of the end portion of the front cover 4 and the outer circumference of the center plate 30 form a spline 30b, by which the center plate 30 is engaged with the front cover 4. In this state, the center plate 30 has its side face pushed in the axial direction by the end portion of the pump shell 2 which is inserted into the front cover 4. Thus, in this structure shown in FIG. 28, too, the center p late 30 is axially clamped and positioned by the front cover 4 and the pump shell 2.

In any of those structures shown in FIGS. 26 to 28, no factor resides for protruding the housing 5 to the outer circumferential side so that the torque converter can be reduced in diameter and weight.

In the foregoing individual embodiments equipped with the third oil pressure chamber 28c, the damper mechanism 13 is so supported that it may not move in the axial direction. However, the damper mechanism 13 or at least the damper mass 12 is preferably moved so some extent in the axial direction. This is because the engaging/releasing operation of the lockup clutch 11 is accelerated to improve the responsiveness. This acceleration is caused by the fact that the lockup piston 14 and the damper mass 12 approach each other to engage the lockup clutch 11 if the oil pressure is fed to the first oil pressure chamber 28a and the third oil pressure chamber 28c whereas the lockup piston 14 and the damper mass 12 leave each other to release the lockup clutch 11 if the oil pressure is fed to the second oil pressure chamber 28b.

Figure 29:
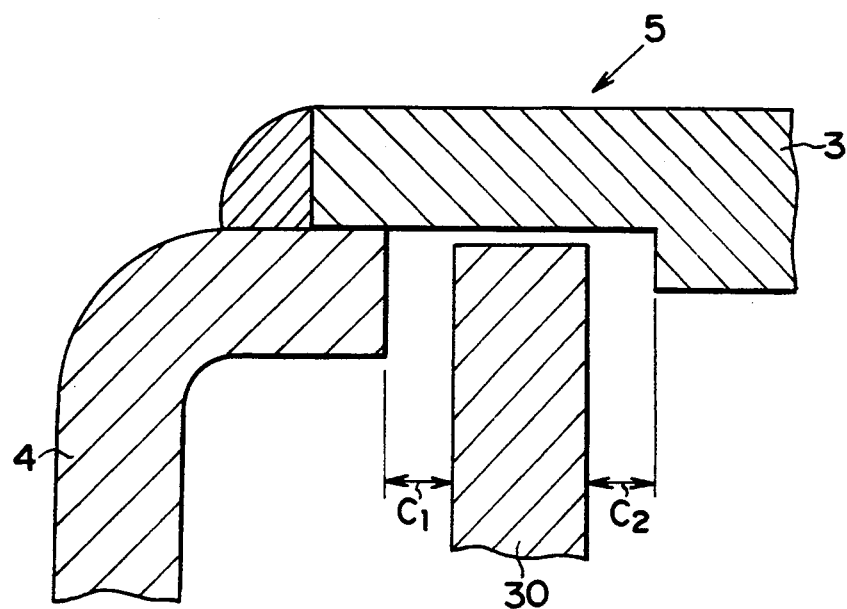
FIG. 29 is a partial section showing the state in which clearances are established at the two sides of an outer circumferential portion of a center plate.

FIG. 29 show an example in which the engaging portion of the center plate 30 and the housing 5 shown in FIG. 1 is improved. Specifically, the center plate 30 has its outer circumference meshing with the housing 5 and is formed with predetermined clearances $C_1$ and $C_2$ at its two axial sides. As a result, the damper mass 12 is allowed to move together with the center plate 30 in the axial direction within the range of those clearances $C_1$ and $C_2$.

In the torque converter having the structure shown in FIG. 29 but the remaining structure left identical to that shown in FIG. 1, the lockup clutch 11 has its responsiveness improved. Specifically, in case the lockup clutch 11 is to be engaged, the oil pressure is fed to the first oil pressure chamber 28a and Is discharged from the second oil pressure chamber 28b, as In the embodiment shown in FIG. 1. As a result, the lockup piston 14 is moved toward the damper mass 12.

If the pressure receiving area of the lockup piston 14 is designated at S, the supply pressure is designated at Pa, and the drain pressure is designated at Pb, the following pressure is applied to the lockup piston 14:

$$Fp = S \cdot |Pa - Pb|.$$

Hence, the lockup piston 14 has a moving velocity Vp, as expressed by:

$$Vp = (Fp/Mp) \cdot t$$

(Mp: mass of lockup piston; and t: time ) .

On the other hand, the pressure in the third oil pressure chamber 28c is equal to that in the first oil pressure chamber 28a. Since, moreover, the radius R12 of the inner circumferential scaling portion defining the third oil pressure chamber 28c and the radius R14 of the inner circumferential sealing portion of the first oil pressure chamber 28a are equal, the damper mass 12 receives a force equal to the force for pushing the lockup piston 14 so that the damper mechanism 13 moves in its entirety toward the lockup piston 14.

The damper mass 12 receives the following pushing force:

$$Fd = S \cdot |Pa - Pb|.$$

On the other hand, since the elastic force by the friction plate 32 is axially applied to the damper mechanism 13, this damper mechanism 13 has the following moving velocity Vd if the elastic force is designated at Ff:

$$Vd=\{(Fp+Ff)/Md\}\cdot t$$

(Md: mass of damper mechanism).

Thus, the lockup piston 14 and the damper mechanism 13 approach each other at a predetermined velocity until they come into torque transmitting contact with each other. In case the damper mechanism 13 is fixed in the axial direction, Vd=0, as will be apparent from the comparison, the time period required for the lockup clutch 11 to engage is shortened by the component of the aforementioned velocity so that the aforementioned torque converter can have its responsiveness improved, even if the stroke for the lockup clutch 11 to engage is long.

In case, on the other hand, the lockup clutch 11 is to be released, the internal oil pressure in the first oil pressure chamber 28a and the third oil pressure chamber 28c is lower than the oil pressure in the second oil pressure chamber 28b so that the lockup piston 14 and the damper mass 12 having been contacting with each other simultaneously move apart from each other. As a result, the lockup clutch 11 is promptly brought into the released state to have its responsiveness improved. Specifically, the responding rate of the lockup clutch 11 at the releasing time is accelerated by the component of the following moving velocity of the damper mechanism 13:

$$Vd=\{(Fp-Ff)/Md\}\cdot t.$$

Figure 30:
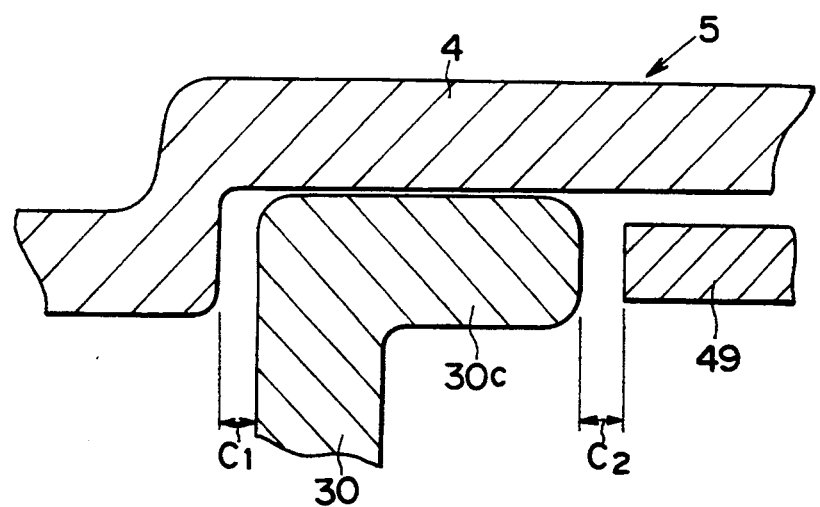
FIG. 30 is a partial section showing the state in which clearances are established at the two sides of an engaged portion of the outer circumference of a center plate.

On the other hand, FIG. 30 shows an example in which the engaging portion between the center plate 30 and the housing 5 of the torque converter shown in FIG. 9 is improved. In FIG. 30, the center plate 30 is formed on its outer circumference with an engagement portion 30c which is bent toward the positioning projection 49. The center plate 30 is so engaged with the inner face of the housing 5 by that engagement portion 30c as to rotate together. Moreover, at both the front and back sides of the engagement portion 30c in the axial direction, that is, between the engagement portion 30c and the positioning projection 49 and front cover inner face, there are set the predetermined clearances $C_1$ and $C_2$, as shown in an enlarged scale in FIG. 30. As a result, the damper mechanism 13 is allowed to move in the axial direction to extents corresponding to those clearances $C_1$ and $C_2$. The remaining construction is identical to that shown in FIG. 1.

Thus, if the oil pressure is fed to engage the lockup clutch 11, the lockup piston 14 and the damper mechanism 13 move toward each other. If, on the other hand, the oil pressure is fed to release the lockup clutch 11, time lockup piston 14 and the damper mechanism 13 move apart from each other. As a result, the lockup clutch 11 can have its control responsiveness improved.

Figure 31:
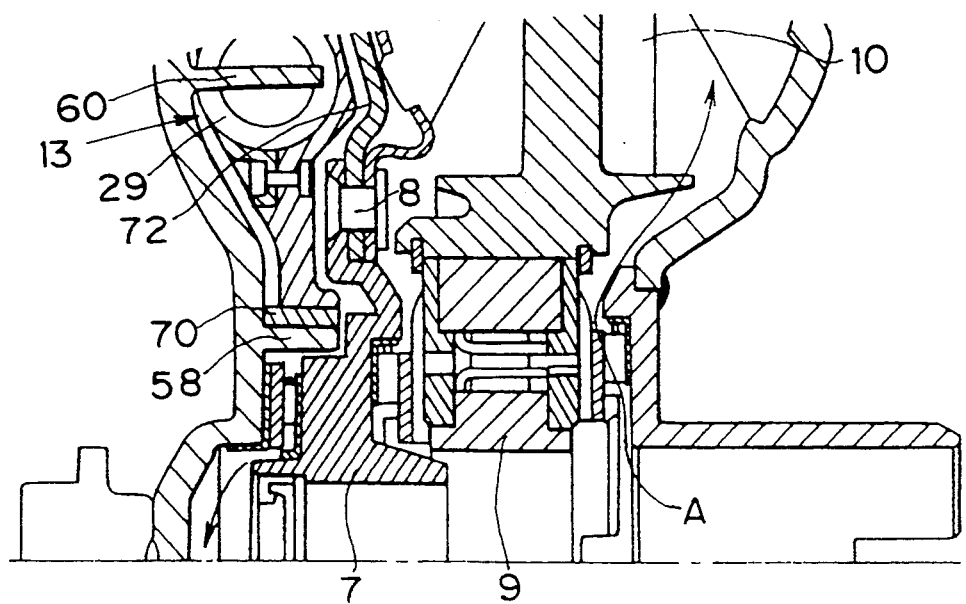
FIG. 31 is a partial section showing a structure for positioning only in a radial direction by replacing it by a bush fitting a damper mechanism of FIG. 22 therein.

In the aforementioned torque converter shown in FIE. 22, too, the responsiveness of the lockup clutch is improved if time damper mass 68 is moved in the axial direction. In order to move the damper mass 68 in the axial direction, the portion of the bushing 70 for the axial positioning may be removed so that the bushing may support the damper mass 68 only in the radial direction. This example is shown in FIG. 31.

Incidentally, the damper mechanism 13 is supported by the front cover 4 or the hub 7, as has been described in the foregoing individual embodiments. The following advantages can be obtained from the torque converter in which the damper mechanism 13 is supported by the hub 7.

Figure 32:
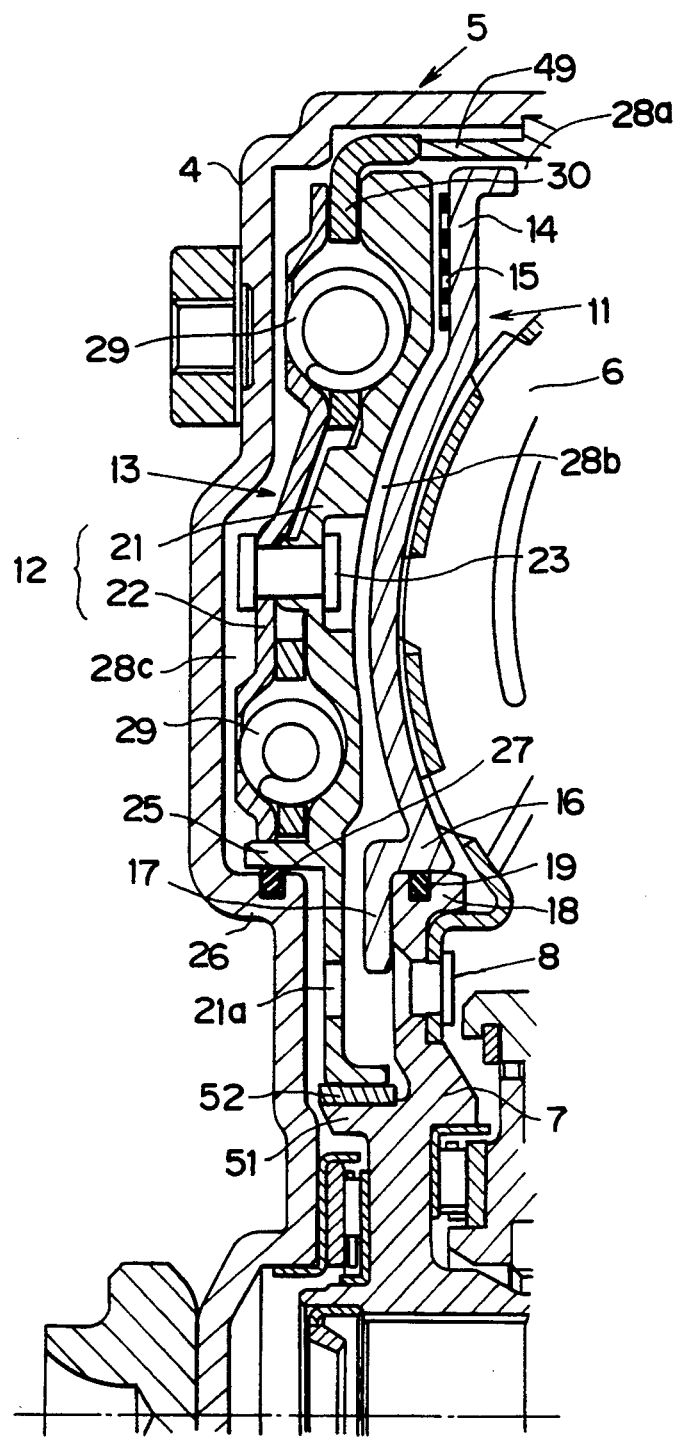
FIG. 32 is a partial section showing a support structure of a damper mechanism shown in FIG. 10.

The embodiment of the torque converter having its damper mechanism 13 supported by the hub 7 is shown in FIG. 10, and the support structure of the damper mechanism 13 1 s shown in an enlarged scale in FIG. 32. As shown in FIG. 32, the boss 26 in the front cover 4 and the annular projection 25 in the main member 21 are fitted out of contact. Moreover, these boss 26 and annular projection 25 are sealed up by means of the seal ring 27. On the boss 51 formed at a portion closer to the center of the hub 7, on the other hand, there is rotatably fitted the damper mass 12 through the bushing 52. As a result, the damper mechanism 13 is supported by the hub 7 so that it is radially positioned. Moreover, the main member 21 is formed with a through hole 21a for smoothing the feed and discharge of the oil to and from the second oil pressure chamber 28b.

In the torque converter having the structure shown in FIG. 32, the lockup clutch 11 is engaged. If the force for pushing the lining member 15 onto the main member 21 is so sufficient as to provide a sufficiently large torque transmission capacity for the torque inputted, there is established a complete lockup state, in which the torque is transmitted without any slip of the lining member 15. If, on the contrary, the torque transmission capacity is small for the input torque, there is established a half lockup state, in which the torque is transmitted width a slip of the lining member 15. No matter which the state might be in the complete or hall f lockup state, the lockup piston 14 and the main member 21 engaged by the former rotate in the same direction. Since the lockup piston 14 and the main member 21 are so fitted on the common member, i.e., the hub 7 as to be positioned on a common axis, they are rotated on a common center axis even if the front cover 4 and the output shaft having the hub 7 are offset from each other. As a result, no radial slip is caused between the lockup piston 14 and the main member 21. In the aforementioned torque converter, moreover, the damper mechanism 13 is held by the hub 7, but the main member 21 and the front cover 4 are not fitted. As a result, little torque is transmitted from the front cover 4 through the damper spring 29 to the lockup clutch 11, so that time booming noise can be suppressed.

Figure 33:
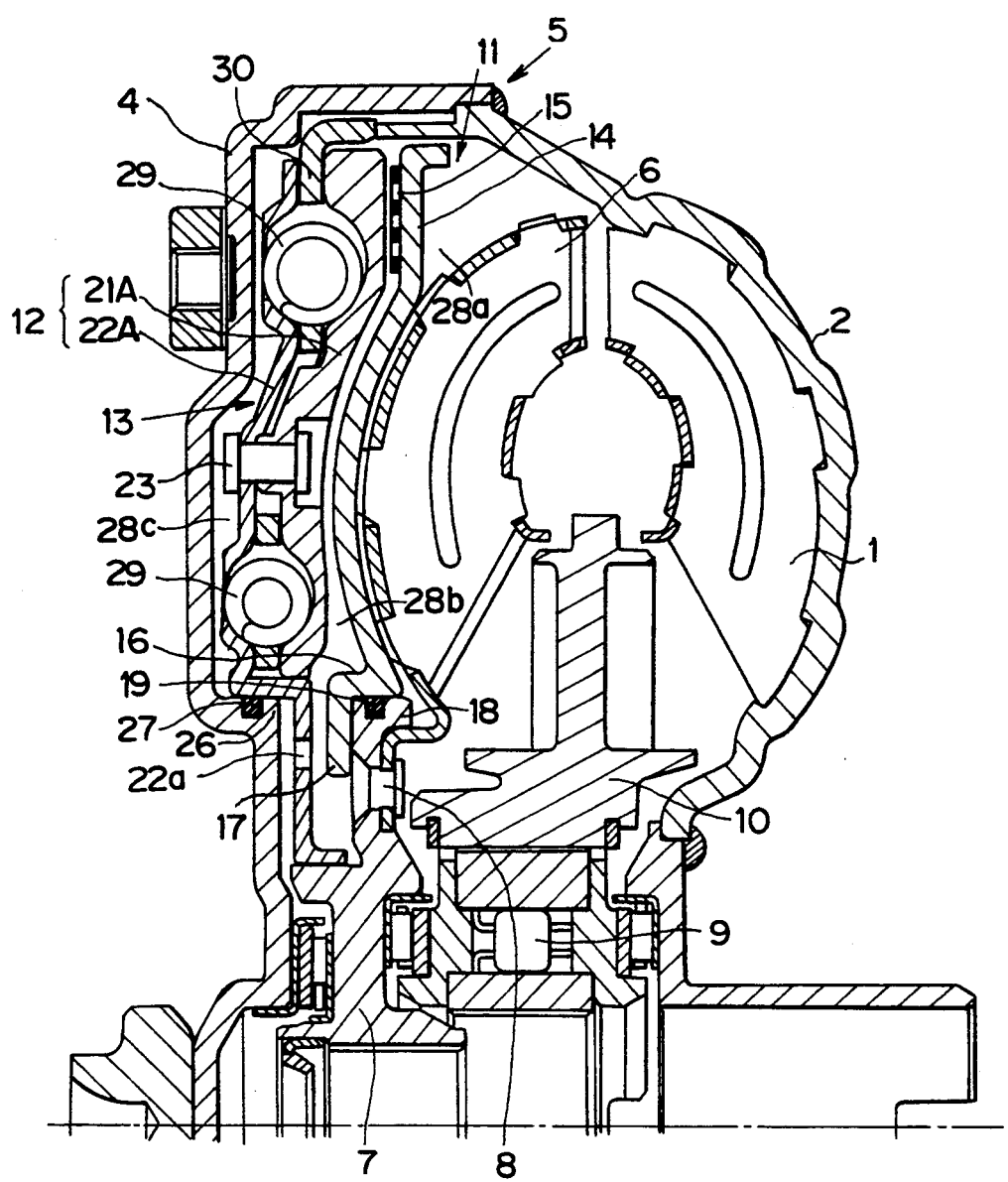
FIG. 33 is a section showing one half of an eleventh embodiment, as cut along the center line.

In an embodiment shown in FIG. 33, the internal diameter of a main member 21A of the damper mass 12 is enlarged, but the internal diameter of a cover member 22A is reduced by extending its inner circumferential portion toward the center. And, the damper mechanism 13 is held by the hub 7 by fitting that cover member 22A directly and rotatably on the hub 7. Moreover, a through hole 22a for retaining the oil passage is formed in the cover member 22A. Thanks to the extension of time cover member 22A toward the center, furthermore, the cover member 22A and the front cover 4 are fitted out of contact at a portion slightly closer to the outer circumference than the aforementioned through hole 22a and are seal ed up by means of the seal ring 27. The remaining construction is substantially identical to that of the embodiment shown in FIG. 10 or FIG. 32.

In this construction shown in FIG. 33, too, the lockup piston 14 and the damper mass 12 to be enlarged by the former are held on time same member, i.e., the hub 7 on the common axis, so that the lockup piston 14 and the damper mass 12 are not offset relative to each other while preventing any radial slip that might otherwise be caused by time offset. Moreover, the torque or vibration can be prevented from being transmitted from the front cover 4 to the lockup clutch 11 not through the damper spring 29, thereby to suppress the booming noise. Furthermore, the construction shown in FIG. 33 is not equipped with the bushing between the hub 7 and the cover member 22A so that it can have its parts number reduced and its weight lightened.

Figure 34:
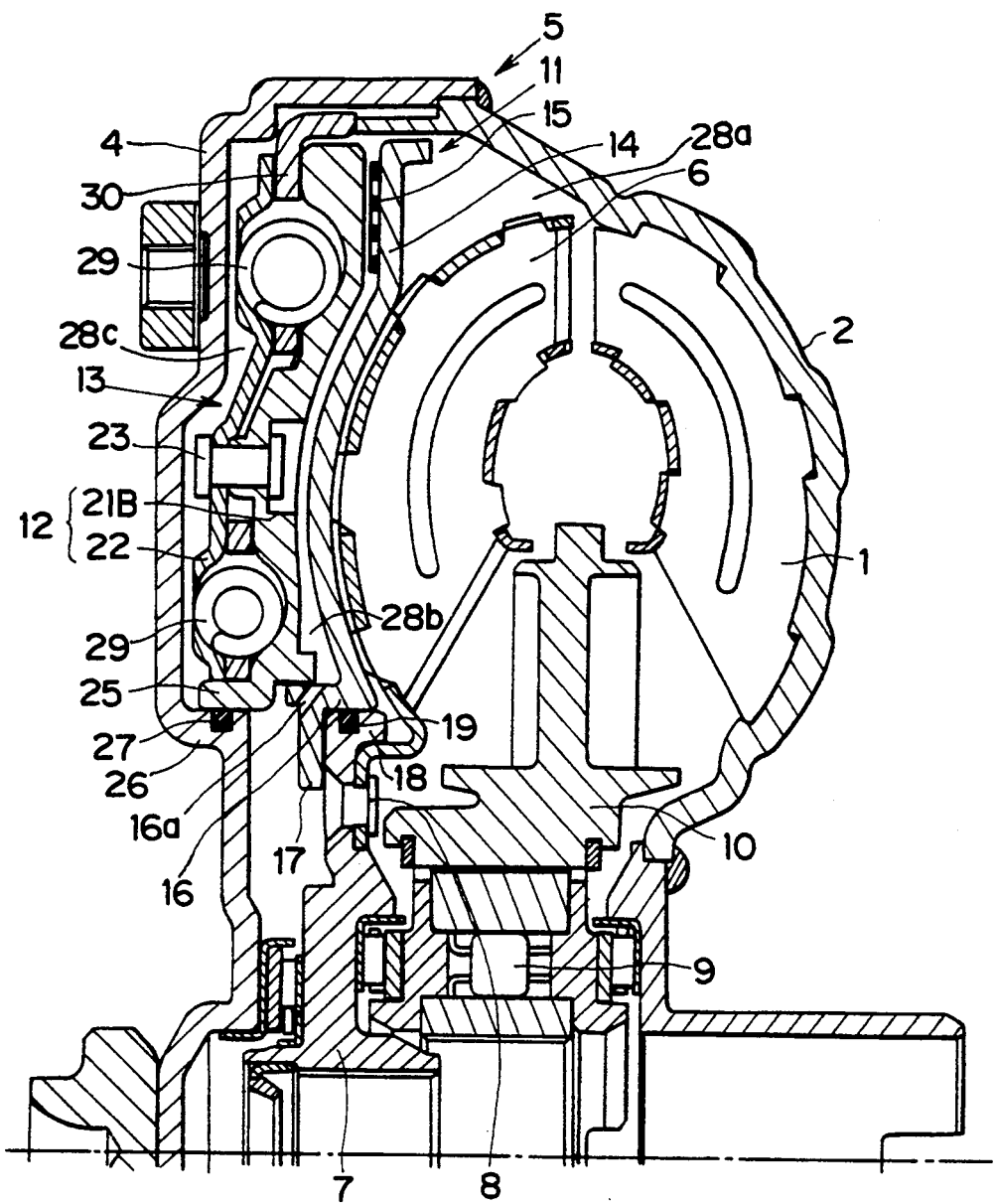
FIG. 34 is a section showing one half of a twelfth embodiment, as cut along the center line.

FIG. 34 shows a further embodiment of the present invention. This embodiment is constructed such that the damper mass 12 of the damper mechanism 13 is held on the hub 7 through the lockup piston 14. Specifically, a main member 21B in the damper mass 12 is fitted not on the hub 7 but rotatably on the outer circumference of the cylindrical portion 16 of the lockup piston 14, and a through hole 16a for retaining the oil passage is formed obliquely through that cylindrical portion 16. The remaining construction is substantially identical to that of the embodiment shown in FIG. 33.

In this construction shown in FIG. 34, the lockup piston 14 and the damper mass 12 frictionally contacting with each other are substantially held on the hub 7 and are out of contact with the front cover 4 so that the embodiment of FIG. 34 can prevent an excessive slip of the lining member 15 and the booming noise.

In the foregoing embodiments of FIGS. 33 and 34, too, the bearing to be used for holding the damper mechanism on the front cover can be dispensed with to reduce the parts number and lighten the weight accordingly.

Incidentally, as is apparent from the foregoing individual embodiments, the damper mass 12 rotates together with the front cover 4 even when the lockup clutch 11 is released. Thus, if the damper mass 12 is integrally connected to the front cover 4 at the time of low speed rotation for releasing the lockup clutch 11, it can act as a flywheel for suppressing the fluctuation of the engine torque, i.e., the fluctuation of the input torque. The means for this operation will be described in the following.

Figure 35A:
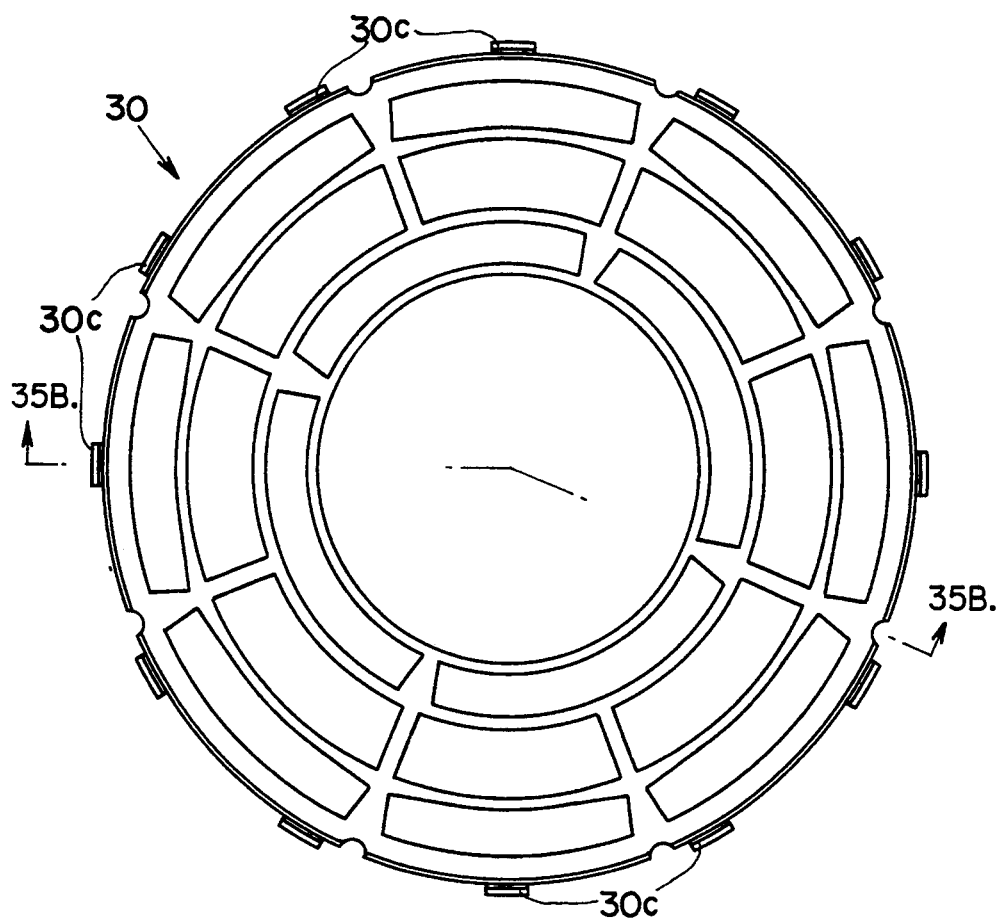
FIG. 35A is a front elevation showing a center plate.
Figure 35B:
FIG. 35B is a section taken along line B—B of FIG. 35A.

FIGS. 35A and 35B show the center plate 30 to be used in the torque converter shown in FIG. 9. This center plate 30 is a generally annular plate member in its entirety, as shown, and is formed with a number of apertures for arranging the damper springs 29 or the rivets. Moreover, the center plate 30 is formed in its outer circumference with a plurality of engagement portions 30c, which are protruded toward the outer circumference and bent in the axial direction and which are spaced at a constant pitch in the circumferential direction. The center plate 30 is rotated together with the front cover 4 by engaging those engagement portions 30c in the recesses which are formed in the inner circumference of the cylindrical portion of the front cover 4. Incidentally, the center plate 30 is positioned in the axial direction by bringing the axial leading ends of the engagement; portions 30c against the leading ends of the positioning projections 49 of the aforementioned intermediate member 50.

Figure 36A:
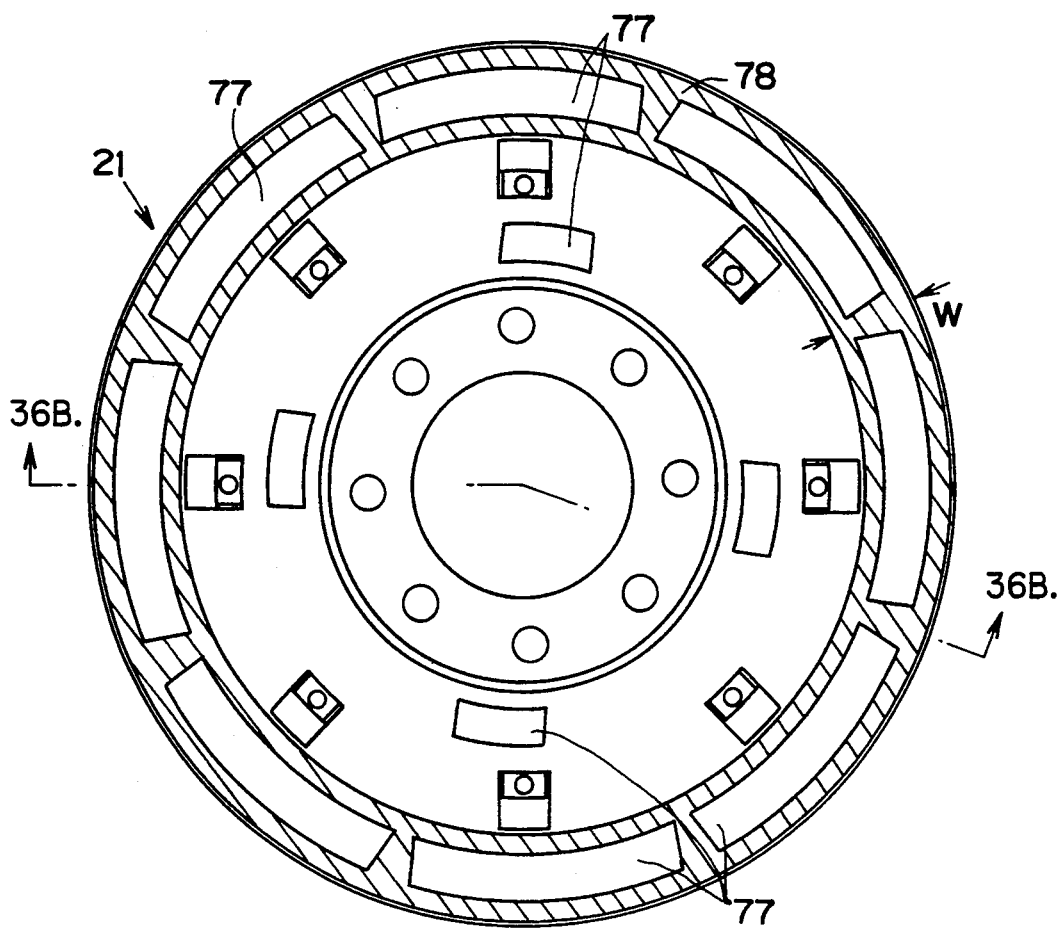
FIG. 36A is a front elevation showing a main member formed with engagement means.
Figure 36B:
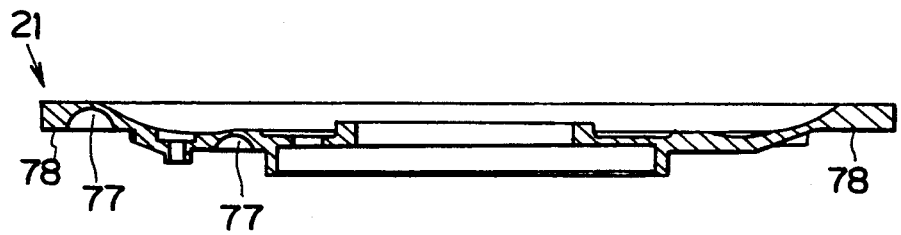
FIG. 36B is a section taken along line B—B of FIG. 36A.
Figure 37A:
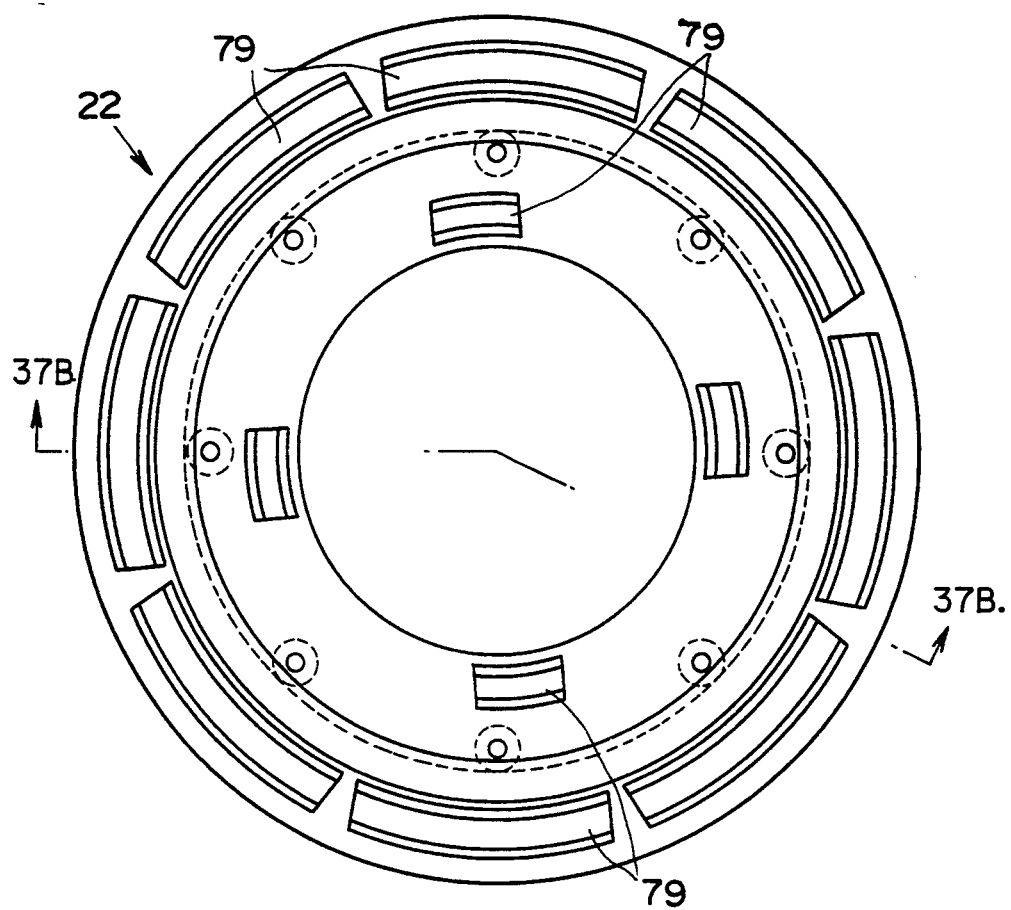
FIG. 37A is a front elevation showing a cover member.
Figure 37B:
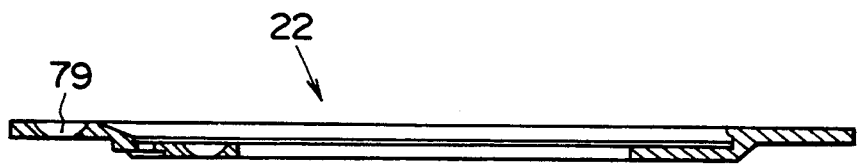
FIG. 37B is a section taken along line B—B of FIG. 37A.

On the other hand, FIGS. 36A and 36B show the main member 21 which is to be used with the aforementioned center plate 30. This member 21 is also a generally annular plate member, as shown, and has its outer circumferential portion made so thick as to increase the inertial moment. The main member 21 is formed, at the outer and inner circumferential portions of its face facing the center plate 30, with a plurality of recesses 77 for receiving the damper springs 29. Moreover, the face of the main member 21 facing the center plate 30 is equipped at its outer circumference (i.e., a widthwise portion, as indicated at reference letter W in FIG. 36A) with engagement means such as a frictional member, a molybdenum sprayed layer or a knurled frictional face. Still moreover, FIGS. 37A and 37B show the cover member 22. As shown in these Figures, the cover member 22 is a thin annular member, which is formed at its side facing the main member 21 with recesses 79 corresponding to the aforementioned recesses 77.

The torque converter using time aforementioned center plate 30, main member 21 and cover member 22 is assembled, as shown i n FIG. 9. In this torque converter, in case the oil pressure is fed to the second oil pressure chamber 28b to release the lockup clutch 11, the pressure for pushing the main member 21 onto the center plate 30 is applied to the main member 21 in the damper mass 12 so that the main member 21 is moved toward the center pl ate 30 until it is pushed onto the center plate 30 . Since the main member 21 is equipped with the aforementioned engagement means 78, the main member 21 and time center plate 30 are substantially integrated in the rotational direction by time frictional force of the engagement means 78. Specifically, the damper mass 12 is connected to the engine through not the damper springs 29 but the front cover 4 so that the function of the main member 21 as the flywheel for the engine can be enhanced to suppress the torque and rotational Fluctuations of the engine effectively.

In case the oil pressure is fed to the first oil pressure chamber 28a so as to engage the lockup clutch 11, the main member 21 in the damper mass 12 moves apart from the center plate 30 so that it smoothly rotates relative to the center plate 30.

Figure 38:
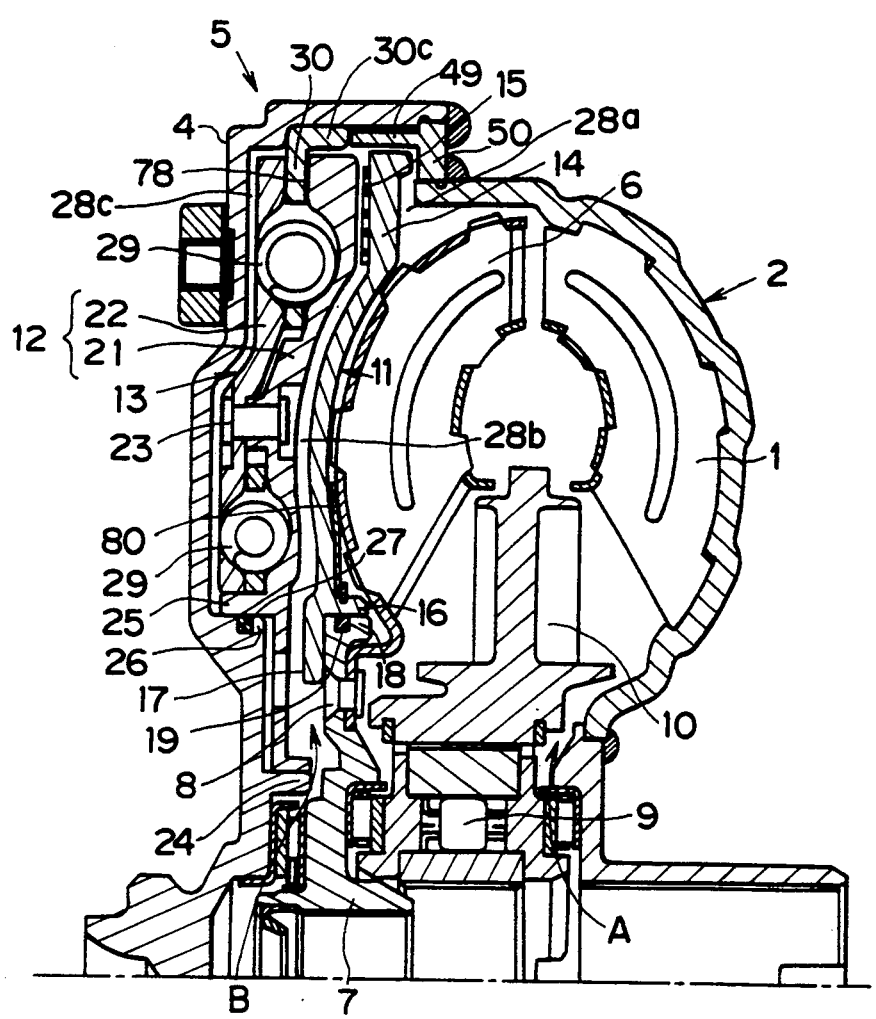
FIG. 38 is a section showing one half of a thirteenth embodiment, as cut along the center line.

An embodiment, in which the joining force of the main member 21 and the center plate 30 by the aforementioned engagement means 78 is strengthened, is shown in FIG. 38. The torque converter, as shown, uses the center plate 30 shown in FIGS. 35A and 35B, the main member 21 shown in FIGS. 36A and 36B, and the cover member 22 shown in FIGS. 37A and 37B. Moreover, the whole construct i on is substantially similar to that shown in FIG. 9. Hence, the same portions as those of FIG. 9 are designated at the common reference numeral s so that their description will be omitted. Between the lockup clutch 14 and the turbine runner 6, as shown in FIG. 38, there is arranged an elastic member 80 of a coned disc spring for pushing the lockup piston 14 onto the damper mechanism 13. This elastic member 80 is fixed on the boss 18 of the lockup piston 14 by means of a snap ring. In the construction shown in FIG. 38, therefore, the oil pressure for separating the lockup piston 14 apart from the main member 21 to release it has to be a pressure for moving the lockup piston 14 rightward of FIG. 38 against the elastic force of the elastic member 80. Thus, the pressure for acting upon the main member 21 with the lockup piston 14 being released rises according to the elastic force of the elastic member 80 so that the engaging force of the center plate 30 by the main member 21 is strengthened to ensure the torque transmission between the two.

Figure 39:
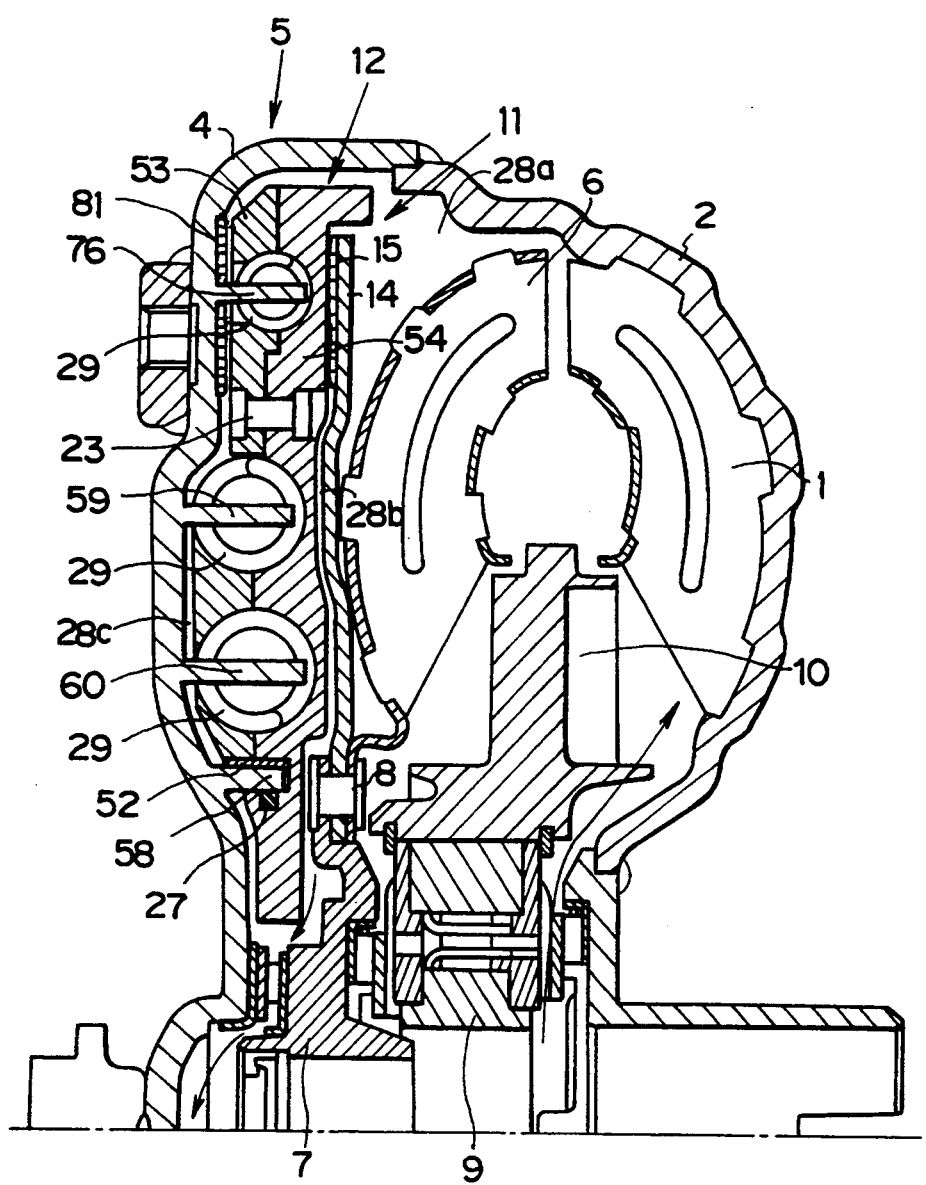
FIG. 39 is a section showing one half of a fourteenth embodiment, as cut along the center line.

FIG. 39 shows an embodiment, in which the engaging means for integrating the clamper mass 12 and the front cover 4 is added to the aforementioned torque converter shown in FIG. 23. In the torque converter shown in FIG. 39, a friction material 81 is mounted as the engagement means on the inner face of the front cover 4 facing the damper mass 12. In case the damper mass 12 1 s pushed onto the front cover 4 by the oil pressure acting to release the lockup clutch 11, the front cover 4 and the damper mass 12 are substantially integrated in the rotational direction by that friction member 81. The remaining construction is identical to that shown in FIG. 23.

Figure 40:
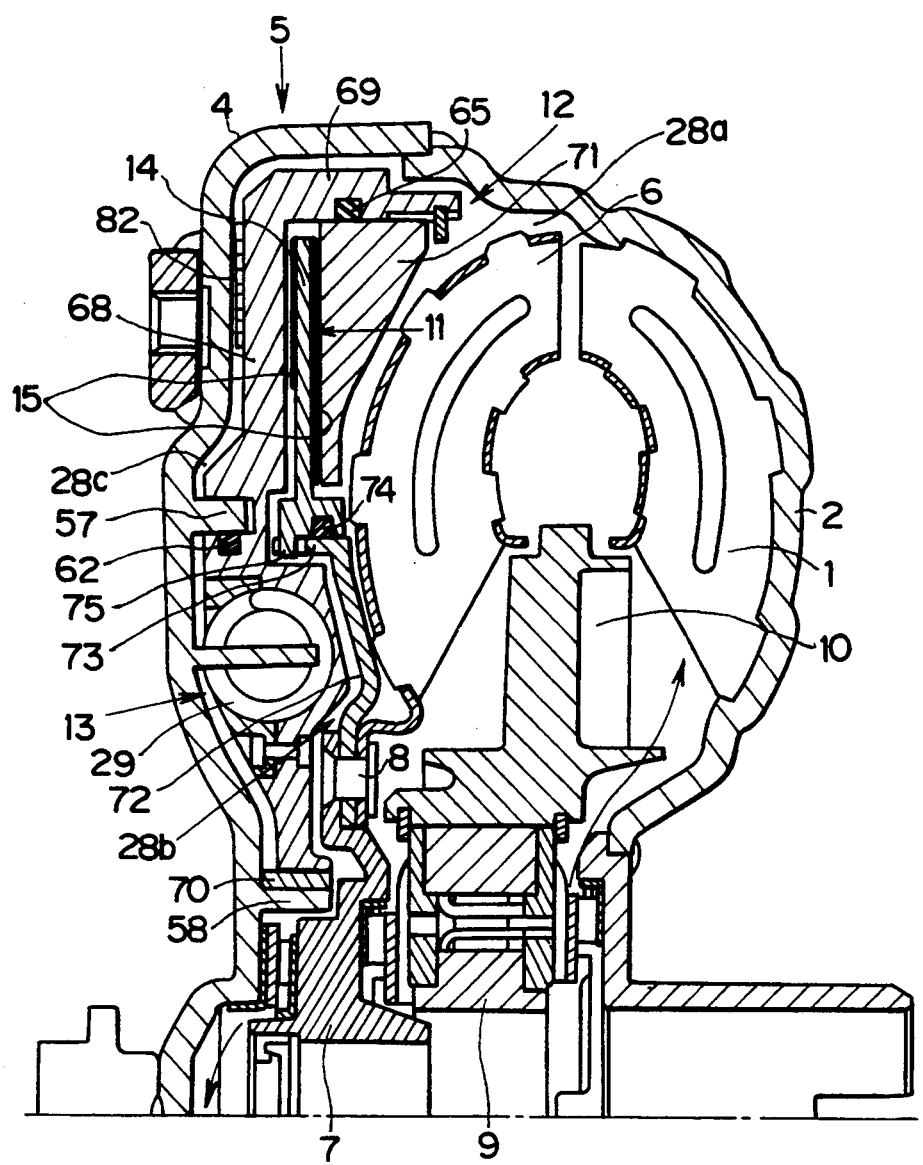
FIG. 40 is a section showing one half of a fifteenth embodiment, as cut along the center line.

FIG. 40 shows an embodiment, in which the engagement means is added to the torque converter shown in FIG. 22. In the torque converter shown in FIG. 40, the damper mass 12 is so supported as to move in the axial direction by the bushing 70 which has been described with reference to FIG. 31. Moreover, a friction member 82 for the torque transmission is mounted as the engagement means on the outer circumference of the damper mass 12 facing the front cover 4. The remaining construction is similar to that of the embodiment shown in FIG. 22 so that its description will be omitted by designating the parts of FIG. 40 at the common reference numerals of those of FIG. 22.

In either of the aforementioned torque converters shown in FIGS. 39 and 40, i F the oil pressure is fed to release the lockup clutch 11, the damper mass 12 is moved toward the front cover 4 and is connected in a torque transmitting manner to the front cover 4 through the friction members 81 and 82 so that the it can substantially completely act as the flywheel for the input torque.

In the aforementioned torque converter shown in FIG. 38, the oil pressure for feeding the second oil pressure chamber 28b Lo release the lockup clutch 11 has to be raised, but the oil pressure to be fed to the first oil pressure chamber 28a can be lowered in accordance with the elastic force of the elastic member 80 so as to engage the lockup clutch 11. Thus, the oil pressure to be fed to the first oil pressure chamber 28a can be lowered if the elastic force for pushing the lockup piston 14 onto the damper mass 12 is strengthened to some extent. As a result, the expansion of the housing 5 and the compression of bubbles in the oil can be suppressed to improve the control responsiveness of the lockup clutch 11. Moreover the control of the half lockup is facilitated.

Figure 41:
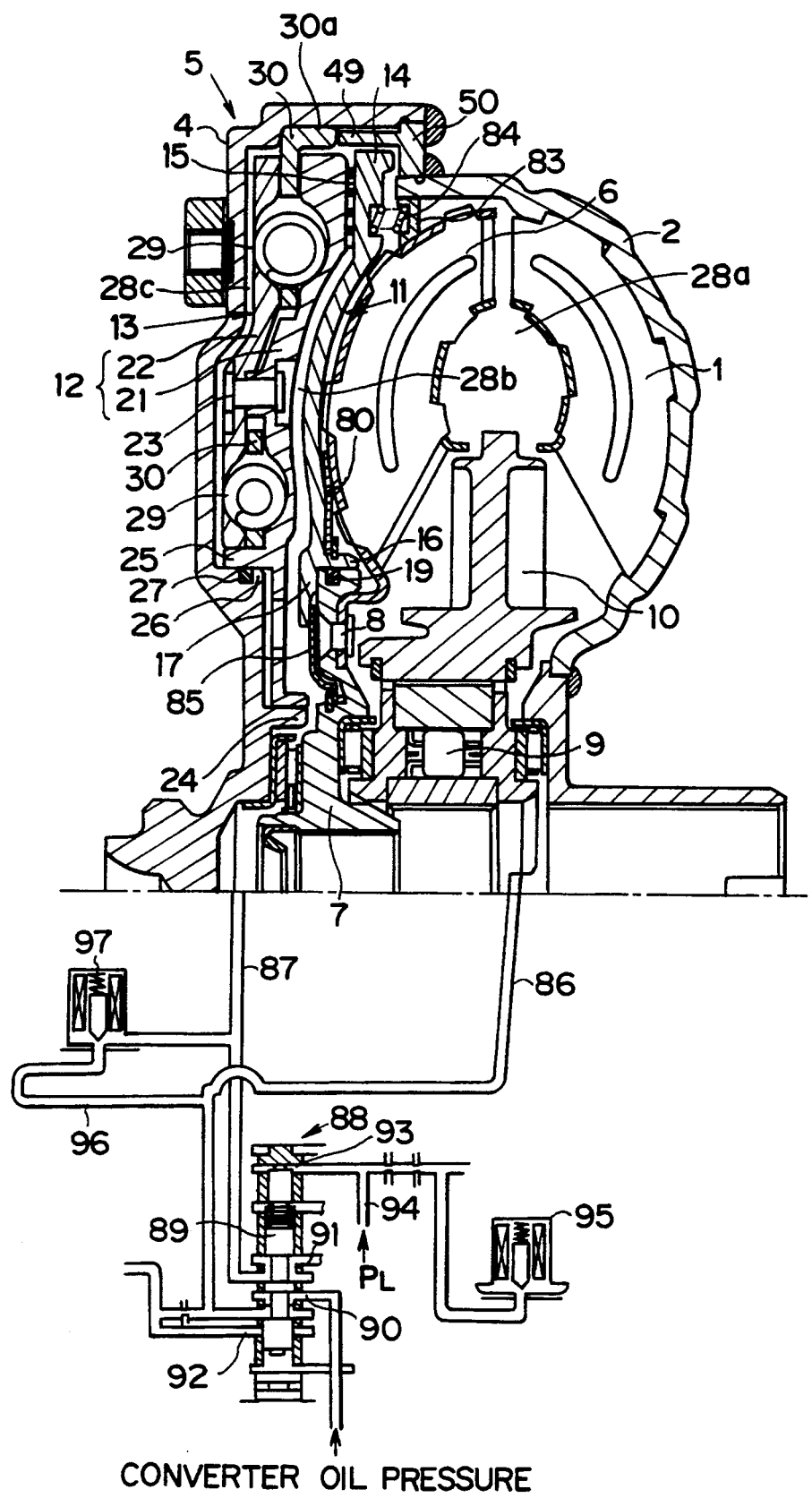
FIG. 41 is a section showing one half of a sixteenth embodiment, as cut along the center line.

FIG. 41 shows a torque converter, in which the elastic force for pushing the lockup clutch 14 onto the damper mass 12 is strengthened to improve the control responsiveness of the lockup clutch 11. This torque converter shown in Pig. 41 is an improvement over the torque converter shown in FIG. 38, Thus, the same portions of the torque converter shown in FIG. 41 as those shown in FIG. 38 are designated at the common reference numerals of FIG. 38, and their description will be omitted. Incidentally, the torque converter shown in FIG. 41 is not equipped with the engagement means for connecting the main member 21 and the center plate 30 in the torque transmitting manner.

in FIG. 41, a spring bearing 83 is mounted on the outer circumference of the turbine runner 6 close to the outermost circumference. A coil spring 84 is interposed between the spring bearing 83 and the lockup piston 14. Between the projection 17 of the lockup piston 14 and the side of the hub 7, there is interposed a coned disc spring 85 for pushing the lockup piston 14 onto the front cover 4. The coned disc spring 85 is fixed on the hub 7 by means of a snap ring.

Here will be described hydraulic control means for controlling the engagement and release of the lockup clutch 11. This hydraulic control means is formed with an oil passage 86 communicating with the first oil pressure chamber 28a and an oil passage 87 communicating with the second oil pressure chamber 28b. These oil passages 86 and 87 are connected to a lockup relay valve 88. This lockup relay valve 88 is used to feed those oil passages 86 and 87 selectively with a converter oil pressure which is regulated by a (not-shown) secondary regulator valve. Specifically, the lockup relay valve 88 causes the oil passage 86 to communicate with an input port 90 and the oil passage 87 to communicate with a drain port 91, when a spool 89 is in the shown upper position, and causes the oil passage 86 to communicate with a cooler port 92 and the co/1 passage 87 to communicate with the input port 90 when the spool 89 1 s ill the shown lower position. In an oil passage 94 for feeding a line pressure PL to a control port 93 of the lockup relay valve 88, moreover, there is disposed a lockup solenoid valve 95 for closing the drain port 91 when in its OFF state. There is further formed a communication passage 96 for providing the communication between the aforementioned oil passages 86 and 87. The communication passage 96 is equipped with a solenoid valve 97 for closing said communication passage 96 when in its OFF state.

Here will be described the operation of the torque converter shown in FIG. 41. The aforementioned torque converter can take the three modes, in which the lockup clutch 11 is released, in which the lockup clutch 11 is pushed and engaged by the oil pressure and the elastic forces of the coil spring 84 and the coned disc springs 80 and 85, and in which the lockup clutch 11 is pushed and engaged only by the elastic forces of the coil spring 84 and the coned disc springs 80 and 85. These modes are achieved by turning on or off the individual solenoid valves 95 and 97.

Specifically, if both the individual solenoid valves 95 and 97 are turned off, the lockup relay valve 88 has its control port 93 fed with the line pressure PL to have its spool 89 descended downward of FIG. 41 so that the oil pressure is fed to the second oil pressure chamber 28b via the oil passage 87 and is discharged from the first oil pressure chamber 28a via time oil passage 86. As a result, the lockup piston 14 leaves the damper mass 12 against the elastic forces of the coil spring 84 and time individual coned disc springs 80 and 85.

If only the lockup solenoid valve 95 is turned on, the lockup relay valve 88 has its control port 93 released from the oil pressure to have its spool 89 positioned in the upper side of FIG. 41, so that the converter oil pressure is fed to the first oil pressure chamber 28a via time oil passage 86 and is discharged from the second oil pressure chamber 28b via the oil passage 87. As a result, the lockup piston 14 is pushed onto the damper mass 12 to engage the lockup clutch 11 by the oil pressure and the elastic forces of the coil spring 84 and the individual coned disc springs 80 and 85.

If the solenoid valve 97 is turned on, on the other hand, the communication between time individual oil passages 86 and 87 is established to equalize the oil pressures across the lockup piston 14 no matter whether time lockup solenoid valve 95 might be ON or OFF. As a result, the lockup piston 14 is pushed onto and engaged with the damper mass 12 by the coil spring 84 and the individual coned disc springs 80 and 85. The torque transmission capacity by the lockup clutch 11 in this case is naturally decreased.

Figure 42:
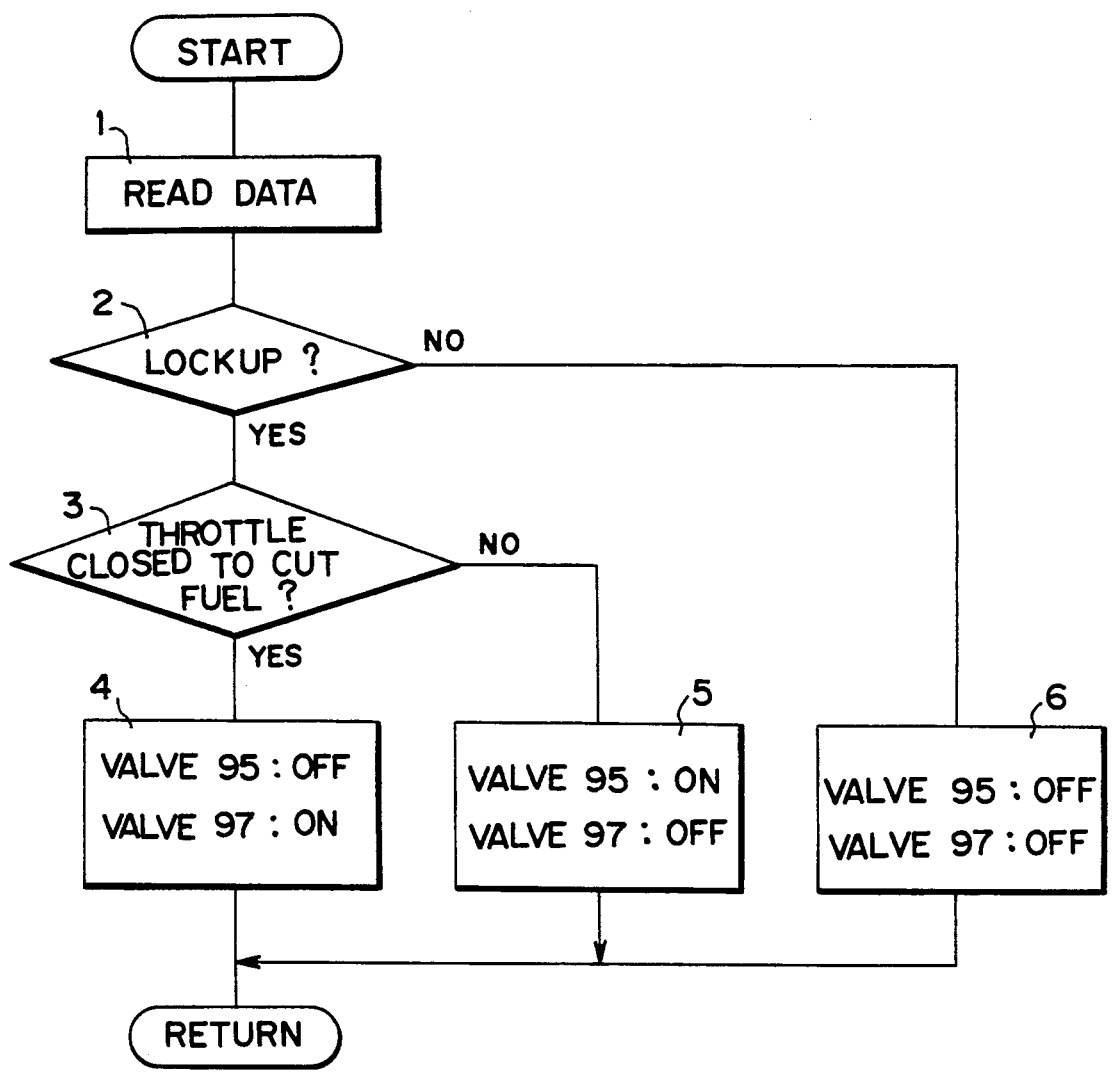
FIG. 42 is a control flow chart showing the torque converter of FIG. 41.

Here will be described an example of control in case the torque converter thus far described is connected to an engine which has its fuel cut while the vehicle is coasting. FIG. 42 is a flow chart showing one example of the control routine. First of all, at Step 1, there are read data such as the throttle opening, the vehicle speed or the lockup map. At Step 2, it is decided whether or not time condition for engaging time lockup clutch 11, i.e., the lockup condition holds. If time lockup condition holds, it is decided at Step 3 whether or not the fuel is cut with the throttle valve being closed. If time answer is "YES", the routine advances to Step 4, at which the lockup solenoid valve 95 is turned off whereas the solenoid valve 97 is turned on. Specifically, the individual oil passages 86 and 87 are released to equalize the oil pressures across the lockup piston 14 so that the lockup piston 14 is engaged by the elastic forces of the coil spring 84 and time individual coned disc springs 80 and 85 to establish an engaged state of small torque transmission capacity. Even if an abrupt braking is applied in this state, the lockup clutch 11 is allowed to slip because it has the small torque transmission capacity, if the braking torque to be applied from the automatic transmission to the engine has a considerable magnitude. In other words, the lockup clutch 11 acts as a torque limiter to damp the drop in the engine speed.

If the answer of Step 3 is "NO", on the contrary, the fuel cut is not carried out in the lockup state, and the routine advances to Step 5, at which the lockup solenoid valve 95 is turned on whereas the solenoid valve 97 is turned off. In this case, the converter oil pressure is fed to the first oil pressure chamber 28a and is discharged from the second oil pressure chamber 28b so that the lockup piston 14 is pushed and engaged into the so-called "complete lockup state" by the oil pressure and the elastic forces of the coil spring 84 and the individual coned disc springs 80 and 85.

If, moreover, the aforementioned answer of Step 2 is "NO", the routine advances to Step 6, at which the lockup solenoid valve 95 is turned off and the solenoid valve 97 Is turned off. As a result, the converter oil pressure is fed to the second oil pressure chamber 28b so that the lockup clutch 11 is released.

Figure 43:
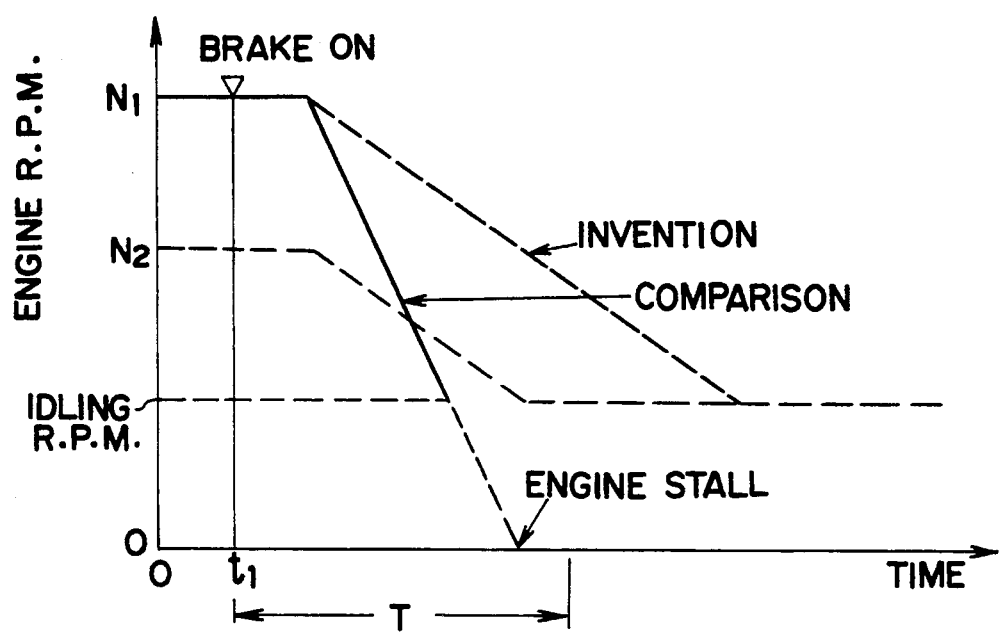
FIG. 43 is a diagram showing the change in the engine r.p.m. in case the control shown in FIG. 42 is executed, together with a comparison.

Here will be described the advantage of the aforementioned control of Step 4. In FIG. 43, if the engine r.p.m. in the fuel cut state is $N_1$ and if the braking is started at time $t_1$, the engine r.p.m. begins to be dropped after a predetermined delay time by the braking torque. The dropping rate of the r.p.m. rises with the braking torque. In the prior art, the delay time for releasing the lockup clutch is long, and the torque transmission capacity is large, so that the engine r.p.m. is abruptly dropped, as indicated by thinner solid line in FIG. 43. In the torque converter thus far described, on the contrary, the lockup oil pressure may be at a low level because the coil spring 84 and the coned disc springs 80 and 85 are included, so that the oil pressure for the lockup Is promptly dropped. Since, moreover, the torque transmission capacity in the engaged state is reduced by the elastic force of time coil spring 84 or the like, the dropping rate of the engine r.p.m. is gentle, as indicated by thicker broken line in FIG. 43. In case, therefore, the delay time when the lockup clutch is to be released is designated at T, an engine stall is reached in the meanwhile unless the solenoid valve 97 is provided. In the aforementioned torque converter, however, the engine r.p.m. can be maintained at a considerably high level till the delay time is elapsed, and this maintenance can be achieved even if the lower limit r.p.m. for the fuel cut is dropped to $N_2$. As a result, the aforementioned torque converter can widen the lockup range to further improve the mileage.

In the torque converter described above with reference to FIG. 41, the lockup clutch 11 can be engaged only by the elastic force by turning on the solenoid valve 97 to have its torque transmission capacity reduced. Thus, i t is possible to effectively prevent the so-called "surging" phenomenon which will cause the torsional vibration of the drive line. It is also possible to reduce the engaging shock when the lockup clutch 11 is to be engaged. In case the engine torque is abruptly changed by the high changing rate and large changing extent of the throttle opening, for example, to raise the possibility of the surging phenomenon accordingly, the aforementioned solenoid valve 97 is turned on to engage the lockup clutch 11 only by the elastic force. After this, when the r.p.m. of the drive line reaches the r.p.m. after the throttle opening has changed, the lockup solenoid valve 95 is turned on whereas the solenoid valve 97 is turned off, to bring the lockup clutch 11 into the complete lockup state. In this way, a high torque can be prevented from being abruptly transmitted between the engine and the drive line such as the automatic transmission, by the slip of the lockup clutch 11, so that the surging can be prevented.

In case the running state of the vehicle comes into a state for engaging the lockup clutch 11, this lockup clutch 11 is engaged only by the elastic force by turning on the solenoid valve 97 at first to equalize the oil pressures across the lockup piston 14. Since, in this state, the torque transmission capacity of the lockup clutch 11 is small, this lockup clutch 11 slips if the engine torque is high. If the state near the so-called "half lockup" continue for a predetermined time period, the r.p.m. of the drive line gradually rises. Thus, the engaging shock can be prevented or reduced if the lockup clutch 11 is brought into the complete lockup state when the r.p.m. of the drive line reaches a predetermined level.

Figure 44:
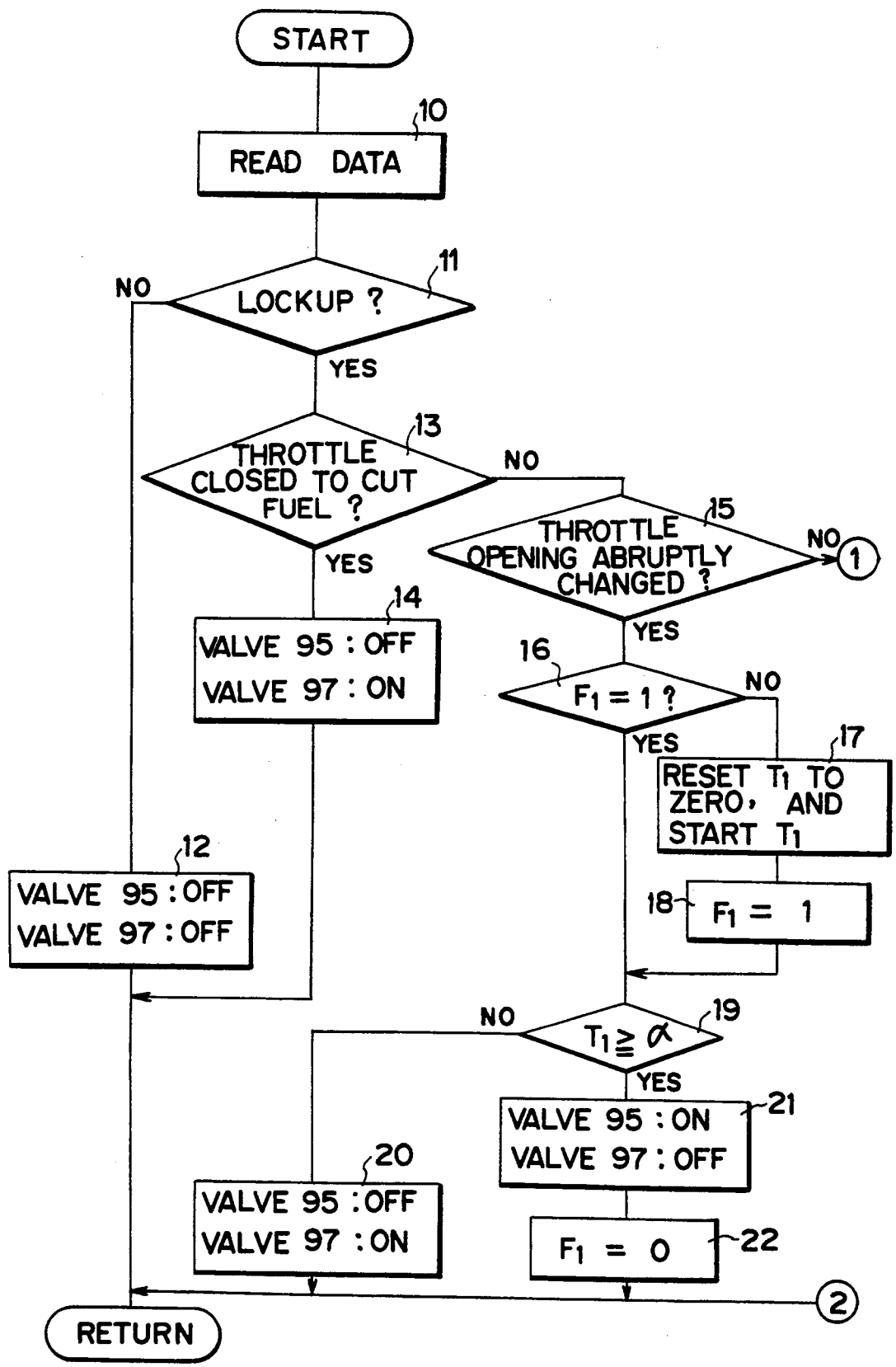
FIG. 44 is a chart showing a portion of another control flow of the torque converter shown in FIG. 41.
Figure 45:
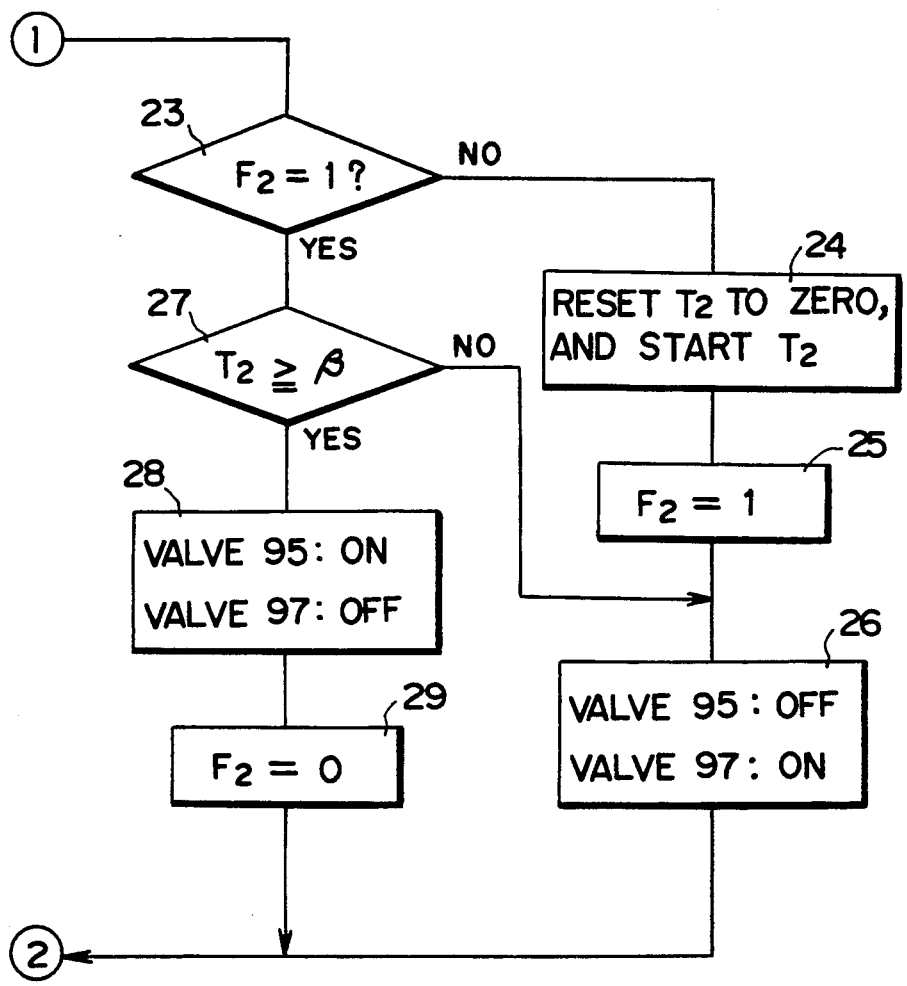
FIG. 45 is a chart showing another portion of the control flow of the torque converter shown in FIG. 41.

The control routines of the aforementioned control accompanying an abrupt braking at the time of fuel cut, a control for preventing the surging and a control for reducing the engaging shock are shown in one flow chart in FIGS. 44 and 45. Incidentally, circled numerals appearing in FIGS. 44 and 45 indicate that the lines having the identical numerals are connected to each other.

Figure 46:
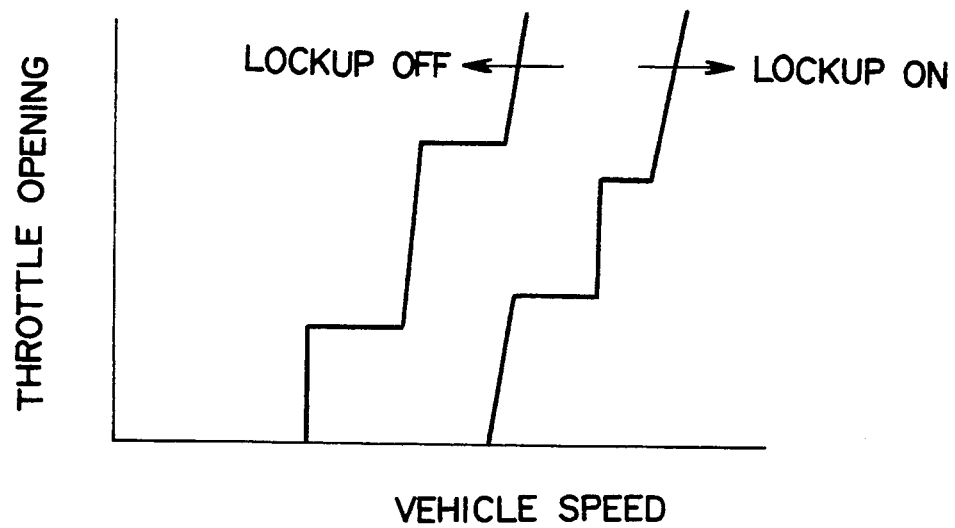
FIG. 46 is a diagram showing one example of a map defining a lockup area.
Figure 47:
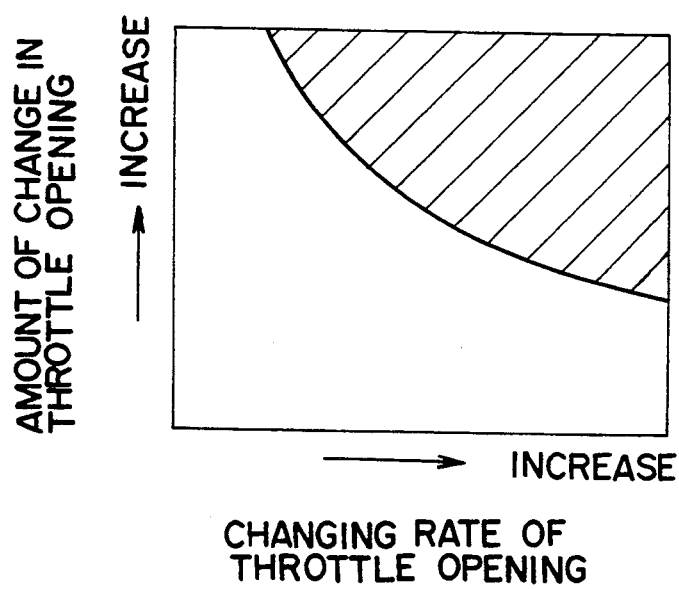
FIG. 47 is a diagram showing one example of a map defining a chattering area.

First of all, various data such as the throttle opening, the vehicle speed, the lockup map, the surging map or the brake signal are read at Step 10. Here, the lockup map indicates the running state for engaging the lockup clutch 11, i.e., the lockup range in terms of the vehicle speed and the throttle opening, as schematically shown In FIG. 46. On the other hand, the surging map indicates the abrupt changing state of the throttle opening, in which the sulking may possibly be caused, in terms of the amount of change in the throttle opening and the changing rate of the same, as schematically shown in FIG. 47. The hatched portion of FIG. 47 indicates an area, which is decided as the abruptly changing state of the throttle opening.

After the data has been read at Step 10, it is decided at Step 11 whether or not time lockup condition holds. If the answer is "NO", the lockup clutch 11 is released ( or lockup OFF ) at Step 12, and the routine is returned. If the answer is "YES", on the contrary, it is decided at Step 13 whether or not the fuel is cut with the throttle valve being closed. If this answer is "YES", the routine advances to Step 14, at which the lockup solenoid valve 95 is turned off whereas the solenoid valve 97 is turned on, as in the aforementioned control of Step 4 of FIG. 42, to engage the lockup clutch 11 only by the elastic force.

If the answer of Step 13 is "NO", on the contrary, it is decided at Step 15 whether or not the abruptly changing state of the throttle opening holds. If in the abruptly changing state of the throttle opening, the routine advances to Step 16, at which a flag $F_1$ is at "1". This flag $F_1$ indicates, if set to "1", that the time is being counted by a timer $T_1$. Unless the flag $F_1$ is at "1", the routine advances to Step 17, at which the timer $T_1$ is reset to zero, and the timer $T_1$ is started. After this, the flag $F_1$ is set to "1" at Step 18. If the answer of Step 16 is "YES" and if the control of Step 18 is executed, the routine advances to Step 19, at which it is decided whether or not the counted value of the timer $T_1$ exceeds a predetermined time $\alpha$. If this predetermined time $\alpha$ is not elapsed, the routine advances to Step 20, at which a control similar to that of Step 14 is executed to engage the lockup clutch 11 only by the elastic force. If the predetermined time $\alpha$ is elapsed, on the contrary, the routine advances to Step 21, at which the lockup solenoid valve 95 is turned on whereas the solenoid valve 97 is turned off, to bring the lockup clutch 11 into the complete lockup state. After this, the flag $F_1$ is reset to zero at Step 22, and the routine is returned.

If the answer of Step 15 is "NO", it is decided at Step 23 whether or not a flag $F_2$ is at "1". This flag $F_2$ indicates, if set to "1". that the time is being counted by a timer $T_2$. If the time counting is not started, the timer $T_2$ is reset to zero at Step 24 and is started. After this, the flag $F_2$ is set to "1" at Step 25. Moreover, a control is executed at Step 26 for turning off the lockup solenoid valve 95 but turning on the solenoid valve 97, and the routine is returned. If the time counting by the timer $T_2$ is started, on the contrary, the routine advances to Step 27, at which it is decided whether or not the counted value has elapsed a predetermined time $\beta$. If NOT, the routine advances to Step 26. If YES, on the contrary, the routine advances to Step 28, at which a control is executed to bring the lockup clutch 11 into the complete lockup state. At Step 29, moreover, the flag $F_2$ is reset to zero, and the routine is returned.

Incidentally, the means for pushing the lockup clutch 11 onto the damper mass 12 by the elastic force should not be limited to that shown in FIG. 41 but may be exemplified by a turbine runner shell which can elastically deform.

Figure 48:
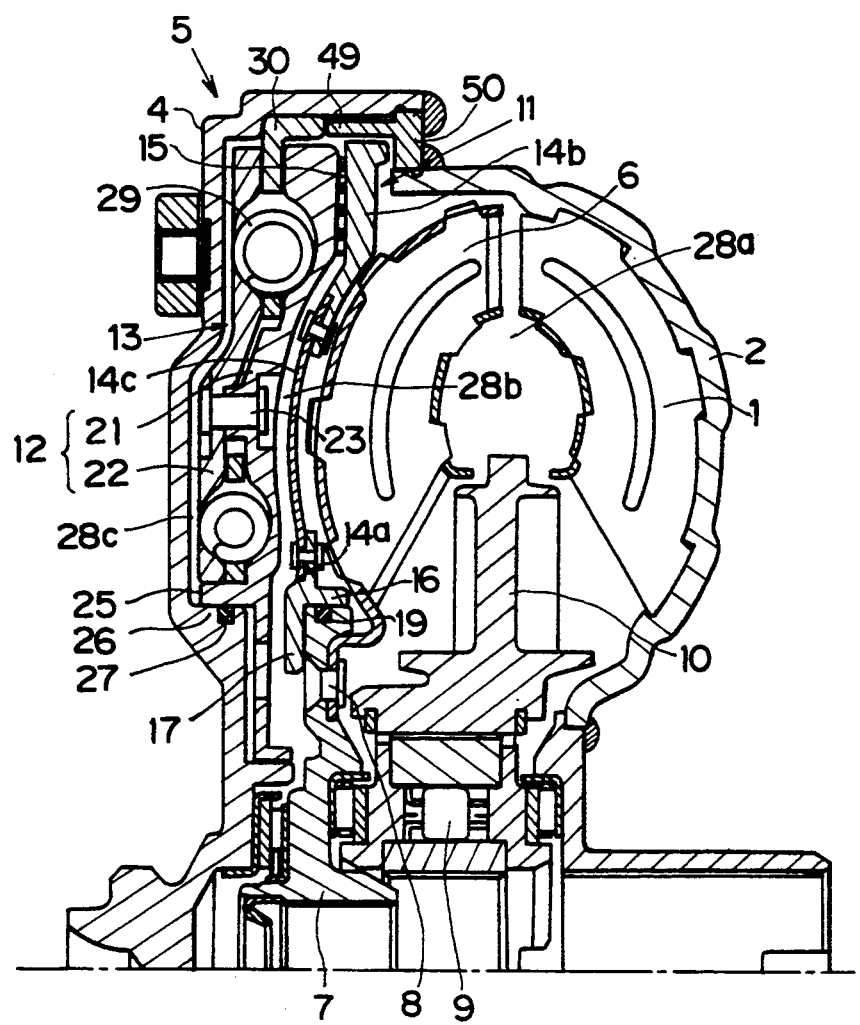
FIG. 48 is a section showing one half of a seventeenth embodiment, as cut along the center line.

On the other hand, a torque converter shown in FIG. 48 uses an elastic member In a portion of the lockup piston. Specifically, the lockup piston 14 is divided into two halves, i.e., an inner circumferential portion 14a and an outer circumferential portion 14b, which are connected by means of a leaf spring 14c. The outer circumferential portion 14b is pushed onto the damper mass 12 by that leaf spring 14c.

Even the construction shown in FIG. 48 can be operated like the torque converter shown in FIG. 41, because the lockup clutch 11 is engaged by the oil pressure and the elastic force.

Figure 13:
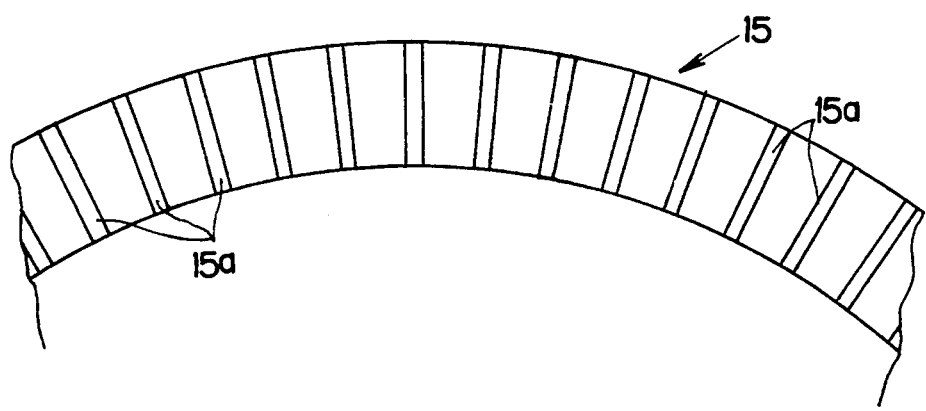
FIG. 13 is a partial front elevation showing a lining member of the lockup piston.
Figure 49:
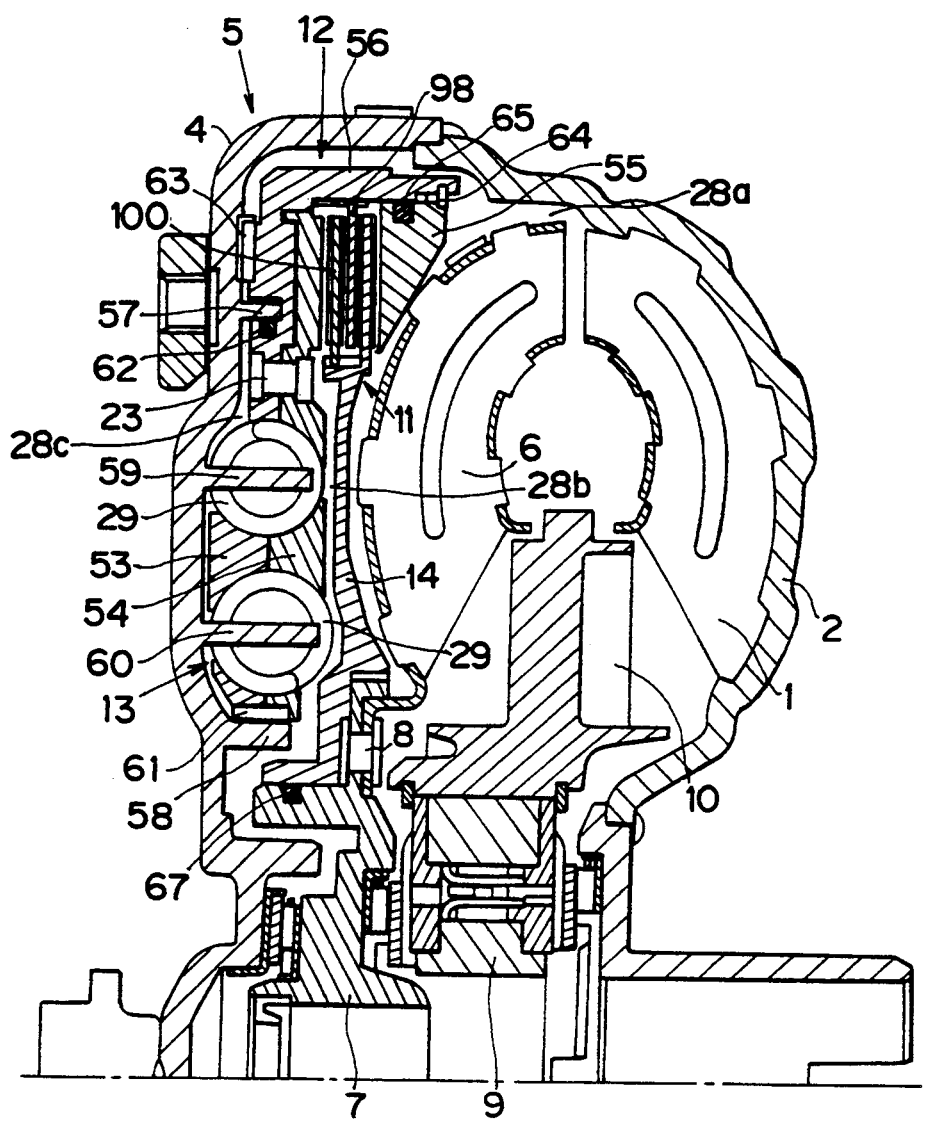
FIG. 49 is a section showing one half of an eighteenth embodiment, as cut along the center line.
Figure 50:
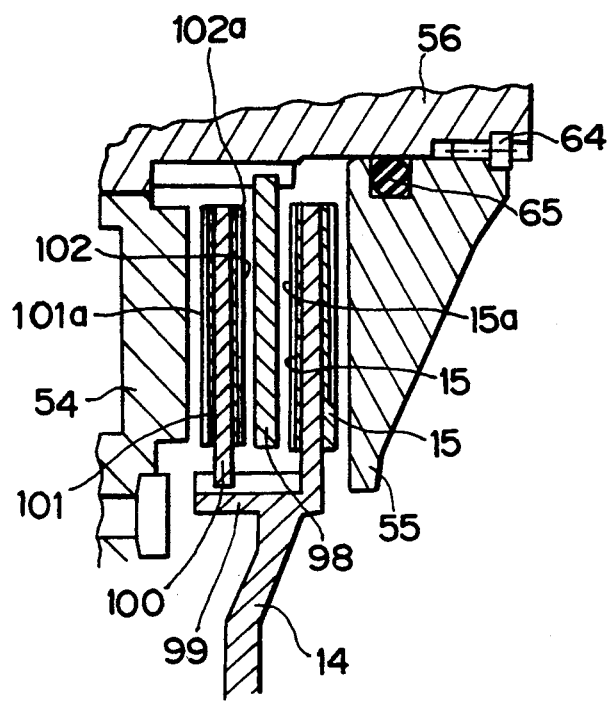
FIG. 50 is a partial section showing an outer circumferential portion of a lockup clutch shown in FIG. 49.

An embodiment, in which the engagement area of the lockup clutch 11 is further increased, is shown in FIGS. 49 and 50. Incidentally, the embodiment to be disclosed is an improvement over the aforementioned torque converter shown in FIG. 11, and the description of the portions identical to those of FIG. 11 will be omitted by designating them at the common reference numerals. In FIGS. 49 and 50, an annular plate 98 is splined to the inner circumference of the cylindrical portion 56 of the first damper mass 53 between the second damper mass 54 and the third damper mass 55. Moreover, the lockup piston 14 is equipped with a boss 99 having a diameter smaller than the internal diameter of the annular plate 98. To the outer circumference of the boss 99, there is splined an annular disc 100 which are inserted into the gap between the second damper mass 54 and the annular plate 98. To the front and back sides of the annular disc 100, there are respectively adhered friction members 101 and 102, which are formed with grooves 101a and 102a similar to the grooves 15a, as shown in FIG. 13, from the inner circumferential end to the outer circumferential end.

Thus, in the construction shown in FIGS. 49 and 50, too, the gap between the third damper mass 55 and the lockup piston 14 is allowed to communicate with the second oil pressure chamber 28b through the individual grooves 15a, 101a and 102a even if the second damper mass 54 under the lowest pressure at the lockup time and the friction member 101 at the front side of the annular disc 100 engage at first. As a result, the till rd damper mass 55 is exerted by the force for moving i t to the front (i.e., leftward of the Figures) so that it clamps without fall the annular disc 100, the annular plate 98 and the lockup piston 14 between itself and the second damper mass 54 to engage the individual frictional faces by the sufficient strong engaging force.

Incidentally, the aforementioned grooves 15a, 101a and 102 are formed in the lockup piston 14 and the annular disc 100. In the present invention, however, the communication portions may be formed in the surfaces of the individual damper masses 54 and 55 and in the annular plate 98. Moreover, the communications should not be limited to the grooves but may be exemplified by a hole which is formed through the lockup piston 14.

On the other hand, the present invention should not be limited to the torque converter but can also be applied to a fluid coupling having no torque amplifying action.

The advantages of the present invention will be summarized in the following. According to the present invention, there is provided the reaction means for separating the damper mass from the housing when the lockup clutch is engaged, so that the hysteresis of the damper mechanism when the lockup clutch is engaged is reduced. As a result, it is possible to effectively attenuate the vibration which is caused by the fluctuation of the input torque and to prevent the generation of the booming noise. Since the damper mass is held by the housing through the elastic member, the lockup piston can have its weight reduced. As a result, the load to be applied to the clutch of the automatic transmission at a shift time is lightened, the shifting shock can be easily reduced. Moreover, the control responsiveness of the lockup clutch is improved.

The vibration and noise can be prevented by the damper mechanism by supporting the damper mass rotatably on the front cover. Moreover, the lockup piston is caused to act as the transmission member by mounting the lockup piston directly on the output member, so that the parts number can be decreased to reduce time size and weight of the fluid coupling power transmission.

The sliding resistance between the damper mass and the front cover can be eliminated to improve the vibration attenuating characteristics better by equalizing the force for pushing the lockup piston with the oil of time first oil pressure chamber and the force for pushing time damper mass with the oil of the third oil pressure chamber.

Since the center plate of the damper mechanism is held by the joined portion of the front cover and the pump shell, no special member is required for positioning the damper mechanism in the axial direction so that the parts number can be decreased to reduce the size and weight of the fluid coupling power transmission.

If the damper mass is moved toward the lockup piston, the lockup clutch can be promptly engaged and released to improve the control responsiveness of the lockup clutch.

If the lockup piston and the damper mass engaged by the former are supported by a substantially single member, no radial slip will occur between the lockup piston and the damper mass, when these rotate relative to each other, so that an excessive wear is prevented to improve the durability.

If the damper mass is connected in a torque transmitting manner to the housing by the engagement means when the lockup clutch Is released, the damper mass acts as a flywheel for the input to be transmitted to the housing, so that the fluctuations of the input torque and the input r.p.m. can be suppressed.

If there is used an elastic member for pushing the lockup piston toward the damper mass, the oil pressure for engaging the lockup clutch can be dropped to improve the controllability of the lockup clutch.

The lockup clutch can have its external diameter decreased to reduce the size of the fluid coupling power transmission by making the lockup clutch of a multiplicity of discs. If, in this case, there are formed communication portions such as grooves for providing communication between the lower and higher pressure portions, all the frictional faces can be engaged smoothly and reliably.

What is claimed is:

1. A fluid coupling power transmission comprising: a pump impeller and a turbine runner arranged to face each other in a housing, to which torque is inputted; and a lockup clutch disposed in said housing for transmitting the torque from said housing to said turbine runner, wherein the improvement comprises:
    a damper mass made rotatable relative to said housing and arranged at the side of said turbine runner opposite a side of said turbine runner facing said pump impeller;
    an elastic member adapted to be compressed by the revolution of said damper mass relative to said housing;
    a lockup piston interposed between said damper mass and said turbine runner and pushed by oil pressure toward said damper mass into selective engagement with said damper mass;
    a first oil pressure chamber adapted to be fed with the oil pressure for pushing said lockup piston toward said damper mass;
    a second oil pressure chamber formed between said lockup piston and said damper mass when said lockup piston engages with said damper mass, and adapted to be fed with oil under pressure for separating said lockup piston from said damper mass; and
    reaction means for applying a reaction to said damper mass in a direction to separate said damper mass from said housing.

2. A fluid coupling power transmission according to claim 1,
    wherein said housing having a plurality of members including a front cover and a pump shell joined to each other, and
    wherein said elastic member is held between a plurality of projections, which are formed on the inner face of said front cover and at a circumferentially constant spacing, and said damper mass.

3. A fluid coupling power transmission according to claim 2,
    wherein said reaction means includes a third oil pressure chamber formed between said front cover and said damper mass and communicating with said first oil pressure chamber when said lockup piston engages with said damper mass.

4. A fluid coupling power transmission according to claim 3, further comprising an output member mounting said turbine runner thereon.
    wherein said lockup piston is so fitted in said output member as to rotate together.

5. A fluid coupling power transmission according to claim 4, further comprising:
    an annular projection formed on the inner circumference of said front cover and fitting said damper mass rotatably therein;
    a sealing portion sandwiched between said annular projection and said damper mass for blocking the communication between said third oil pressure chamber and said second oil pressure chamber; and
    another sealing portion mounted in the fitting portion between said lockup piston and said output member for blocking the communication between said first oil pressure chamber and said second oil pressure chamber.

6. A fluid coupling power transmission according to claim 5,
    wherein said sealing portion and said another sealing portion have an equal radius.

7. A fluid coupling power transmission according to claim 1,
    wherein said reaction means includes a thrust bearing interposed between said damper mass and said housing.

8. A fluid coupling power transmission according to claim 2, further comprising an annular projection formed on the inner face of said front cover for fitting and supporting said damper mass rotatably thereon.

9. A fluid coupling power transmission according to claim 1, further comprising engagement means disposed on either said damper mass or the inner face of said housing facing said damper mass for transmitting the torque in terms of a frictional force between said damper mass and said housing when said lockup piston is apart from said damper mass,
    wherein said damper mass is supported to move in directions toward and apart from said inner face.

10. A fluid coupling power transmission according to claim 9,
    wherein said engagement means includes a friction member mounted on either said damper mass or said front cover.

11. A fluid coupling power transmission according to claim 9,
    wherein said engagement means includes a molybdenum sprayed layer formed on either said damper mass or said front cover.

12. A fluid coupling power transmission according to claim 9, wherein said engagement means includes a knurled frictional face formed on either said damper mass or said front cover.

13. A fluid coupling power transmission according to claim 1, further comprising a stator interposed between said turbine runner and said pump impeller.

14. A fluid coupling power transmission according to claim 13, further comprising a one-way clutch equipped with said stator at an outer circumferential portion of the one-way clutch.

15. A fluid coupling power transmission according to claim 1, further comprising a center plate so connected to said housing as to rotate together, said center plate having said damper mass so connected thereto that said damper mass can rotate relative thereto.

16. A fluid coupling power transmission according to claim 15,
wherein said housing has a plurality of members including a front cover and a pump shell joined to each other, and
wherein said damper mass is rotatably mounted by said front cover.

17. A fluid coupling power transmission according to claim 15,
wherein said housing has a plurality of members including a front cover and a pump shell joined to each other, and
wherein said front cover is formed on its inner face with a cylindrical projection fitting said damper mass rotatably thereon.

18. A fluid coupling power transmission according to claim 15, further comprising an output member mounting said turbine runner thereon,
wherein said lockup piston is so fitted in said output member as to rotate together.

19. A fluid coupling power transmission according to claim 18,
wherein said lockup piston has a boss protruded toward said damper mass, and
wherein said damper mass is rotatably fitted on said boss.

20. A fluid coupling power transmission according to claim 19, further comprising a through bole formed in said boss for feeding the oil pressure of said second oil pressure chamber.

21. A fluid coupling power transmission according to claim 16,
wherein said reaction means includes a third oil pressure chamber formed between said front cover and said damper mass and communicating with said first oil pressure chamber when said lockup piston engages with said damper mass.

22. A fluid coupling power transmission according to claim 21,
wherein a pressure receiving area of said up piston in said first oil pressure chamber and a pressure receiving area of said damper mass in said third oil pressure chamber are equal to each other.

23. A fluid coupling power transmission according to claim 21, further comprising:
an annular projection formed on the inner circumference of said front cover and fitting said damper mass rotatably therein;
a sealing portion sandwiched between said annular projection and said damper mass for blocking the communication between said third oil pressure chamber and said second oil pressure chamber; and
another sealing portion mounted in the fitting portion between said lockup piston and said output member for blocking the communication between said first oil pressure chamber and said second oil pressure chamber.

24. A fluid coupling power transmission according to claim 23,
wherein said sealing portion and said another sealing portion have an equal radius.

25. A fluid coupling power transmission according to claim 15,
wherein said reaction means includes a thrust bearing interposed between said damper mass and said housing.

26. A fluid coupling power transmission according to claim 25, further comprising sealing means interposed between the outer circumference of said lockup piston and the inner circumference of said housing for coming into a sealing state when said first oil pressure chamber is fed with the oil pressure.

27. A fluid coupling power transmission according to claim 26,
wherein said sealing means includes a lip seal having a lip portion to be warped by oil pressure.

28. A fluid coupling power transmission according to claim 26,
wherein said sealing means includes: a taper face formed on the outer circumference of said lockup piston; and a seal ring mounted on time inner circumference of said housing for being contacted by said taper face when said lockup piston moves toward said damper mass.

29. A fluid coupling power transmission according to claim 25, further comprising:
a sealing portion for maintaining the outer circumference of said lockup piston and the inner circumference of said housing in a liquid-tight state; and a valve for blocking the flow of oil from said first oil pressure chamber to said second oil pressure chamber and allowing the flow of oil from said second oil pressure chamber to said first oil pressure chamber.

30. A fluid coupling power transmission according to claim 21,
wherein said damper mass is supported to move toward said lockup piston.

31. A fluid coupling power transmission according to claim 15,
wherein said housing includes: a front cover having its joined portion positioned at a side of the outer circumference of said center plate; and another member joined to a end of said front cover, and
wherein said center plate has its outer circumferential end so held by said joined portion as not to rotate with respect to the housing.

32. A fluid coupling power transmission according to claim 31, wherein said center plate has its outer circumferential
wherein said center plate has its outer circumferential end splined to said joined portion.

33. A fluid coupling power transmission according to claim 31, wherein said center plate has its outer circumferential end so held on said joined portion to move in the axial direction.

34. A fluid coupling power transmission according to claim 15, further comprising engagement means for transmitting the torque in terms of a frictional force between said damper mass and said housing when said lockup piston is apart from said damper mass, wherein said damper mass is supported to move in directions toward and apart from said center plate.

35. A fluid coupling power transmission according to claim 34, wherein said engagement means includes a friction member mounted on either said damper mass or said center plate.

36. A fluid coupling power transmission according to claim 34, wherein said engagement means includes a molybdenum sprayed layer formed on either said damper mass or said center plate.

37. A fluid coupling power transmission according to claim 34, wherein said engagement means includes a knurled frictional face formed on either said damper mass or said center plate.

38. A fluid coupling power transmission according to claim 34, further comprising an elastic member for pushing said lockup piston toward said damper mass.

39. A fluid coupling power transmission according to claim 15, further comprising an output member mounting said turbine runner thereon and so fitting said lockup piston therein that said lockup piston can move in the axial direction, wherein said damper mass is so supported on said output member as to rotate.

40. A fluid coupling power transmission according to claim 39, further comprising:

projections formed to project in the axial direction from said output member; and engagement teeth formed on said lockup piston for engaging with said projections in the rotational direction, whereby the torque is transmitted between said lockup piston and said output member by said projections and said engagement teeth.

41. A fluid coupling power transmission according to claim 15, further comprising an elastic member for pushing said lockup piston toward said damper mass.

42. A fluid coupling power transmission according to claim 41, further comprising:

a change-over valve for feeding or discharging the oil pressure selectively to said first oil pressure chamber and said second oil pressure chamber;

an oil passage for connecting said change-over valve to said first oil pressure chamber;

another oil passage for connecting said change-over valve to said second oil pressure chamber;

a communication passage for connecting said oil passage and said another oil passage; and a control valve for opening or closing said communication passage.

43. A fluid coupling power transmission according to claim 41, further comprising:

a hub mounting said turbine runner thereon; and a leaf spring connecting said lockup piston to said hub for pushing said lockup piston toward said damper mass.

44. A fluid coupling power transmission according to claim 15, further comprising a stator interposed between said turbine runner and said pump impeller.

45. A fluid coupling power transmission according to claim 44, further comprising a one-way clutch mounting said stator on an outer circumference of said one-way clutch.

46. A fluid coupling power transmission according to claim 2, further comprising:

a weight member made tolerably together with said damper mass for clamping said lockup piston between itself and said damper mass in response to the oil pressure of said first oil pressure chamber; and friction members mounted on those faces of said lockup piston, which face said damper mass and said weight member.

47. A fluid coupling power transmission according to claim 46, further comprising communication means for communicating said friction member, which is mounted on the face of said lockup piston facing said weight member, with said second oil pressure chamber.

48. A fluid coupling power transmission according to claim 46, wherein said communication means includes a plurality of grooves formed in the friction member which is mounted on the face of said lockup piston facing said damper mass.

49. A fluid coupling power transmission according to claim 47, wherein said communication means includes a hole extending through said lockup piston.

* * * * *